United States Patent
Brown et al.

(10) Patent No.: US 12,551,557 B2
(45) Date of Patent: Feb. 17, 2026

(54) TARGETED CHIMERIC ANTIGEN RECEPTOR MODIFIED T CELLS FOR TREATMENT OF IL13RALPHA2 POSITIVE MALIGNANCIES

(71) Applicant: City of Hope, Duarte, CA (US)

(72) Inventors: Christine E. Brown, Duarte, CA (US); Xin Yang, Duarte, CA (US); Renate Starr, Duarte, CA (US); Wen-Chung Chang, Duarte, CA (US); Stephen J. Forman, Duarte, CA (US)

(73) Assignee: City of Hope, Duarte, CA (US)

( * ) Notice: Subject to any disclaimer, the term of this patent is extended or adjusted under 35 U.S.C. 154(b) by 738 days.

(21) Appl. No.: 17/910,931

(22) PCT Filed: Mar. 12, 2021

(86) PCT No.: PCT/US2021/022221
§ 371 (c)(1),
(2) Date: Sep. 12, 2022

(87) PCT Pub. No.: WO2021/183960
PCT Pub. Date: Sep. 16, 2021

(65) Prior Publication Data
US 2023/0405119 A1   Dec. 21, 2023

Related U.S. Application Data

(60) Provisional application No. 62/988,828, filed on Mar. 12, 2020.

(51) Int. Cl.
*A61K 40/11* (2025.01)
*A61K 35/17* (2025.01)
(Continued)

(52) U.S. Cl.
CPC .............. *A61K 40/11* (2025.01); *A61K 35/17* (2013.01); *A61K 40/31* (2025.01);
(Continued)

(58) Field of Classification Search
CPC ........ A61K 40/11; A61K 35/17; A61K 40/31; A61K 40/4217; A61K 2239/21;
(Continued)

(56) References Cited

FOREIGN PATENT DOCUMENTS

KR     20160016725         2/2016
WO     WO2001025282 A2 * 10/2000   ......... C07K 14/5437
(Continued)

OTHER PUBLICATIONS

Beard et al., "Gene expression profiling using Nanostring digital RNA counting to identify potential target antigens for melanoma immunotherapy," Clin Cancer Res, Sep. 15, 2013, 19(18):4941-4950.
(Continued)

*Primary Examiner* — Tracy Vivlemore
*Assistant Examiner* — Thomas R. Amick
(74) *Attorney, Agent, or Firm* — Fish & Richardson P.C.

(57) ABSTRACT

Chimeric antigen receptors targeted to IL-13Ra2 are described. The targeting domain is a IL13 variant having increased specificity for IL-13Ra2 relative to IL-13Ra1.

29 Claims, 20 Drawing Sheets

Specification includes a Sequence Listing.

(51) Int. Cl.
  *A61K 40/31* (2025.01)
  *A61K 40/42* (2025.01)
  *A61P 35/00* (2006.01)
  *C12N 15/63* (2006.01)

(52) U.S. Cl.
  CPC .......... *A61K 40/4217* (2025.01); *A61P 35/00* (2018.01); *C12N 15/63* (2013.01); *A61K 2239/21* (2023.05); *A61K 2239/31* (2023.05); *A61K 2239/38* (2023.05); *A61K 2239/47* (2023.05)

(58) Field of Classification Search
  CPC ............ A61K 2239/31; A61K 2239/38; A61K 2239/47; A61P 35/00; C12N 15/63; C07K 2319/03; C07K 14/5437; C07K 14/7051; C07K 14/70521; C07K 14/7155
  See application file for complete search history.

(56) References Cited

FOREIGN PATENT DOCUMENTS

| WO | WO 2010/025177 | 3/2010 |
|---|---|---|
| WO | WO 2016/044811 | 3/2016 |
| WO | WO 2017/015490 | 1/2017 |

OTHER PUBLICATIONS

Brown et al., "Bioactivity and Safety of IL13Ralpha2-Redirected Chimeric Antigen Receptor CD8+ T Cells in Patients with Recurrent Glioblastoma." Clin Cancer Res, 2015, 21(18): 4062-4072.
Brown et al., "Regression of Glioblastoma after Chimeric Antigen Receptor T-Cell Therapy." N Engl J Med, Dec. 29, 2016, 375(26): 2561-2569.
Debinski et al., "Molecular Expression Analysis of Restrictive Receptor for Interleukin 13, a Brain Tumor-associated Cancer/Testis Antigen," Mol Med, 2000, 6(5):440-449.
Hecker et al., "Dysregulation of the IL-13 receptor system: a novel pathomechanism in pulmonary arterial hypertension." Am J Respir Crit Care Med, 2010, 182(6): 805-818.
Kahlon et al., "Specific recognition and killing of glioblastoma multiforme by interleukin 13-zetakine redirected cytolytic T cells." Cancer Res, 2004, 64(24): 9160-9166. (8 pages).
Kioi et al., "Interleukin-13 Receptor $\alpha2$ Chain," Cancer, Sep. 15, 2006, 107(6): 1407-1418.
Kong et al., "Suppression of human glioma xenografts with second-generation IL 13R-specific chimeric antigen receptor-modified T cells." Clin Cancer Res, 2012, 18(21): 5949-5960.
Krebs et al., "T cells redirected to interleukin-13R$\alpha$2 with interleukin-13 mutein-chimeric antigen receptors have anti-glioma activity but also recognize interleukin-13R$\alpha$1." Cytotherapy, 2014, 16(8): 1121-1131.
Lupardus et al., "Molecular Basis for Shared Cytokine Recognition Revealed in the Structure of an Unusually High Affinity Complex between IL-13 and IL-13Ra2," Structure, Mar. 10, 2010, 18: 332-342.
Madhankumar et al., "Interleukin 13 mutants of enhanced avidity toward the glioma-associated receptor, IL 13Ralpha2," Neoplasia, Jan. 1, 2004, 6(1):15-22.
Murata et al., "Interleukin-13 Receptor $\alpha$' but Not $\alpha$ Chain: A Functional Component of Interleukin-4 Receptors." Blood, 1998, 91(10): 3884-3891.
Papageorgis et al., "Targeting IL13Ralpha2 activates STAT6-TP63 pathway to suppress breast cancer lung metastasis." Breast Cancer Res, 2015, 17: 98 (15 pages).
PCT International Search Report and Written Opinion in International Appln. No. PCT/US2021/022221, mailed on Jun. 30, 2021, 15 pages.
Shibasaki et al., "Role of IL13RA2 in Sunitinib Resistance in Clear Cell Renal Cell Carcinoma," PLoS One, Jun. 26, 2015, 10(6): e0130980, 20 pages.
Shimamura et al., "Interleukin 13 Mediates Signal Transduction through Interleukin 13 Receptor 2 in Pancreatic Ductal Adenocarcinoma: Role of IL-13 Pseudomonas Exotoxin in Pancreatic Cancer Therapy," Clin Cancer Res, Jan. 15, 2010, 16(2): 577-586.
Thaci et al., "Significance of interleukin-13 receptor alpha 2-targeted glioblastoma therapy," Neuro Oncol, 2014, 16(10):1304-1312.
Xie et al., "IL-13 receptor $\alpha$2 is a negative prognostic factor in human lung cancer and stimulates lung cancer growth in mice." Oncotarget, 2015, 6(32): 32902-32913.

* cited by examiner

IL13-28ζ

| 5' | IL13 wt | IgG4 (EQ) | CD4 tm | CD28 | CD3ζ | T2A | CD19t | 3' | pF02916 |
| 5' | IL13 E13Y | IgG4 (EQ) | CD4 tm | CD28 | CD3ζ | T2A | CD19t | 3' | pF02689 |
| 5' | IL13 RLK | IgG4 (EQ) | CD4 tm | CD28 | CD3ζ | T2A | CD19t | 3' | pF02915 |
| 5' | IL13 YLK | IgG4 (EQ) | CD4 tm | CD28 | CD3ζ | T2A | CD19t | 3' | pF02945 |

| 5' | IL13 R | IgG4 (EQ) | CD4 tm | CD28 | CD3ζ | T2A | CD19t | 3' | pF02680 |
| 5' | IL13 L | IgG4 (EQ) | CD4 tm | CD28 | CD3ζ | T2A | CD19t | 3' | pF02534 |
| 5' | IL13 K | IgG4 (EQ) | CD4 tm | CD28 | CD3ζ | T2A | CD19t | 3' | pF02599 |

IL13-BBζ

| 5' | IL13 wt | IgG4 (EQ) | CD4 tm | 4-1BB | CD3ζ | T2A | CD19t | 3' | pF03057 |
| 5' | IL13 E13Y | IgG4 (EQ) | CD4 tm | 4-1BB | CD3ζ | T2A | CD19t | 3' | pF02630 |
| 5' | IL13 E13Y | IgG4 (EQ) | CD28 tm | 4-1BB | CD3ζ | T2A | CD19t | 3' | pF03243 |
| 5' | IL13 RLK | IgG4 (EQ) | CD28 tm | 4-1BB | CD3ζ | T2A | CD19t | 3' | pF03187 |
| 5' | IL13 RLK | IgG4 (ΔCH2) | CD28 tm | 4-1BB | CD3ζ | T2A | CD19t | 3' | pF03201 |
| 5' | IL13 RL | IgG4 (EQ) | CD28 tm | 4-1BB | CD3ζ | T2A | CD19t | 3' | pF03692 |
| 5' | IL13 YL | IgG4 (EQ) | CD28 tm | 4-1BB | CD3ζ | T2A | CD19t | 3' | pF03693 |
| 5' | IL13 L | IgG4 (EQ) | CD28 tm | 4-1BB | CD3ζ | T2A | CD19t | 3' | pF03694 |
| 5' | IL13 LK | IgG4 (EQ) | CD28 tm | 4-1BB | CD3ζ | T2A | CD19t | 3' | pF03712 |
| 5' | IL13 YLK | IgG4 (EQ) | CD28 tm | 4-1BB | CD3ζ | T2A | CD19t | 3' | pF03729 |

FIG. 1

IL13 variant/IgG4 variant spacer/CD28TM/41BB/GGG/CD3zeta

GPVPPSTALRYLIEELVNITQNQKAPLCNGSMVWSINLTAGMYCAALESLINVSGCSAIEKTQRMLSGFCPHKVSAG
QFSSLHVRDTKILVAQFVKDLLLHLKKLFKEGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKFWVLVVVGGVLACYSLLVTVAFIIFWVKRGRKKLLYIFKQPF
MRPVQTTQEEDGCSCRFPEEEEGGCELGGGRVKFSRSADAPAYQQGQNQLYNELNLGRREEYDVLDKRRGRDPE
MGGKPRRKNPQEGLYNELQKDKMAEAYSEIGMKGERRRGKGHDGLYQGLSTATKDTYDALHMQALPPR

SEQ ID NO: 39

GPVPPSTALRRLIEELVNITQNQKAPLCNGSMVWSINLTAGMYCAALESLINVSGCSAIEKTQRMLSGFCPHKVSA
GQFSSLHVRDTKILVAQFVKDLLLHLKKLFKEGRFNESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGKFWVLVVVGGVLACYSLLVTVAFIIFWVKRGRKKLLYIFKQP
FMRPVQTTQEEDGCSCRFPEEEEGGCELGGGRVKFSRSADAPAYQQGQNQLYNELNLGRREEYDVLDKRRGRDP
EMGGKPRRKNPQEGLYNELQKDKMAEAYSEIGMKGERRRGKGHDGLYQGLSTATKDTYDALHMQALP PR

SEQ ID NO: 40

FIG. 3

IL13 variant/IgG4 variant spacer/CD28TM/41BB/GGG/CD3zeta

GPVPPSTALRRLIEELVNITQNQKAPLCNGSMVWSINLTAGMYCAALESLINVSGCSAIEKTQRMLSGFCPHKVSA
GQFSSLHVRDTKILVAQFVKDLLLHLKKLFREGRFNESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGKFWVLVVVGGVLACYSLLVTVAFIIFWVKRGRKKLLYIFKQP
FMRPVQTTQEEDGCSCRFPEEEEGGCELGGGRVKFSRSADAPAYQQGQNQLYNELNLGRREEYDVLDKRRGRDP
EMGGKPRRKNPQEGLYNELQKDKMAEAYSEIGMKGERRRGKGHDGLYQGLSTATKDTYDALHMQALPPR

SEQ ID NO: 41

GPVPPSTALRYLIEELVNITQNQKAPLCNGSMVWSINLTAGMYCAALESLINVSGCSAIEKTQRMLSGFCPHKVSAG
QFSSLHVRDTKILVAQFVKDLLLHLKKLFREGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKFWVLVVVGGVLACYSLLVTVAFIIFWVKRGRKKLLYIFKQPF
MRPVQTTQEEDGCSCRFPEEEEGGCELGGGRVKFSRSADAPAYQQGQNQLYNELNLGRREEYDVLDKRRGRDPE
MGGKPRRKNPQEGLYNELQKDKMAEAYSEIGMKGERRRGKGHDGLYQGLSTATKDTYDALHMQALP PR

SEQ ID NO: 42

FIG. 4

IL13 variant/IgG4 (EQ) spacer/CD28TM/41BB/GGG/CD3zeta

GPVPPSTALRELIEELVNITQNQKAPLCNGSMVWSINLTAGMYCAALESLINVSGCSAIEKTQRMLSGFCPHKVSAG
QFSSLHVRDTKILVAQFVKDLLLHLKKLFKEGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKFWVLVVVGGVLACYSLLVTVAFIIFWVKRGRKKLLYIFKQPF
MRPVQTTQEEDGCSCRFPEEEEGGCELGGGRVKFSRSADAPAYQQGQNQLYNELNLGRREEYDVLDKRRGRDPE
MGGKPRRKNPQEGLYNELQKDKMAEAYSEIGMKGERRRGKGHDGLYQGLSTATKDTYDALHMQALPPR

SEQ ID NO: 43

GPVPPSTALRRLIEELVNITQNQKAPLCNGSMVWSINLTAGMYCAALESLINVSGCSAIEKTQRMLSGFCPHKVSA
GQFSSLHVRDTKIEVAQFVKDLLLHLKKLFREGRFNESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGKFWVLVVVGGVLACYSLLVTVAFIIFWVKRGRKKLLYIFKQP
FMRPVQTTQEEDGCSCRFPEEEEGGCELGGGRVKFSRSADAPAYQQGQNQLYNELNLGRREEYDVLDKRRGRDP
EMGGKPRRKNPQEGLYNELQKDKMAEAYSEIGMKGERRRGKGHDGLYQGLSTATKDTYDALHMQALP PR

SEQ ID NO: 44

FIG. 5

IL13 variant/IgG4 (EQ) spacer/CD28TM/41BB/GGG/CD3zeta

GPVPPSTALRELIEELVNITQNQKAPLCNGSMVWSINLTAGMYCAALESLINVSGCSAIEKTQRMLSGFCPHKVSAG
QFSSLHVRDTKILVAQFVKDLLLHLKKLFREGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKFWVLVVVGGVLACYSLLVTVAFIIFWVKRGRKKLLYIFKQPF
MRPVQTTQEEDGCSCRFPEEEEGGCELGGGRVKFSRSADAPAYQQGQNQLYNELNLGRREEYDVLDKRRGRDPE
MGGKPRRKNPQEGLYNELQKDKMAEAYSEIGMKGERRRGKHDGLYQGLSTATKDTYDALHMQALPPR

SEQ ID NO: 45

GPVPPSTALRELIEELVNITQNQKAPLCNGSMVWSINLTAGMYCAALESLINVSGCSAIEKTQRMLSGFCPHKVSAG
QFSSLHVRDTKIEVAQFVKDLLLHLKKLFKEGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKFWVLVVVGGVLACYSLLVTVAFIIFWVKRGRKKLLYIFKQPF
MRPVQTTQEEDGCSCRFPEEEEGGCELGGGRVKFSRSADAPAYQQGQNQLYNELNLGRREEYDVLDKRRGRDPE
MGGKPRRKNPQEGLYNELQKDKMAEAYSEIGMKGERRRGKHDGLYQGLSTATKDTYDALHMQALPPR

SEQ ID NO: 46

FIG. 6

IL13 variant/IgG4 (EQ) spacer/CD4TM/CD28/GGG/CD3zeta

GPVPPSTALRYLIEELVNITQNQKAPLCNGSMVWSINLTAGMYCAALESLINVSGCSAIEKTQRMLSGFCPHKVSAG
QFSSLHVRDTKILVAQFVKDLLLHLKKLFKEGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKMALIVLGGVAGLLLFIGLGIFFRSKRSRLLHSDYMNMTPRRP
GPTRKHYQPYAPPRDFAAYRS GGGRVKFSRSADAPAYQQGQNQLYNELNLGRREEYDVLDKRRGRDPEMGGKP
RRKNPQEGLYNELQKDKMAEAYSEIGMKGERRRGKHDGLYQGLSTATKDTYDALHMQALPPR

SEQ ID NO: 47

GPVPPSTALRRLIEELVNITQNQKAPLCNGSMVWSINLTAGMYCAALESLINVSGCSAIEKTQRMLSGFCPHKVSA
GQFSSLHVRDTKILVAQFVKDLLLHLKKLFKEGRFNESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGKMALIVLGGVAGLLLFIGLGIFFRSKRSRLLHSDYMNMTPRR
PGPTRKHYQPYAPPRDFAAYRS GGGRVKFSRSADAPAYQQGQNQLYNELNLGRREEYDVLDKRRGRDPEMGGK
PRRKNPQEGLYNELQKDKMAEAYSEIGMKGERRRGKHDGLYQGLSTATKDTYDALHMQALPPR

SEQ ID NO: 48

FIG. 7

IL13 variant/IgG4 (EQ) spacer/CD4TM/CD28/GGG/CD3zeta

GPVPPSTALR RLIEELVNITQNQKAPLCNGSMVWSINLTAGMYCAALESLINVSGCSAIEKTQRMLSGFCPHKVSA
GQFSSLHVRDTKILVAQFVKDLLLHLKKLFREGRFNESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGKMALIVLGGVAGLLLFIGLGIFFRSKRSRLLHSDYMNMTPRR
PGPTRKHYQPYAPPRDFAAYRS GGGRVKFSRSADAPAYQQGQNQLYNELNLGRREEYDVLDKRRGRDPEMGGK
PRRKNPQEGLYNELQKDKMAEAYSEIGMKGERRRGKGHDGLYQGLSTATKDTYDALHMQALPPR

SEQ ID NO: 49

GPVPPSTALR YLIEELVNITQNQKAPLCNGSMVWSINLTAGMYCAALESLINVSGCSAIEKTQRMLSGFCPHKVSAG
QFSSLHVRDTKILVAQFVKDLLLHLKKLFREGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFY PSDIAVEWESNGQPENNYKTTPPVLDSDGSFFLYSRLTVD
KSRWQEGNVFSCSVMHEALHNHYTQKSLSLSLGKMALIVLGGVAGLLLFIGLGIFFRSKRSRLLHSDYMNMTPRRP
GPTRKHYQPYAPPRDFAAYRS GGGRVKFSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPR

SEQ ID NO: 50

FIG. 8

IL13 variant/IgG4 (EQ) spacer/CD4TM/CD28/GGG/CD3zeta

GPVPPSTALRELIEELVNITQNQKAPLCNGSMVWSINLTAGMYCAALESLINVSGCSAIEKTQRMLSGFCPHKVSAG
QFSSLHVRDTKILVAQFVKDLLLHLKKLFKEGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREQVYTLPPSQEEMTKNQVSLTCLVKGFYPSDIAVEWESNGQPENNYKTTPPVLDSDGSFFLYSRLTVDK
SRWQEGNVFSCSVMHEALHNHYTQKSLSLSLGKMALIVLGGVAGLLLFIGLGIFFRSKRSRLLHSDYMNMTPRRPG
PTRKHYQPYAPPRDFAAYRS GGGRVKFSRSADAPAYQQGQNQLYNELNLGRREEYDVLDKRRGRDPEMGGKPR
RKNPQEGLYNELQKDKMAEAYSEIGMKGERRRGKGHDGLYQGLSTATKDTYDALHMQALPPR

SEQ ID NO: 51

GPVPPSTALRRLIEELVNITQNQKAPLCNGSMVWSINLTAGMYCAALESLINVSGCSAIEKTQRMLSGFCPHKVSA
GQFSSLHVRDTKIEVAQFVKDLLLHLKKLFREGRFNESKYGPPCPSCPAPEFEGGPSVFLFPPKPKDTLMISRTPEVTC
VVVDVSQEDPEVQFNWYVDGEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKMALIVLGGVAGLLLFIGLGIFFRSKRSRLLHSDYMNMTPRRP
GPTRKHYQPYAPPRDFAAYRS GGGRVKFSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPR

SEQ ID NO: 52

FIG. 9

IL13 variant/IgG4 (EQ) spacer/CD4TM/CD28/GGG/CD3zeta

GPVPPSTALRELIEELVNITQNQKAPLCNGSMVWSINLTAGMYCAALESLINVSGCSAIEKTQRMLSGFCPHKVSAG
QFSSLHVRDTKILVAQFVKDLLLHLKKLFREGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKMALIVLGGVAGLLLFIGLGIFFRSKRSRLLHSDYMNMTPRRP
GPTRKHYQPYAPPRDFAAYRS GGGRVKFSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPR

SEQ ID NO: 53

GPVPPSTALRELIEELVNITQNQKAPLCNGSMVWSINLTAGMYCAALESLINVSGCSAIEKTQRMLSGFCPHKVSAG
QFSSLHVRDTKIEVAQFVKDLLLHLKKLFKEGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKMALIVLGGVAGLLLFIGLGIFFRSKRSRLLHSDYMNMTPRRP
GPTRKHYQPYAPPRDFAAYRS GGGRVKFSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPR

SEQ ID NO: 54

FIG. 10

IL13 variant/IgG4 (EQ) spacer/CD4TM/41BB/GGG/CD3zeta

GPVPPSTALRYLIEELVNITQNQKAPLCNGSMVWSINLTAGMYCAALESLINVSGCSAIEKTQRMLSGFCPHKVSAG
QFSSLHVRDTKILVAQFVKDLLLHLKKLFKEGRFN<u>ESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGK</u>MALIVLGGVAGLLLFIGLGIFF<u>KRGRKKLLYIFKQPFMRPVQT
TQEEDGCSCRFPEEEEGGCEL</u>GGG<u>RVKFSRSADAPAYQQGQNQLYNELNLGRREEYDVLDKRRGRDPEMGGKPR
RKNPQEGLYNELQKDKMAEAYSEIGMKGERRRGKGHDGLYQ GLSTATKDTYDALHMQALPPR</u>

SEQ ID NO: 55

GPVPPSTALRRLIEELVNITQNQKAPLCNGSMVWSINLTAGMYCAALESLINVSGCSAIEKTQRMLSGFCPHKVSA
GQFSSLHVRDTKILVAQFVKDLLLHLKKLFKEGRFN<u>ESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGK</u>MALIVLGGVAGLLLFIGLGIFF<u>KRGRKKLLYIFKQPFMRPVQ
TTQEEDGCSCRFPEEEEGGCEL</u>GGG<u>RVKFSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPR</u>

SEQ ID NO: 56

GPVPPSTALRRLIEELVNITQNQKAPLCNGSMVWSINLTAGMYCAALESLINVSGCSAIEKTQRMLSGFCPHKVSA
GQFSSLHVRDTKILVAQFVKDLLLHLKKLFREGRFN<u>ESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGK</u>MALIVLGGVAGLLLFIGLGIFF<u>KRGRKKLLYIFKQPFMRPVQ
TTQEEDGCSCRFPEEEEGGCEL</u>GGG<u>RVKFSRSADAPAYQQGQNQLYNELNLGRREEYDVLDKRRGRDPEMGGKP
RRKNPQEGLYNELQKDKMAEAYSEIGMKGERRRGKGHDGLYQGLSTATKDTYDALHMQALPPR</u>

SEQ ID NO: 57

GPVPPSTALRYLIEELVNITQNQKAPLCNGSMVWSINLTAGMYCAALESLINVSGCSAIEKTQRML SGFCPHKVSAG
QFSSLHVRDTKILVAQFVKDLLLHLKKLFREGRFN<u>ESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGK</u>MALIVLGGVAGLLLFIGLGIFF<u>KRGRKKLLYIFKQPFMRPVQT
TQEEDGCSCRFPEEEEGGCEL</u>GGG<u>RVKFSRSADAPAYQQGQNQLYNELNLGRREEYDVLDKRRGRDPEMGGKPR
RKNPQEGLYNELQKDKMAEAYSEIGMKGERRRGKGHDGLYQGLSTATKDTYDALHMQALPPR</u>

SEQ ID NO: 58

FIG. 11

IL13 variant/IgG4 (EQ) spacer/CD8TM/41BB/GGG/CD3zeta

GPVPPSTALRYLIEELVNITQNQKAPLCNGSMVWSINLTAGMYCAALESLINVSGCSAIEKTQRMLSGFCPHKVSAG
QFSSLHVRDTKILVAQFVKDLLLHLKKLFKEGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKIYIWAPLAGTCGVLLLSLVIT KRGRKKLLYIFKQPFMRPVQTT
QEEDGCSCRFPEEEEGGCELGGGRVKFSRSADAPAYQQGQNQLYNELNLGRREEYDVLDKRRGRDPEMGGKPRRK
NPQEGLYNELQKDKMAEAYSEIGMKGERRRGKGHDGLYQGLSTATKDTYDALHMQALPPR

SEQ ID NO: 59

GPVPPSTALRRLIEELVNITQNQKAPLCNGSMVWSINLTAGMYCAALESLINVSGCSAIEKTQRMLSGFCPHKVSA
GQFSSLHVRDTKILVAQFVKDLLLHLKKLFKEGRFNESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGKIYIWAPLAGTCGVLLLSLVIT KRGRKKLLYIFKQPFMRPVQT
TQEEDGCSCRFPEEEEGGCELGGGRVKFSRSADAPAYQQGQNQLYNELNLGRREEYDVLDKRRGRDPEMGGKPR
RKNPQEGLYNELQKDKMAEAYSEIGMKGERRRGKGHDGLYQGLSTATKDTYDALHMQALPPR

SEQ ID NO: 60

GPVPPSTALRRLIEELVNITQNQKAPLCNGSMVWSINLTAGMYCAALESLINVSGCSAIEKTQRMLSGFCPHKVSA
GQFSSLHVRDTKILVAQFVKDLLLHLKKLFREGRFNESKYGPPCPSCPAPEFEGGPSVFLFPPKPKDTLMISRTPEVTC
VVVDVSQEDPEVQFNWYVDGVEVHQAKTKPREEQFQSTYRVVSVLTVLHQDWLNGKEYKCKVSNKGLPSSIEKTI
SKAKGQPREPQVYTLPPSQEEMTKNQVSLTCLVKGFYPSDIAVEWESNGQPENNYKTTPPVLDSDGSFFLYSRLTV
DKSRWQEGNVFSCSVMHEALHNHYTQKSLSLSLGKIYIWAPLAGTCGVLLLSLVITKRGRKKLLYIFKQPFMRPVQT
TQEEDGCSCRFPEEEEGGCELGGGRVKFSRSADAPAYQQGQNQLYNELNLGRREEYDVLDKRRGRDPEMGGKPR
RKNPQEGLYNELQKDKMAEAYSEIGMKGERRRGKGHDGLYQGLSTATKDTYDALHMQALPPR

SEQ ID NO: 61

GPVPPSTALRYLIEELVNITQNQKAPLCNGSMVWSINLTAGMYCAALESLINVSGCSAIEKTQRMLSG FCPHKVSAG
QFSSLHVRDTKILVAQFVKDLLLHLKKLFREGRFNESKYGPPCPSCPAPEFEGGPSVFLFPPKPKDTLMISRTPEVTCV
VVDVSQEDPEVQFNWYVDGVEVHQAKTKPREEQFQSTYRVVSVLTVLHQDWLNGKEYKCKVSNKGLPSSIEKTIS
KAKGQPREPQVYTLPPSQEEMTKNQVSLTCLVKGFYPSDIAVEWESNGQPENNYKTTPPVLDSDGSFFLYSRLTVD
KSRWQEGNVFSCSVMHEALHNHYTQKSLSLSLGKIYIWAPLAGTCGVLLLSLVIT KRGRKKLLYIFKQPFMRPVQTT
QEEDGCSCRFPEEEEGGCELGGGRVKFSRSADAPAYQQGQNQLYNELNLGRREEYDVLDKRRGRDPEMGGKPRR
KNPQEGLYNELQKDKMAEAYSEIGMKGERRRGKGHDGLYQGLSTATKDTYDALHMQALPPR

SEQ ID NO: 62

FIG. 12

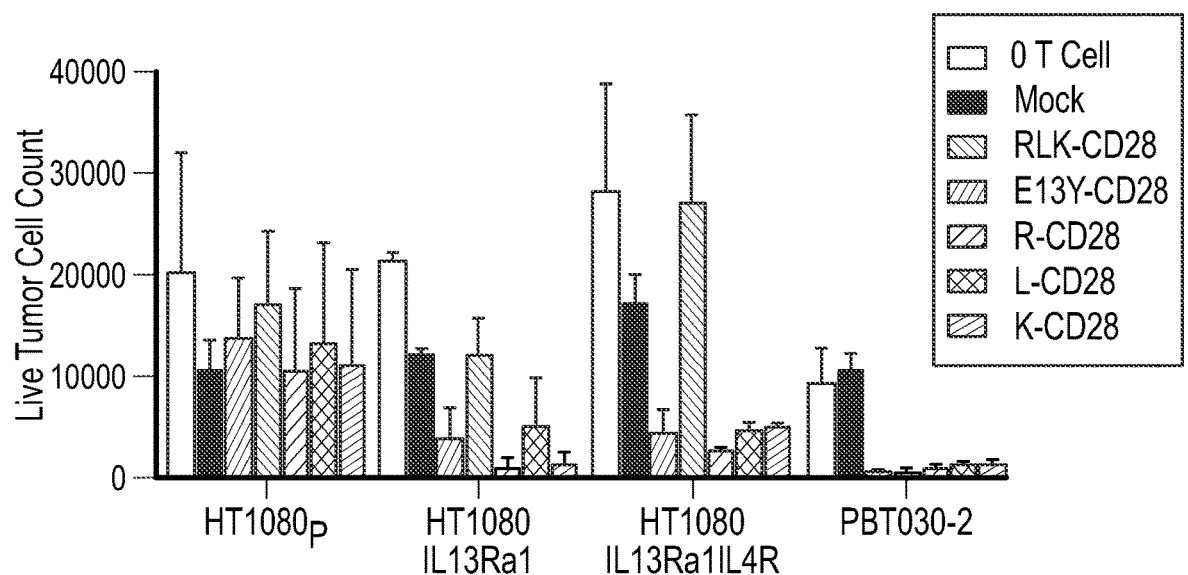
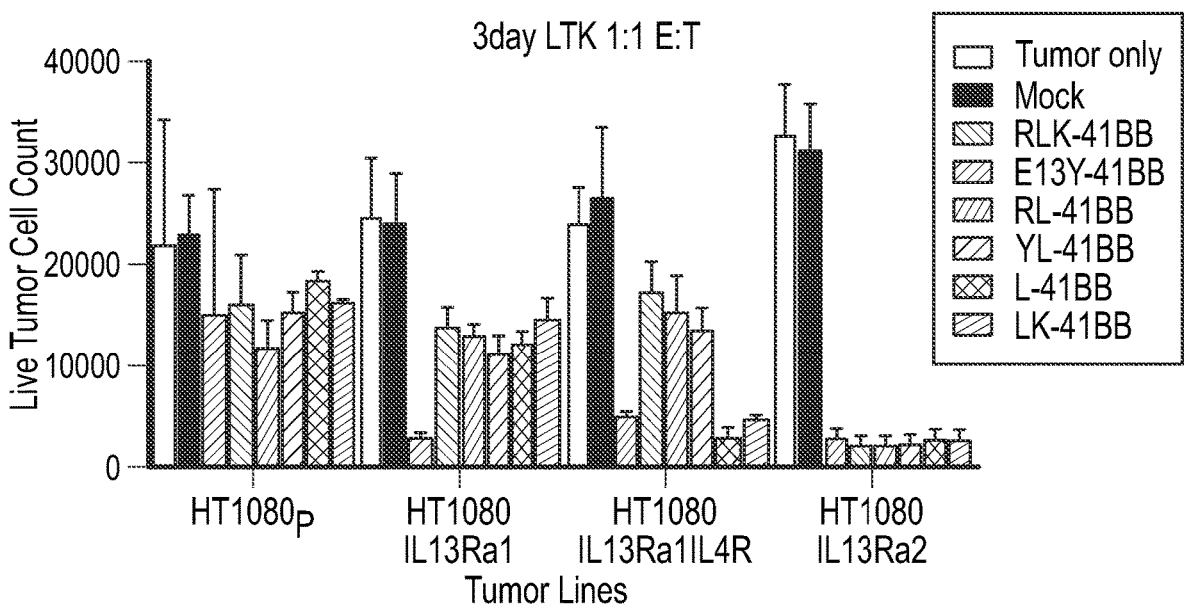
FIG. 15

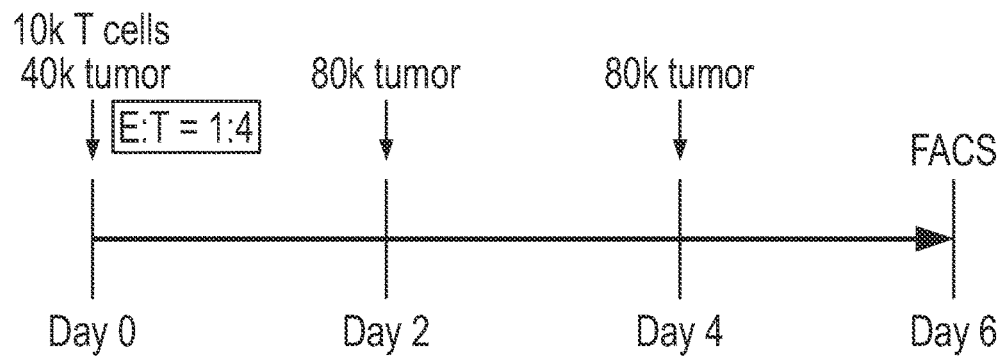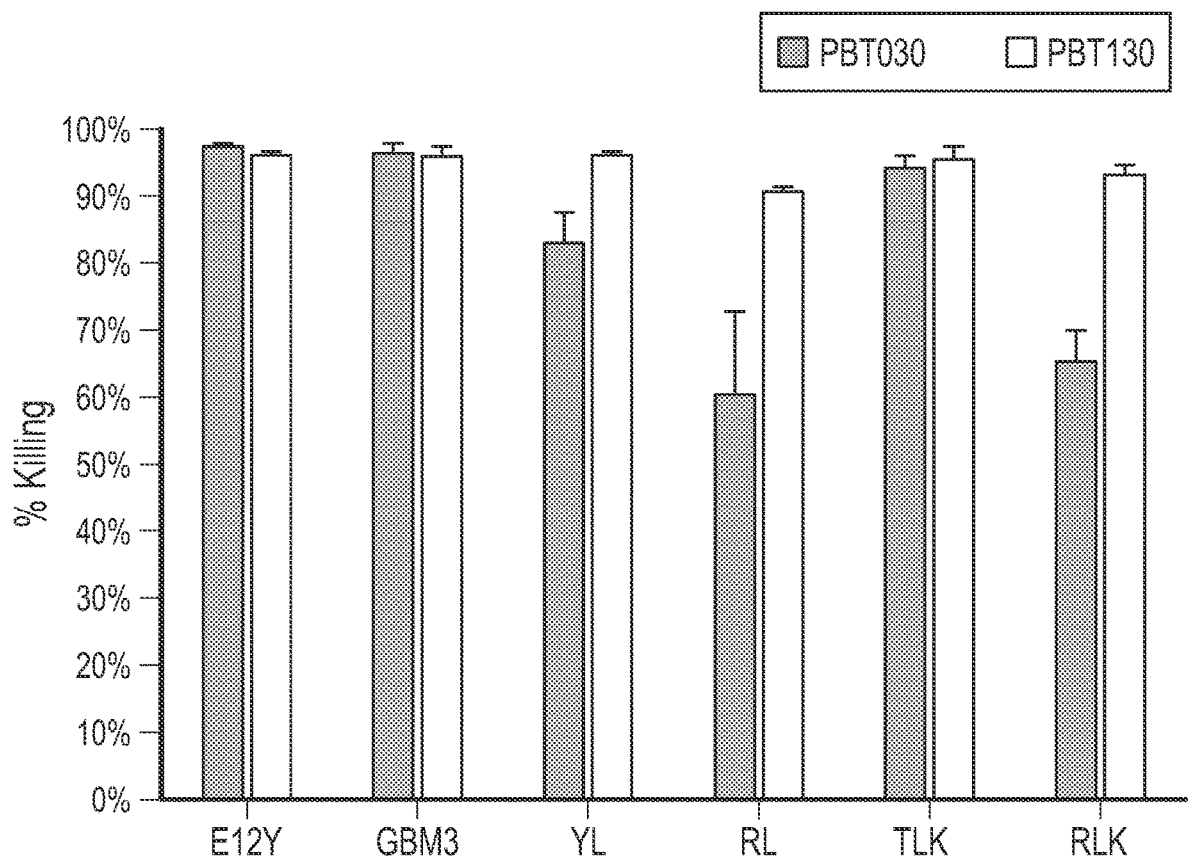
FIG. 17

IL13 variant/IgG4(HL-CH3)(S228P)/CD28TM/41BB/GGG/CD3zeta

GPVPPSTALRYLIEELVNITQNQKAPLCNGSMVWSINLTAGMYCAALESLINVSGCSAIEKTQRMLSGFCPHKVSAGQFSSLHV
RDTKILVAQFVKDLLLHLKKLFKEGRFNESKYGPPCPPCPGGGSSGGGSGGQPREPQVYTLPPSQEEMTKNQVSLTCLVKGFYP
SDIAVEWESNGQPENNYKTTPPVLDSDGSFFLYSRLTVDKSRWQEGNVFSCSVMHEALHNHYTQKSLSLSLGK FWVLVVVGG
VLACYSLLVTVFIIFWVKRGRKKLLYIFKQPFMRPVQTTQEEDGCSCRFPEEEEGGCEL GGGRVKFSRSADAPAYQQGQNQLYN
ELNLGRREEYDVLDKRRGRDPEMGGKPRRKNPQEGLYNELQKDKMAEAYSEIGMKGERRRGKGHDGLYQGLSTATKDTYDA
LHMQALPPR

SEQ ID NO: 63

GPVPPSTALRRLIEELVNITQNQKAPLCNGSMVWSINLTAGMYCAALESLINVSGCSAIEKTQRMLSGFCPHKVSAGQFSSLHV
RDTKILVAQFVKDLLLHLKKLFKEGRFNESKYGPPCPPCPGGGSSGGGSGGQPREPQVYTLPPSQEEMTKNQVSLTCLVKGFYP
SDIAVEWESNGQPENNYKTTPPVLDSDGSFFLYSRLTVDKSRWQEGNVFSCSVMHEALHNHYTQKSLSLSLGK FWVLVVVGG
VLACYSLLVTVFIIFWVKRGRKKLLYIFKQPFMRPVQTTQEEDGCSCRFPEEEEGGCEL GGGRVKFSRSADAPAYQQGQNQLYN
ELNLGRREEYDVLDKRRGRDPEMGGKPRRKNPQEGLYNELQKDKMAEAYSEIGMKGERRRGKGHDGLYQGLSTATKDTYDA
LHMQALPPR

SEQ ID NO: 64

GPVPPSTALRRLIEELVNITQNQKAPLCNGSMVWSINLTAGMYCAALESLINVSGCSAIEKTQRMLSGFCPHKVSAGQFSSLHV
RDTKILVAQFVKDLLLHLKKLFREGRFNESKYGPPCPPCPGGGSSGGGSGGQPREPQVYTLPPSQEEMTKNQVSLTCLVKGFYP
SDIAVEWESNGQPENNYKTTPPVLDSDGSFFLYSRLTVDKSRWQEGNVFSCSVMHEALHNHYTQKSLSLSLGK FWVLVVVGG
VLACYSLLVTVAFIIFWV KRGRKKLLYIFKQPFMRPVQTTQEEDGCSCRFPEEEEGGCEL GGGRVKFSRSADAPAYQQGQNQLY
NELNLGRREEYDVLDKRRGRDPEMGGKPRRKNPQEGLYNELQKDKMAEAYSEIGMKGERRRGKGHDGLYQGLSTATKDTYD
ALHMQALPPR

SEQ ID NO: 65

GPVPPSTALRYLIEELVNITQNQKAPLCNGSMVWSINLTAGMYCAALESLINVSGCSAIEKTQRMLSGFCPHKVSAGQFSSLHV
RDTKILVAQFVKDLLLHLKKLFREGRFNESKYGPPCPPCPGGGSSGGGSGGQPREPQVYTLPPSQEEMTKNQVSLTCLVKGFYP
SDIAVEWESNGQPENNYKTTPPVLDSDGSFFLYSRLTVDKSRWQEGNVFSCSVMHEALHNHYTQKSLSLSLGK FWVLVVVGG
VLACYSLLVTVAFIIFWV KRGRKKLLYIFKQPFMRPVQTTQEEDGCSCRFPEEEEGGCEL GGGRVKFSRSADAPAYQQGQNQLY
NELNLGRREEYDVLDKRRGRDPEMGGKPRRKNPQEGLYNELQKDKMAEAYSEIGMKGERRRGKGHDGLYQGLSTATKDTYD
ALHMQALPPR

SEQ ID NO: 66

GPVPPSTALRELIEELVNITQNQKAPLCNGSMVWSINLTAGMYCAALESLINVSGCSAIEKTQRMLSGFCPHKVSAGQFSSLHV
RDTKILVAQFVKDLLLHLKKLFKEGRFNESKYGPPCPPCPGGGSSGGGSGGQPREPQVYTLPPSQEEMTKNQVSLTCLVKGFYP
SDIAVEWESNGQPENNYKTTPPVLDSDGSFFLYSRLTVDKSRWQEGNVFSCSVMHEALHNHYTQKSLSLSLGK FWVLVVVGG
VLACYSLLVTVAFIIFWV KRGRKKLLYIFKQPFMRPVQTTQEEDGCSCRFPEEEEGGCEL GGGRVKFSRSADAPAYQQGQNQLY
NELNLGRREEYDVLDKRRGRDPEMGGKPRRKNPQEGLYNELQKDKMAEAYSEIGMKGERRRGKGHDGLYQGLSTATKDTYD
ALHMQALPPR

SEQ ID NO: 67

GPVPPSTALRELIEELVNITQNQKAPLCNGSMVWSINLTAGMYCAALESLINVSGCSAIEKTQRMLSGFCPHKVSAGQFSSLHV
RDTKILVAQFVKDLLLHLKKLFREGRFNESKYGPPCPPCPGGGSSGGGSGGQPREPQVYTLPPSQEEMTKNQVSLTCLVKGFYP
SDIAVEWESNGQPENNYKTTPPVLDSDGSFFLYSRLTVDKSRWQEGNVFSCSVMHEALHNHYTQKSLSLSLGK FWVLVVVGG
VLACYSLLVTVAFIIFWV KRGRKKLLYIFKQPFMRPVQTTQEEDGCSCRFPEEEEGGCEL GGGRVKFSRSADAPAYQQGQNQLY
NELNLGRREEYDVLDKRRGRDPEMGGKPRRKNPQEGLYNELQKDKMAEAYSEIGMKGERRRGKGHDGLYQGLSTATKDTYD
ALHMQALPPR

SEQ ID NO: 68

FIG. 20

SEQUENCE LISTING

```
<160> NUMBER OF SEQ ID NOS: 69

<210> SEQ ID NO 1
<211> LENGTH: 112
<212> TYPE: PRT
<213> ORGANISM: Homo sapiens

<400> SEQUENCE: 1

Gly Pro Val Pro Pro Ser Thr Ala Leu Arg Glu Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
            100                 105                 110

<210> SEQ ID NO 2
<211> LENGTH: 10
<212> TYPE: PRT
<213> ORGANISM: Artificial Sequence
<220> FEATURE:
<223> OTHER INFORMATION: Peptide spacer

<400> SEQUENCE: 2

Gly Gly Gly Ser Ser Gly Gly Gly Ser Gly
1               5                   10

<210> SEQ ID NO 3
<211> LENGTH: 12
<212> TYPE: PRT
<213> ORGANISM: Artificial Sequence
<220> FEATURE:
<223> OTHER INFORMATION: Variant spacer

<400> SEQUENCE: 3

Glu Ser Lys Tyr Gly Pro Pro Cys Pro Pro Cys Pro
1               5                   10

<210> SEQ ID NO 4
<211> LENGTH: 12
<212> TYPE: PRT
<213> ORGANISM: Homo sapiens
```

```
<400> SEQUENCE: 4

Glu Ser Lys Tyr Gly Pro Pro Cys Pro Ser Cys Pro
1               5                   10

<210> SEQ ID NO 5
<211> LENGTH: 22
<212> TYPE: PRT
<213> ORGANISM: Artificial Sequence
<220> FEATURE:
<223> OTHER INFORMATION: Variant spacer

<400> SEQUENCE: 5

Glu Ser Lys Tyr Gly Pro Pro Cys Pro Pro Cys Pro Gly Gly Ser
1               5                   10                  15

Ser Gly Gly Gly Ser Gly
                20

<210> SEQ ID NO 6
<211> LENGTH: 39
<212> TYPE: PRT
<213> ORGANISM: Homo sapiens

<400> SEQUENCE: 6

Ile Glu Val Met Tyr Pro Pro Pro Tyr Leu Asp Asn Glu Lys Ser Asn
1               5                   10                  15

Gly Thr Ile Ile His Val Lys Gly Lys His Leu Cys Pro Ser Pro Leu
                20                  25                  30

Phe Pro Gly Pro Ser Lys Pro
        35

<210> SEQ ID NO 7
<211> LENGTH: 48
<212> TYPE: PRT
<213> ORGANISM: Homo sapiens

<400> SEQUENCE: 7

Ala Lys Pro Thr Thr Thr Pro Ala Pro Arg Pro Pro Thr Pro Ala Pro
1               5                   10                  15

Thr Ile Ala Ser Gln Pro Leu Ser Leu Arg Pro Glu Ala Cys Arg Pro
                20                  25                  30

Ala Ala Gly Gly Ala Val His Thr Arg Gly Leu Asp Phe Ala Cys Asp
            35                  40                  45

<210> SEQ ID NO 8
<211> LENGTH: 45
<212> TYPE: PRT
<213> ORGANISM: Homo sapiens

<400> SEQUENCE: 8

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
                20                  25                  30

Gly Ala Val His Thr Arg Gly Leu Asp Phe Ala Cys Asp
            35                  40                  45

<210> SEQ ID NO 9
<211> LENGTH: 129
<212> TYPE: PRT
<213> ORGANISM: Artificial Sequence
<220> FEATURE:
<223> OTHER INFORMATION: Variant spacer
```

<400> SEQUENCE: 9

Glu Ser Lys Tyr Gly Pro Pro Cys Pro Pro Cys Pro Gly Gly Ser
1               5                   10                  15

Ser Gly Gly Gly Ser Gly Gly Gln Pro Arg Glu Pro Gln Val Tyr Thr
            20                  25                  30

Leu Pro Pro Ser Gln Glu Glu Met Thr Lys Asn Gln Val Ser Leu Thr
        35                  40                  45

Cys Leu Val Lys Gly Phe Tyr Pro Ser Asp Ile Ala Val Glu Trp Glu
50                  55                  60

Ser Asn Gly Gln Pro Glu Asn Asn Tyr Lys Thr Thr Pro Pro Val Leu
65                  70                  75                  80

Asp Ser Asp Gly Ser Phe Phe Leu Tyr Ser Arg Leu Thr Val Asp Lys
                85                  90                  95

Ser Arg Trp Gln Glu Gly Asn Val Phe Ser Cys Ser Val Met His Glu
            100                 105                 110

Ala Leu His Asn His Tyr Thr Gln Lys Ser Leu Ser Leu Ser Leu Gly
        115                 120                 125

Lys

<210> SEQ ID NO 10
<211> LENGTH: 229
<212> TYPE: PRT
<213> ORGANISM: Artificial Sequence
<220> FEATURE:
<223> OTHER INFORMATION: Variant spacer

<400> SEQUENCE: 10

Glu Ser Lys Tyr Gly Pro Pro Cys Pro Ser Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
50                  55                  60

Glu Val His Asn Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser

Leu Ser Leu Gly Lys
225

<210> SEQ ID NO 11
<211> LENGTH: 229
<212> TYPE: PRT
<213> ORGANISM: Artificial Sequence
<220> FEATURE:
<223> OTHER INFORMATION: Variant spacer

<400> SEQUENCE: 11

Glu Ser Lys Tyr Gly Pro Pro Cys Pro Pro Cys Pro Ala Pro Glu Phe
1               5                   10                  15

Glu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Gln Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly Lys
225

<210> SEQ ID NO 12
<211> LENGTH: 107
<212> TYPE: PRT
<213> ORGANISM: Homo sapiens

<400> SEQUENCE: 12

Gly Gln Pro Arg Glu Pro Gln Val Tyr Thr Leu Pro Pro Ser Gln Glu
1               5                   10                  15

Glu Met Thr Lys Asn Gln Val Ser Leu Thr Cys Leu Val Lys Gly Phe
            20                  25                  30

Tyr Pro Ser Asp Ile Ala Val Glu Trp Glu Ser Asn Gly Gln Pro Glu
        35                  40                  45

Asn Asn Tyr Lys Thr Thr Pro Pro Val Leu Asp Ser Asp Gly Ser Phe
    50                  55                  60

Phe Leu Tyr Ser Arg Leu Thr Val Asp Lys Ser Arg Trp Gln Glu Gly
65                  70                  75                  80

Asn Val Phe Ser Cys Ser Val Met His Glu Ala Leu His Asn His Tyr
                85                  90                  95

Thr Gln Lys Ser Leu Ser Leu Ser Leu Gly Lys
            100                 105

<210> SEQ ID NO 13
<211> LENGTH: 21
<212> TYPE: PRT
<213> ORGANISM: Homo sapiens

<400> SEQUENCE: 13

Leu Cys Tyr Leu Leu Asp Gly Ile Leu Phe Ile Tyr Gly Val Ile Leu
1               5                   10                  15

Thr Ala Leu Phe Leu
            20

<210> SEQ ID NO 14
<211> LENGTH: 27
<212> TYPE: PRT
<213> ORGANISM: Homo sapiens

<400> SEQUENCE: 14

Phe Trp Val Leu Val Val Val Gly Gly Val Leu Ala Cys Tyr Ser Leu
1               5                   10                  15

Leu Val Thr Val Ala Phe Ile Ile Phe Trp Val
            20                  25

<210> SEQ ID NO 15
<211> LENGTH: 28
<212> TYPE: PRT
<213> ORGANISM: Homo sapiens

<400> SEQUENCE: 15

Met Phe Trp Val Leu Val Val Val Gly Gly Val Leu Ala Cys Tyr Ser
1               5                   10                  15

Leu Leu Val Thr Val Ala Phe Ile Ile Phe Trp Val
            20                  25

<210> SEQ ID NO 16
<211> LENGTH: 22
<212> TYPE: PRT
<213> ORGANISM: Homo sapiens

<400> SEQUENCE: 16

Met Ala Leu Ile Val Leu Gly Gly Val Ala Gly Leu Leu Leu Phe Ile
1               5                   10                  15

Gly Leu Gly Ile Phe Phe
            20

<210> SEQ ID NO 17
<211> LENGTH: 21
<212> TYPE: PRT
<213> ORGANISM: Homo sapiens

<400> SEQUENCE: 17

Ile Tyr Ile Trp Ala Pro Leu Ala Gly Thr Cys Gly Val Leu Leu Leu
1               5                   10                  15

Ser Leu Val Ile Thr
            20

<210> SEQ ID NO 18
<211> LENGTH: 23
<212> TYPE: PRT
<213> ORGANISM: Homo sapiens

<400> SEQUENCE: 18

Ile Tyr Ile Trp Ala Pro Leu Ala Gly Thr Cys Gly Val Leu Leu Leu
1               5                   10                  15

Ser Leu Val Ile Thr Leu Tyr
            20

<210> SEQ ID NO 19
<211> LENGTH: 24
<212> TYPE: PRT
<213> ORGANISM: Homo sapiens

<400> SEQUENCE: 19

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 20
<211> LENGTH: 27
<212> TYPE: PRT
<213> ORGANISM: Homo sapiens

<400> SEQUENCE: 20

Ile Ile Ser Phe Phe Leu Ala Leu Thr Ser Thr Ala Leu Leu Phe Leu
1               5                   10                  15

Leu Phe Phe Leu Thr Leu Arg Phe Ser Val Val
            20                  25

<210> SEQ ID NO 21
<211> LENGTH: 112
<212> TYPE: PRT
<213> ORGANISM: Homo sapiens

<400> SEQUENCE: 21

Arg Val Lys Phe Ser Arg Ser Ala Asp Ala Pro Ala Tyr Gln Gln Gly
1               5                   10                  15

Gln Asn Gln Leu Tyr Asn Glu Leu Asn Leu Gly Arg Arg Glu Glu Tyr
            20                  25                  30

Asp Val Leu Asp Lys Arg Arg Gly Arg Asp Pro Glu Met Gly Gly Lys
        35                  40                  45

Pro Arg Arg Lys Asn Pro Gln Glu Gly Leu Tyr Asn Glu Leu Gln Lys
    50                  55                  60

Asp Lys Met Ala Glu Ala Tyr Ser Glu Ile Gly Met Lys Gly Glu Arg
65                  70                  75                  80

Arg Arg Gly Lys Gly His Asp Gly Leu Tyr Gln Gly Leu Ser Thr Ala
                85                  90                  95

Thr Lys Asp Thr Tyr Asp Ala Leu His Met Gln Ala Leu Pro Pro Arg
            100                 105                 110

<210> SEQ ID NO 22
<211> LENGTH: 41
<212> TYPE: PRT
<213> ORGANISM: Homo sapiens

<400> SEQUENCE: 22

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
                20                  25                  30

Pro Arg Asp Phe Ala Ala Tyr Arg Ser
            35                  40

<210> SEQ ID NO 23
<211> LENGTH: 41
<212> TYPE: PRT
<213> ORGANISM: Homo sapiens

<400> SEQUENCE: 23

Arg Ser Lys Arg Ser Arg Gly Gly His Ser Asp Tyr Met Asn Met Thr
1               5                   10                  15

Pro Arg Arg Pro Gly Pro Thr Arg Lys His Tyr Gln Pro Tyr Ala Pro
                20                  25                  30

Pro Arg Asp Phe Ala Ala Tyr Arg Ser
            35                  40

<210> SEQ ID NO 24
<211> LENGTH: 42
<212> TYPE: PRT
<213> ORGANISM: Homo sapiens

<400> SEQUENCE: 24

Lys Arg Gly Arg Lys Lys Leu Leu Tyr Ile Phe Lys Gln Pro Phe Met
1               5                   10                  15

Arg Pro Val Gln Thr Thr Gln Glu Glu Asp Gly Cys Ser Cys Arg Phe
                20                  25                  30

Pro Glu Glu Glu Glu Gly Gly Cys Glu Leu
            35                  40

<210> SEQ ID NO 25
<211> LENGTH: 42
<212> TYPE: PRT
<213> ORGANISM: Homo sapiens

<400> SEQUENCE: 25

Ala Leu Tyr Leu Leu Arg Arg Asp Gln Arg Leu Pro Pro Asp Ala His
1               5                   10                  15

Lys Pro Pro Gly Gly Gly Ser Phe Arg Thr Pro Ile Gln Glu Glu Gln
                20                  25                  30

Ala Asp Ala His Ser Thr Leu Ala Lys Ile
            35                  40

<210> SEQ ID NO 26
<211> LENGTH: 24
<212> TYPE: PRT
<213> ORGANISM: Artificial Sequence
<220> FEATURE:
<223> OTHER INFORMATION: T2A skip

<400> SEQUENCE: 26

Leu Glu Gly Gly Gly Glu Gly Arg Gly Ser Leu Leu Thr Cys Gly Asp
1               5                   10                  15

Val Glu Glu Asn Pro Gly Pro Arg
                20

<210> SEQ ID NO 27

```
<211> LENGTH: 354
<212> TYPE: PRT
<213> ORGANISM: Homo sapiens

<400> SEQUENCE: 27

Leu Val Thr Ser Leu Leu Cys Glu Leu Pro His Pro Ala Phe Leu
1               5                   10                  15

Leu Ile Pro Arg Lys Val Cys Asn Gly Ile Gly Ile Gly Glu Phe Lys
            20                  25                  30

Asp Ser Leu Ser Ile Asn Ala Thr Asn Ile Lys His Phe Lys Asn Cys
                35                  40                  45

Thr Ser Ile Ser Gly Asp Leu His Ile Leu Pro Val Ala Phe Arg Gly
    50                  55                  60

Asp Ser Phe Thr His Thr Pro Pro Leu Asp Pro Gln Glu Leu Asp Ile
65                  70                  75                  80

Leu Lys Thr Val Lys Glu Ile Thr Gly Phe Leu Leu Ile Gln Ala Trp
                85                  90                  95

Pro Glu Asn Arg Thr Asp Leu His Ala Phe Glu Asn Leu Glu Ile Ile
            100                 105                 110

Arg Gly Arg Thr Lys Gln His Gly Gln Phe Ser Leu Ala Val Val Ser
            115                 120                 125

Leu Asn Ile Thr Ser Leu Gly Leu Arg Ser Leu Lys Glu Ile Ser Asp
130                 135                 140

Gly Asp Val Ile Ile Ser Gly Asn Lys Asn Leu Cys Tyr Ala Asn Thr
145                 150                 155                 160

Ile Asn Trp Lys Lys Leu Phe Gly Thr Ser Gly Gln Lys Thr Lys Ile
                165                 170                 175

Ile Ser Asn Arg Gly Glu Asn Ser Cys Lys Ala Thr Gly Gln Val Cys
            180                 185                 190

His Ala Leu Cys Ser Pro Glu Gly Cys Trp Gly Pro Glu Pro Arg Asp
            195                 200                 205

Cys Val Ser Cys Arg Asn Val Ser Arg Gly Arg Glu Cys Val Asp Lys
    210                 215                 220

Cys Asn Leu Leu Glu Gly Glu Pro Arg Glu Phe Val Glu Asn Ser Glu
225                 230                 235                 240

Cys Ile Gln Cys His Pro Glu Cys Leu Pro Gln Ala Met Asn Ile Thr
                245                 250                 255

Cys Thr Gly Arg Gly Pro Asp Asn Cys Ile Gln Cys Ala His Tyr Ile
            260                 265                 270

Asp Gly Pro His Cys Val Lys Thr Cys Pro Ala Gly Val Met Gly Glu
            275                 280                 285

Asn Asn Thr Leu Val Trp Lys Tyr Ala Asp Ala Gly His Val Cys His
            290                 295                 300

Leu Cys His Pro Asn Cys Thr Tyr Gly Cys Thr Gly Pro Gly Leu Glu
305                 310                 315                 320

Gly Cys Pro Thr Asn Gly Pro Lys Ile Pro Ser Ile Ala Thr Gly Met
                325                 330                 335

Val Gly Ala Leu Leu Leu Leu Leu Val Val Ala Leu Gly Ile Gly Leu
            340                 345                 350

Phe Met

<210> SEQ ID NO 28
<211> LENGTH: 323
<212> TYPE: PRT
<213> ORGANISM: Homo sapiens
```

<400> SEQUENCE: 28

```
Met Pro Pro Pro Arg Leu Leu Phe Phe Leu Leu Phe Leu Thr Pro Met
1               5                   10                  15

Glu Val Arg Pro Glu Glu Pro Leu Val Val Lys Val Glu Glu Gly Asp
            20                  25                  30

Asn Ala Val Leu Gln Cys Leu Lys Gly Thr Ser Asp Gly Pro Thr Gln
        35                  40                  45

Gln Leu Thr Trp Ser Arg Glu Ser Pro Leu Lys Pro Phe Leu Lys Leu
    50                  55                  60

Ser Leu Gly Leu Pro Gly Leu Gly Ile His Met Arg Pro Leu Ala Ile
65                  70                  75                  80

Trp Leu Phe Ile Phe Asn Val Ser Gln Gln Met Gly Gly Phe Tyr Leu
                85                  90                  95

Cys Gln Pro Gly Pro Pro Ser Glu Lys Ala Trp Gln Pro Gly Trp Thr
            100                 105                 110

Val Asn Val Glu Gly Ser Gly Glu Leu Phe Arg Trp Asn Val Ser Asp
        115                 120                 125

Leu Gly Gly Leu Gly Cys Gly Leu Lys Asn Arg Ser Ser Glu Gly Pro
    130                 135                 140

Ser Ser Pro Ser Gly Lys Leu Met Ser Pro Lys Leu Tyr Val Trp Ala
145                 150                 155                 160

Lys Asp Arg Pro Glu Ile Trp Glu Gly Glu Pro Pro Cys Val Pro Pro
                165                 170                 175

Arg Asp Ser Leu Asn Gln Ser Leu Ser Gln Asp Leu Thr Met Ala Pro
            180                 185                 190

Gly Ser Thr Leu Trp Leu Ser Cys Gly Val Pro Pro Asp Ser Val Ser
        195                 200                 205

Arg Gly Pro Leu Ser Trp Thr His Val His Pro Lys Gly Pro Lys Ser
    210                 215                 220

Leu Leu Ser Leu Glu Leu Lys Asp Asp Arg Pro Ala Arg Asp Met Trp
225                 230                 235                 240

Val Met Glu Thr Gly Leu Leu Leu Pro Arg Ala Thr Ala Gln Asp Ala
                245                 250                 255

Gly Lys Tyr Tyr Cys His Arg Gly Asn Leu Thr Met Ser Phe His Leu
            260                 265                 270

Glu Ile Thr Ala Arg Pro Val Leu Trp His Trp Leu Leu Arg Thr Gly
        275                 280                 285

Gly Trp Lys Val Ser Ala Val Thr Leu Ala Tyr Leu Ile Phe Cys Leu
    290                 295                 300

Cys Ser Leu Val Gly Ile Leu His Leu Gln Arg Ala Leu Val Leu Arg
305                 310                 315                 320

Arg Lys Arg
```

<210> SEQ ID NO 29
<211> LENGTH: 22
<212> TYPE: PRT
<213> ORGANISM: Homo sapiens

<400> SEQUENCE: 29

```
Met Leu Leu Leu Val Thr Ser Leu Leu Leu Cys Glu Leu Pro His Pro
1               5                   10                  15

Ala Phe Leu Leu Ile Pro
            20
```

<210> SEQ ID NO 30
<211> LENGTH: 112
<212> TYPE: PRT
<213> ORGANISM: Artificial Sequence
<220> FEATURE:
<223> OTHER INFORMATION: IL-13 variant

<400> SEQUENCE: 30

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu Leu His Leu Lys Lys Leu Phe Lys Glu Gly Arg Phe Asn
            100                 105                 110

<210> SEQ ID NO 31
<211> LENGTH: 112
<212> TYPE: PRT
<213> ORGANISM: Artificial Sequence
<220> FEATURE:
<223> OTHER INFORMATION: IL-13 variant

<400> SEQUENCE: 31

Gly Pro Val Pro Pro Ser Thr Ala Leu Arg Arg Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu Leu His Leu Lys Lys Leu Phe Lys Glu Gly Arg Phe Asn
            100                 105                 110

<210> SEQ ID NO 32
<211> LENGTH: 112
<212> TYPE: PRT
<213> ORGANISM: Artificial Sequence
<220> FEATURE:
<223> OTHER INFORMATION: IL-13 variant

<400> SEQUENCE: 32

Gly Pro Val Pro Pro Ser Thr Ala Leu Arg Arg Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu

```
                35                  40                  45
Ser Leu Ile Asn Val Ser Gly Cys Ser Ala Ile Glu Lys Thr Gln Arg
         50                  55                  60
Met Leu Ser Gly Phe Cys Pro His Lys Val Ser Ala Gly Gln Phe Ser
 65                  70                  75                  80
Ser Leu His Val Arg Asp Thr Lys Ile Leu Val Ala Gln Phe Val Lys
                 85                  90                  95
Asp Leu Leu Leu His Leu Lys Lys Leu Phe Arg Glu Gly Arg Phe Asn
            100                 105                 110
```

<210> SEQ ID NO 33
<211> LENGTH: 112
<212> TYPE: PRT
<213> ORGANISM: Artificial Sequence
<220> FEATURE:
<223> OTHER INFORMATION: IL-13 variant

<400> SEQUENCE: 33

```
Gly Pro Val Pro Pro Ser Thr Ala Leu Arg Tyr Leu Ile Glu Glu Leu
 1               5                  10                  15
Val Asn Ile Thr Gln Asn Gln Lys Ala Pro Leu Cys Asn Gly Ser Met
             20                  25                  30
Val Trp Ser Ile Asn Leu Thr Ala Gly Met Tyr Cys Ala Ala Leu Glu
         35                  40                  45
Ser Leu Ile Asn Val Ser Gly Cys Ser Ala Ile Glu Lys Thr Gln Arg
     50                  55                  60
Met Leu Ser Gly Phe Cys Pro His Lys Val Ser Ala Gly Gln Phe Ser
 65                  70                  75                  80
Ser Leu His Val Arg Asp Thr Lys Ile Leu Val Ala Gln Phe Val Lys
                 85                  90                  95
Asp Leu Leu Leu His Leu Lys Lys Leu Phe Arg Glu Gly Arg Phe Asn
            100                 105                 110
```

<210> SEQ ID NO 34
<211> LENGTH: 112
<212> TYPE: PRT
<213> ORGANISM: Artificial Sequence
<220> FEATURE:
<223> OTHER INFORMATION: IL-13 variant

<400> SEQUENCE: 34

```
Gly Pro Val Pro Pro Ser Thr Ala Leu Arg Glu Leu Ile Glu Glu Leu
 1               5                  10                  15
Val Asn Ile Thr Gln Asn Gln Lys Ala Pro Leu Cys Asn Gly Ser Met
             20                  25                  30
Val Trp Ser Ile Asn Leu Thr Ala Gly Met Tyr Cys Ala Ala Leu Glu
         35                  40                  45
Ser Leu Ile Asn Val Ser Gly Cys Ser Ala Ile Glu Lys Thr Gln Arg
     50                  55                  60
Met Leu Ser Gly Phe Cys Pro His Lys Val Ser Ala Gly Gln Phe Ser
 65                  70                  75                  80
Ser Leu His Val Arg Asp Thr Lys Ile Leu Val Ala Gln Phe Val Lys
                 85                  90                  95
Asp Leu Leu Leu His Leu Lys Lys Leu Phe Lys Glu Gly Arg Phe Asn
            100                 105                 110
```

<210> SEQ ID NO 35
<211> LENGTH: 112

```
<212> TYPE: PRT
<213> ORGANISM: Artificial Sequence
<220> FEATURE:
<223> OTHER INFORMATION: IL-13 variant

<400> SEQUENCE: 35

Gly Pro Val Pro Pro Ser Thr Ala Leu Arg Arg Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
            100                 105                 110

<210> SEQ ID NO 36
<211> LENGTH: 112
<212> TYPE: PRT
<213> ORGANISM: Artificial Sequence
<220> FEATURE:
<223> OTHER INFORMATION: IL-13 variant

<400> SEQUENCE: 36

Gly Pro Val Pro Pro Ser Thr Ala Leu Arg Glu Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu Leu His Leu Lys Lys Leu Phe Arg Glu Gly Arg

```
                50                  55                  60
Met Leu Ser Gly Phe Cys Pro His Lys Val Ser Ala Gly Gln Phe Ser
 65                  70                  75                  80

Ser Leu His Val Arg Asp Thr Lys Ile Glu Val Ala Gln Phe Val Lys
                     85                  90                  95

Asp Leu Leu His Leu Lys Lys Leu Phe Lys Glu Gly Arg Phe Asn
                100                 105                 110

<210> SEQ ID NO 38
<211> LENGTH: 22
<212> TYPE: PRT
<213> ORGANISM: Homo sapiens

<400> SEQUENCE: 38

Met Leu Leu Leu Val Thr Ser Leu Leu Leu Cys Glu Leu Pro His Pro
 1               5                  10                  15

Ala Phe Leu Leu Ile Pro
                20

<210> SEQ ID NO 39
<211> LENGTH: 524
<212> TYPE: PRT
<213> ORGANISM: Artificial Sequence
<220> FEATURE:
<223> OTHER INFORMATION: Chimeric antigen receptor

<400> SEQUENCE: 39

Pro Val Pro Pro Ser Thr Ala Leu Arg Tyr Leu Ile Glu Glu Leu Val
 1               5                  10                  15

Asn Ile Thr Gln Asn Gln Lys Ala Pro Leu Cys Asn Gly Ser Met Val
                20                  25                  30

Trp Ser Ile Asn Leu Thr Ala Gly Met Tyr Cys Ala Ala Leu Glu Ser
                35                  40                  45

Leu Ile Asn Val Ser Gly Cys Ser Ala Ile Glu Lys Thr Gln Arg Met
         50                  55                  60

Leu Ser Gly Phe Cys Pro His Lys Val Ser Ala Gly Gln Phe Ser Ser
 65                  70                  75                  80

Leu His Val Arg Asp Thr Lys Ile Leu Val Ala Gln Phe Val Lys Asp
                     85                  90                  95

Leu Leu Leu His Leu Lys Lys Leu Phe Lys Glu Gly Arg Phe Asn Glu
                100                 105                 110

Ser Lys Tyr Gly Pro Pro Cys Pro Ser Cys Pro Ala Pro Glu Phe Glu
                115                 120                 125

Gly Gly Pro Ser Val Phe Leu Phe Pro Pro Lys Pro Lys Asp Thr Leu
            130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
                180                 185                 190

Tyr Arg Val Val Ser Val Leu Thr Val Leu His Gln Asp Trp Leu Asn
            195                 200                 205

Gly Lys Glu Tyr Lys Cys Lys Val Ser Asn Lys Gly Leu Pro Ser Ser
        210                 215                 220

Ile Glu Lys Thr Ile Ser Lys Ala Lys Gly Gln Pro Arg Glu Pro Gln
225                 230                 235                 240
```

```
Val Tyr Thr Leu Pro Pro Ser Gln Glu Glu Met Thr Lys Asn Gln Val
            245                 250                 255

Ser Leu Thr Cys Leu Val Lys Gly Phe Tyr Pro Ser Asp Ile Ala Val
        260                 265                 270

Glu Trp Glu Ser Asn Gly Gln Pro Glu Asn Asn Tyr Lys Thr Thr Pro
            275                 280                 285

Pro Val Leu Asp Ser Asp Gly Ser Phe Phe Leu Tyr Ser Arg Leu Thr
290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Phe Trp Val Leu Val Val Val Gly Gly Val Leu Ala
            340                 345                 350

Cys Tyr Ser Leu Leu Val Thr Val Ala Phe Ile Ile Phe Trp Val Lys
        355                 360                 365

Arg Gly Arg Lys Lys Leu Leu Tyr Ile Phe Lys Gln Pro Phe Met Arg
    370                 375                 380

Pro Val Gln Thr Thr Gln Glu Glu Asp Gly Cys Ser Cys Arg Phe Pro
385                 390                 395                 400

Glu Glu Glu Glu Gly Gly Cys Glu Leu Gly Gly Gly Arg Val Lys Phe
                405                 410                 415

Ser Arg Ser Ala Asp Ala Pro Ala Tyr Gln Gln Gly Gln Asn Gln Leu
            420                 425                 430

Tyr Asn Glu Leu Asn Leu Gly Arg Arg Glu Glu Tyr Asp Val Leu Asp
        435                 440                 445

Lys Arg Arg Gly Arg Asp Pro Glu Met Gly Gly Lys Pro Arg Arg Lys
    450                 455                 460

Asn Pro Gln Glu Gly Leu Tyr Asn Glu Leu Gln Lys Asp Lys Met Ala
465                 470                 475                 480

Glu Ala Tyr Ser Glu Ile Gly Met Lys Gly Glu Arg Arg Arg Gly Lys
                485                 490                 495

Gly His Asp Gly Leu Tyr Gln Gly Leu Ser Thr Ala Thr Lys Asp Thr
            500                 505                 510

Tyr Asp Ala Leu His Met Gln Ala Leu Pro Pro Arg
        515                 520

<210> SEQ ID NO 40
<211> LENGTH: 524
<212> TYPE: PRT
<213> ORGANISM: Artificial Sequence
<220> FEATURE:
<223> OTHER INFORMATION: Chimeric antigen receptor

<400> SEQUENCE: 40

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80
```

```
Leu His Val Arg Asp Thr Lys Ile Leu Val Ala Gln Phe Val Lys Asp
                85                  90                  95

Leu Leu Leu His Leu Lys Lys Leu Phe Lys Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Phe Trp Val Leu Val Val Gly Gly Val Leu Ala
            340                 345                 350

Cys Tyr Ser Leu Leu Val Thr Val Ala Phe Ile Ile Phe Trp Val Lys
        355                 360                 365

Arg Gly Arg Lys Lys Leu Leu Tyr Ile Phe Lys Gln Pro Phe Met Arg
    370                 375                 380

Pro Val Gln Thr Thr Gln Glu Glu Asp Gly Cys Ser Cys Arg Phe Pro
385                 390                 395                 400

Glu Glu Glu Glu Gly Gly Cys Glu Leu Gly Gly Gly Arg Val Lys Phe
                405                 410                 415

Ser Arg Ser Ala Asp Ala Pro Ala Tyr Gln Gln Gly Gln Asn Gln Leu
            420                 425                 430

Tyr Asn Glu Leu Asn Leu Gly Arg Glu Glu Tyr Asp Val Leu Asp
        435                 440                 445

Lys Arg Arg Gly Arg Asp Pro Glu Met Gly Gly Lys Pro Arg Arg Lys
    450                 455                 460

Asn Pro Gln Glu Gly Leu Tyr Asn Glu Leu Gln Lys Asp Lys Met Ala
465                 470                 475                 480

Glu Ala Tyr Ser Glu Ile Gly Met Lys Gly Glu Arg Arg Arg Gly Lys
                485                 490                 495
```

```
Gly His Asp Gly Leu Tyr Gln Gly Leu Ser Thr Ala Thr Lys Asp Thr
                500                 505                 510

Tyr Asp Ala Leu His Met Gln Ala Leu Pro Pro Arg
            515                 520
```

<210> SEQ ID NO 41
<211> LENGTH: 524
<212> TYPE: PRT
<213> ORGANISM: Artificial Sequence
<220> FEATURE:
<223> OTHER INFORMATION: Chimeric antigen receptor

<400> SEQUENCE: 41

```
Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
                20                  25                  30

Trp Ser Ile Asn Leu Thr Ala Gly Met Tyr Cys Ala Ala Leu Glu Ser
            35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
                85                  90                  95

Leu Leu Leu His Leu Lys Lys Leu Phe Arg Glu Gly Arg Phe Asn Glu
                100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
    195                 200                 205

Gly Lys Glu Tyr Lys Cys Lys Val Ser Asn Lys Gly Leu Pro Ser Ser
210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
    275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335
```

Ser Leu Gly Lys Phe Trp Val Leu Val Val Gly Val Leu Ala
            340                 345                 350

Cys Tyr Ser Leu Leu Val Thr Val Ala Phe Ile Ile Phe Trp Val Lys
            355                 360                 365

Arg Gly Arg Lys Lys Leu Leu Tyr Ile Phe Lys Gln Pro Phe Met Arg
            370                 375                 380

Pro Val Gln Thr Thr Gln Glu Glu Asp Gly Cys Ser Cys Arg Phe Pro
385                 390                 395                 400

Glu Glu Glu Glu Gly Gly Cys Glu Leu Gly Gly Gly Arg Val Lys Phe
                    405                 410                 415

Ser Arg Ser Ala Asp Ala Pro Ala Tyr Gln Gln Gly Gln Asn Gln Leu
            420                 425                 430

Tyr Asn Glu Leu Asn Leu Gly Arg Arg Glu Glu Tyr Asp Val Leu Asp
            435                 440                 445

Lys Arg Arg Gly Arg Asp Pro Glu Met Gly Gly Lys Pro Arg Arg Lys
            450                 455                 460

Asn Pro Gln Glu Gly Leu Tyr Asn Glu Leu Gln Lys Asp Lys Met Ala
465                 470                 475                 480

Glu Ala Tyr Ser Glu Ile Gly Met Lys Gly Glu Arg Arg Arg Gly Lys
                    485                 490                 495

Gly His Asp Gly Leu Tyr Gln Gly Leu Ser Thr Ala Thr Lys Asp Thr
            500                 505                 510

Tyr Asp Ala Leu His Met Gln Ala Leu Pro Pro Arg
            515                 520

<210> SEQ ID NO 42
<211> LENGTH: 524
<212> TYPE: PRT
<213> ORGANISM: Artificial Sequence
<220> FEATURE:
<223> OTHER INFORMATION: Chimeric antigen receptor

<400> SEQUENCE: 42

Pro Val Pro Pro Ser Thr Ala Leu Arg Tyr Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
            35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
            85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
            130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                    165                 170                 175

```
Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Phe Trp Val Leu Val Val Val Gly Gly Val Leu Ala
            340                 345                 350

Cys Tyr Ser Leu Leu Val Thr Val Ala Phe Ile Ile Phe Trp Val Lys
            355                 360                 365

Arg Gly Arg Lys Lys Leu Leu Tyr Ile Phe Lys Gln Pro Phe Met Arg
        370                 375                 380

Pro Val Gln Thr Thr Gln Glu Glu Asp Gly Cys Ser Cys Arg Phe Pro
385                 390                 395                 400

Glu Glu Glu Glu Gly Gly Cys Glu Leu Gly Gly Arg Val Lys Phe
                405                 410                 415

Ser Arg Ser Ala Asp Ala Pro Ala Tyr Gln Gln Gly Gln Asn Gln Leu
            420                 425                 430

Tyr Asn Glu Leu Asn Leu Gly Arg Arg Glu Glu Tyr Asp Val Leu Asp
        435                 440                 445

Lys Arg Arg Gly Arg Asp Pro Glu Met Gly Gly Lys Pro Arg Arg Lys
    450                 455                 460

Asn Pro Gln Glu Gly Leu Tyr Asn Glu Leu Gln Lys Asp Lys Met Ala
465                 470                 475                 480

Glu Ala Tyr Ser Glu Ile Gly Met Lys Gly Glu Arg Arg Arg Gly Lys
                485                 490                 495

Gly His Asp Gly Leu Tyr Gln Gly Leu Ser Thr Ala Thr Lys Asp Thr
            500                 505                 510

Tyr Asp Ala Leu His Met Gln Ala Leu Pro Pro Arg
        515                 520

<210> SEQ ID NO 43
<211> LENGTH: 524
<212> TYPE: PRT
<213> ORGANISM: Artificial Sequence
<220> FEATURE:
<223> OTHER INFORMATION: Chimeric antigen receptor

<400> SEQUENCE: 43

Pro Val Pro Pro Ser Thr Ala Leu Arg Glu Leu Ile Glu Glu Leu Val
1               5                   10                  15
```

-continued

```
Asn Ile Thr Gln Asn Gln Lys Ala Pro Leu Cys Asn Gly Ser Met Val
             20                  25                  30

Trp Ser Ile Asn Leu Thr Ala Gly Met Tyr Cys Ala Ala Leu Glu Ser
         35                  40                  45

Leu Ile Asn Val Ser Gly Cys Ser Ala Ile Glu Lys Thr Gln Arg Met
 50                  55                  60

Leu Ser Gly Phe Cys Pro His Lys Val Ser Ala Gly Gln Phe Ser Ser
 65                  70                  75                  80

Leu His Val Arg Asp Thr Lys Ile Leu Val Ala Gln Phe Val Lys Asp
                 85                  90                  95

Leu Leu Leu His Leu Lys Lys Leu Phe Lys Glu Gly Arg Phe Asn Glu
                100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
                180                 185                 190

Tyr Arg Val Val Ser Val Leu Thr Val Leu His Gln Asp Trp Leu Asn
            195                 200                 205

Gly Lys Glu Tyr Lys Cys Lys Val Ser Asn Lys Gly Leu Pro Ser Ser
210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Phe Trp Val Leu Val Val Val Gly Gly Val Leu Ala
            340                 345                 350

Cys Tyr Ser Leu Leu Val Thr Val Ala Phe Ile Ile Phe Trp Val Lys
        355                 360                 365

Arg Gly Arg Lys Lys Leu Leu Tyr Ile Phe Lys Gln Pro Phe Met Arg
    370                 375                 380

Pro Val Gln Thr Thr Gln Glu Glu Asp Gly Cys Ser Cys Arg Phe Pro
385                 390                 395                 400

Glu Glu Glu Glu Gly Gly Cys Glu Leu Gly Gly Arg Val Lys Phe
                405                 410                 415

Ser Arg Ser Ala Asp Ala Pro Ala Tyr Gln Gln Gly Gln Asn Gln Leu
            420                 425                 430

Tyr Asn Glu Leu Asn Leu Gly Arg Arg Glu Glu Tyr Asp Val Leu Asp
```

```
                435                 440                 445
Lys Arg Arg Gly Arg Asp Pro Glu Met Gly Gly Lys Pro Arg Lys
    450                 455                 460

Asn Pro Gln Glu Gly Leu Tyr Asn Glu Leu Gln Lys Asp Lys Met Ala
465                 470                 475                 480

Glu Ala Tyr Ser Glu Ile Gly Met Lys Gly Glu Arg Arg Arg Gly Lys
                485                 490                 495

Gly His Asp Gly Leu Tyr Gln Gly Leu Ser Thr Ala Thr Lys Asp Thr
                500                 505                 510

Tyr Asp Ala Leu His Met Gln Ala Leu Pro Pro Arg
        515                 520

<210> SEQ ID NO 44
<211> LENGTH: 524
<212> TYPE: PRT
<213> ORGANISM: Artificial Sequence
<220> FEATURE:
<223> OTHER INFORMATION: Chimeric antigen receptor

<400> SEQUENCE: 44

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
50                  55                  60

Leu Ser Gly Phe Cys Pro His Lys Val Ser Ala Gly Gln Phe Ser Ser
65                  70                  75                  80

Leu His Val Arg Asp Thr Lys Ile Glu Val Ala Gln Phe Val Lys Asp
                85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
```

```
                275                 280                 285
Pro Val Leu Asp Ser Asp Gly Ser Phe Phe Leu Tyr Ser Arg Leu Thr
        290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Phe Trp Val Leu Val Val Val Gly Val Leu Ala
            340                 345                 350

Cys Tyr Ser Leu Leu Val Thr Val Ala Phe Ile Ile Phe Trp Val Lys
            355                 360                 365

Arg Gly Arg Lys Lys Leu Leu Tyr Ile Phe Lys Gln Pro Phe Met Arg
        370                 375                 380

Pro Val Gln Thr Thr Gln Glu Glu Asp Gly Cys Ser Cys Arg Phe Pro
385                 390                 395                 400

Glu Glu Glu Glu Gly Gly Cys Glu Leu Gly Gly Arg Val Lys Phe
                405                 410                 415

Ser Arg Ser Ala Asp Ala Pro Ala Tyr Gln Gln Gly Gln Asn Gln Leu
            420                 425                 430

Tyr Asn Glu Leu Asn Leu Gly Arg Arg Glu Glu Tyr Asp Val Leu Asp
        435                 440                 445

Lys Arg Arg Gly Arg Asp Pro Glu Met Gly Gly Lys Pro Arg Arg Lys
450                 455                 460

Asn Pro Gln Glu Gly Leu Tyr Asn Glu Leu Gln Lys Asp Lys Met Ala
465                 470                 475                 480

Glu Ala Tyr Ser Glu Ile Gly Met Lys Gly Glu Arg Arg Arg Gly Lys
                485                 490                 495

Gly His Asp Gly Leu Tyr Gln Gly Leu Ser Thr Ala Thr Lys Asp Thr
            500                 505                 510

Tyr Asp Ala Leu His Met Gln Ala Leu Pro Pro Arg
        515                 520

<210> SEQ ID NO 45
<211> LENGTH: 524
<212> TYPE: PRT
<213> ORGANISM: Artificial Sequence
<220> FEATURE:
<223> OTHER INFORMATION: Chimeric antigen receptor

<400> SEQUENCE: 45

Pro Val Pro Pro Ser Thr Ala Leu Arg Glu Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
                85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
```

```
            115                 120                 125
Gly Gly Pro Ser Val Phe Leu Phe Pro Pro Lys Pro Lys Asp Thr Leu
        130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
                180                 185                 190

Tyr Arg Val Val Ser Val Leu Thr Val Leu His Gln Asp Trp Leu Asn
            195                 200                 205

Gly Lys Glu Tyr Lys Cys Lys Val Ser Asn Lys Gly Leu Pro Ser Ser
        210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
                260                 265                 270

Glu Trp Glu Ser Asn Gly Gln Pro Glu Asn Asn Tyr Lys Thr Thr Pro
            275                 280                 285

Pro Val Leu Asp Ser Asp Gly Ser Phe Phe Leu Tyr Ser Arg Leu Thr
        290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Phe Trp Val Leu Val Val Val Gly Val Leu Ala
                340                 345                 350

Cys Tyr Ser Leu Leu Val Thr Val Ala Phe Ile Ile Phe Trp Val Lys
            355                 360                 365

Arg Gly Arg Lys Lys Leu Leu Tyr Ile Phe Lys Gln Pro Phe Met Arg
        370                 375                 380

Pro Val Gln Thr Thr Gln Glu Glu Asp Gly Cys Ser Cys Arg Phe Pro
385                 390                 395                 400

Glu Glu Glu Glu Gly Gly Cys Glu Leu Gly Gly Arg Val Lys Phe
                405                 410                 415

Ser Arg Ser Ala Asp Ala Pro Ala Tyr Gln Gln Gly Gln Asn Gln Leu
            420                 425                 430

Tyr Asn Glu Leu Asn Leu Gly Arg Arg Glu Glu Tyr Asp Val Leu Asp
        435                 440                 445

Lys Arg Arg Gly Arg Asp Pro Glu Met Gly Gly Lys Pro Arg Arg Lys
        450                 455                 460

Asn Pro Gln Glu Gly Leu Tyr Asn Glu Leu Gln Lys Asp Lys Met Ala
465                 470                 475                 480

Glu Ala Tyr Ser Glu Ile Gly Met Lys Gly Glu Arg Arg Arg Gly Lys
                485                 490                 495

Gly His Asp Gly Leu Tyr Gln Gly Leu Ser Thr Ala Thr Lys Asp Thr
                500                 505                 510

Tyr Asp Ala Leu His Met Gln Ala Leu Pro Pro Arg
            515                 520

<210> SEQ ID NO 46
```

```
<211> LENGTH: 524
<212> TYPE: PRT
<213> ORGANISM: Artificial Sequence
<220> FEATURE:
<223> OTHER INFORMATION: Chimeric antigen receptor

<400> SEQUENCE: 46
```

| | | | | | | | | | | | | | | |
|---|---|---|---|---|---|---|---|---|---|---|---|---|---|---|
|Pro|Val|Pro|Pro|Ser|Thr|Ala|Leu|Arg|Glu|Leu|Ile|Glu|Glu|Leu|Val|
|1| | | |5| | | | |10| | | | |15|

Asn Ile Thr Gln Asn Gln Lys Ala Pro Leu Cys Asn Gly Ser Met Val
                20                  25                  30

Trp Ser Ile Asn Leu Thr Ala Gly Met Tyr Cys Ala Ala Leu Glu Ser
            35                  40                  45

Leu Ile Asn Val Ser Gly Cys Ser Ala Ile Glu Lys Thr Gln Arg Met
 50                  55                  60

Leu Ser Gly Phe Cys Pro His Lys Val Ser Ala Gly Gln Phe Ser Ser
 65                  70                  75                  80

Leu His Val Arg Asp Thr Lys Ile Glu Val Ala Gln Phe Val Lys Asp
                85                  90                  95

Leu Leu Leu His Leu Lys Lys Leu Phe Lys Glu Gly Arg Phe Asn Glu
                100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Phe Trp Val Leu Val Val Val Gly Gly Val Leu Ala
            340                 345                 350

Cys Tyr Ser Leu Leu Val Thr Val Ala Phe Ile Ile Phe Trp Val Lys
        355                 360                 365

Arg Gly Arg Lys Lys Leu Leu Tyr Ile Phe Lys Gln Pro Phe Met Arg
    370                 375                 380

```
Pro Val Gln Thr Thr Gln Glu Glu Asp Gly Cys Ser Cys Arg Phe Pro
385                 390                 395                 400

Glu Glu Glu Glu Gly Gly Cys Glu Leu Gly Gly Arg Val Lys Phe
            405                 410                 415

Ser Arg Ser Ala Asp Ala Pro Tyr Gln Gln Gly Gln Asn Gln Leu
            420                 425                 430

Tyr Asn Glu Leu Asn Leu Gly Arg Arg Glu Glu Tyr Asp Val Leu Asp
        435                 440                 445

Lys Arg Arg Gly Arg Asp Pro Glu Met Gly Gly Lys Pro Arg Arg Lys
450                 455                 460

Asn Pro Gln Glu Gly Leu Tyr Asn Glu Leu Gln Lys Asp Lys Met Ala
465                 470                 475                 480

Glu Ala Tyr Ser Glu Ile Gly Met Lys Gly Glu Arg Arg Arg Gly Lys
                485                 490                 495

Gly His Asp Gly Leu Tyr Gln Gly Leu Ser Thr Ala Thr Lys Asp Thr
                500                 505                 510

Tyr Asp Ala Leu His Met Gln Ala Leu Pro Pro Arg
        515                 520

<210> SEQ ID NO 47
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 47

Pro Val Pro Pro Ser Thr Ala Leu Arg Tyr Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
                85                  90                  95

Leu Leu Leu His Leu Lys Lys Leu Phe Lys Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220
```

```
Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
            245                 250                 255

Ser Leu Thr Cys Leu Val Lys Gly Phe Tyr Pro Ser Asp Ile Ala Val
        260                 265                 270

Glu Trp Glu Ser Asn Gly Gln Pro Glu Asn Asn Tyr Lys Thr Thr Pro
    275                 280                 285

Pro Val Leu Asp Ser Asp Gly Ser Phe Phe Leu Tyr Ser Arg Leu Thr
290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Met Ala Leu Ile Val Leu Gly Gly Val Ala Gly Leu
            340                 345                 350

Leu Leu Phe Ile Gly Leu Gly Ile Phe Phe Arg Ser Lys Arg Ser Arg
        355                 360                 365

Leu Leu His Ser Asp Tyr Met Asn Met Thr Pro Arg Arg Pro Gly Pro
370                 375                 380

Thr Arg Lys His Tyr Gln Pro Tyr Ala Pro Pro Arg Asp Phe Ala Ala
385                 390                 395                 400

Tyr Arg Ser Gly Gly Gly Arg Val Lys Phe Ser Arg Ser Ala Asp Ala
                405                 410                 415

Pro Ala Tyr Gln Gln Gly Gln Asn Gln Leu Tyr Asn Glu Leu Asn Leu
            420                 425                 430

Gly Arg Arg Glu Glu Tyr Asp Val Leu Asp Lys Arg Arg Gly Arg Asp
        435                 440                 445

Pro Glu Met Gly Gly Lys Pro Arg Arg Lys Asn Pro Gln Glu Gly Leu
450                 455                 460

Tyr Asn Glu Leu Gln Lys Asp Lys Met Ala Glu Ala Tyr Ser Glu Ile
465                 470                 475                 480

Gly Met Lys Gly Glu Arg Arg Arg Gly Lys Gly His Asp Gly Leu Tyr
                485                 490                 495

Gln Gly Leu Ser Thr Ala Thr Lys Asp Thr Tyr Asp Ala Leu His Met
            500                 505                 510

Gln Ala Leu Pro Pro Arg
            515

<210> SEQ ID NO 48
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 48

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
50                  55                  60
```

```
Leu Ser Gly Phe Cys Pro His Lys Val Ser Ala Gln Phe Ser Ser
 65                  70                  75                  80

Leu His Val Arg Asp Thr Lys Ile Leu Val Ala Gln Phe Val Lys Asp
                 85                  90                  95

Leu Leu Leu His Leu Lys Lys Leu Phe Lys Glu Gly Arg Phe Asn Glu
             100                 105                 110

Ser Lys Tyr Gly Pro Pro Cys Pro Ser Cys Pro Ala Pro Glu Phe Glu
         115                 120                 125

Gly Gly Pro Ser Val Phe Leu Phe Pro Pro Lys Pro Lys Asp Thr Leu
     130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                 165                 170                 175

Val His Gln Ala Lys Thr Lys Pro Arg Glu Glu Gln Phe Gln Ser Thr
             180                 185                 190

Tyr Arg Val Val Ser Val Leu Thr Val Leu His Gln Asp Trp Leu Asn
         195                 200                 205

Gly Lys Glu Tyr Lys Cys Lys Val Ser Asn Lys Gly Leu Pro Ser Ser
     210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                 245                 250                 255

Ser Leu Thr Cys Leu Val Lys Gly Phe Tyr Pro Ser Asp Ile Ala Val
             260                 265                 270

Glu Trp Glu Ser Asn Gly Gln Pro Glu Asn Asn Tyr Lys Thr Thr Pro
         275                 280                 285

Pro Val Leu Asp Ser Asp Gly Ser Phe Phe Leu Tyr Ser Arg Leu Thr
     290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                 325                 330                 335

Ser Leu Gly Lys Met Ala Leu Ile Val Leu Gly Gly Val Ala Gly Leu
             340                 345                 350

Leu Leu Phe Ile Gly Leu Gly Ile Phe Phe Arg Ser Lys Arg Ser Arg
         355                 360                 365

Leu Leu His Ser Asp Tyr Met Asn Met Thr Pro Arg Arg Pro Gly Pro
     370                 375                 380

Thr Arg Lys His Tyr Gln Pro Tyr Ala Pro Pro Arg Asp Phe Ala Ala
385                 390                 395                 400

Tyr Arg Ser Gly Gly Gly Arg Val Lys Phe Ser Arg Ser Ala Asp Ala
                 405                 410                 415

Pro Ala Tyr Gln Gln Gly Gln Asn Gln Leu Tyr Asn Glu Leu Asn Leu
             420                 425                 430

Gly Arg Arg Glu Glu Tyr Asp Val Leu Asp Lys Arg Arg Gly Arg Asp
         435                 440                 445

Pro Glu Met Gly Gly Lys Pro Arg Arg Lys Asn Pro Gln Glu Gly Leu
     450                 455                 460

Tyr Asn Glu Leu Gln Lys Asp Lys Met Ala Glu Ala Tyr Ser Glu Ile
465                 470                 475                 480
```

```
Gly Met Lys Gly Glu Arg Arg Gly Lys Gly His Asp Gly Leu Tyr
            485                 490                 495

Gln Gly Leu Ser Thr Ala Thr Lys Asp Thr Tyr Asp Ala Leu His Met
            500                 505                 510

Gln Ala Leu Pro Pro Arg
            515

<210> SEQ ID NO 49
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 49

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
                85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320
```

```
Met His Glu Ala Leu His Asn His Tyr Thr Gln Lys Ser Leu Ser Leu
                325                 330                 335

Ser Leu Gly Lys Met Ala Leu Ile Val Leu Gly Gly Val Ala Gly Leu
            340                 345                 350

Leu Leu Phe Ile Gly Leu Gly Ile Phe Phe Arg Ser Lys Arg Ser Arg
        355                 360                 365

Leu Leu His Ser Asp Tyr Met Asn Met Thr Pro Arg Arg Pro Gly Pro
    370                 375                 380

Thr Arg Lys His Tyr Gln Pro Tyr Ala Pro Pro Arg Asp Phe Ala Ala
385                 390                 395                 400

Tyr Arg Ser Gly Gly Gly Arg Val Lys Phe Ser Arg Ser Ala Asp Ala
                405                 410                 415

Pro Ala Tyr Gln Gln Gly Gln Asn Gln Leu Tyr Asn Glu Leu Asn Leu
            420                 425                 430

Gly Arg Arg Glu Glu Tyr Asp Val Leu Asp Lys Arg Arg Gly Arg Asp
        435                 440                 445

Pro Glu Met Gly Gly Lys Pro Arg Arg Lys Asn Pro Gln Glu Gly Leu
    450                 455                 460

Tyr Asn Glu Leu Gln Lys Asp Lys Met Ala Glu Ala Tyr Ser Glu Ile
465                 470                 475                 480

Gly Met Lys Gly Glu Arg Arg Arg Gly Lys Gly His Asp Gly Leu Tyr
                485                 490                 495

Gln Gly Leu Ser Thr Ala Thr Lys Asp Thr Tyr Asp Ala Leu His Met
            500                 505                 510

Gln Ala Leu Pro Pro Arg
        515

<210> SEQ ID NO 50
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 50

Pro Val Pro Pro Ser Thr Ala Leu Arg Tyr Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
                85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160
```

Gln Glu Asp Pro Glu Val Gln Phe Asn Trp Tyr Val Asp Gly Val Glu
              165                 170                 175

Val His Gln Ala Lys Thr Lys Pro Arg Glu Glu Gln Phe Gln Ser Thr
        180                 185                 190

Tyr Arg Val Val Ser Val Leu Thr Val Leu His Gln Asp Trp Leu Asn
    195                 200                 205

Gly Lys Glu Tyr Lys Cys Lys Val Ser Asn Lys Gly Leu Pro Ser Ser
210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Met Ala Leu Ile Val Leu Gly Gly Val Ala Gly Leu
            340                 345                 350

Leu Leu Phe Ile Gly Leu Gly Ile Phe Phe Arg Ser Lys Arg Ser Arg
        355                 360                 365

Leu Leu His Ser Asp Tyr Met Asn Met Thr Pro Arg Arg Pro Gly Pro
    370                 375                 380

Thr Arg Lys His Tyr Gln Pro Tyr Ala Pro Pro Arg Asp Phe Ala Ala
385                 390                 395                 400

Tyr Arg Ser Gly Gly Gly Arg Val Lys Phe Ser Arg Ser Ala Asp Ala
                405                 410                 415

Pro Ala Tyr Gln Gln Gly Gln Asn Gln Leu Tyr Asn Glu Leu Asn Leu
            420                 425                 430

Gly Arg Arg Glu Glu Tyr Asp Val Leu Asp Lys Arg Gly Arg Asp
        435                 440                 445

Pro Glu Met Gly Gly Lys Pro Arg Arg Lys Asn Pro Gln Glu Gly Leu
    450                 455                 460

Tyr Asn Glu Leu Gln Lys Asp Lys Met Ala Glu Ala Tyr Ser Glu Ile
465                 470                 475                 480

Gly Met Lys Gly Glu Arg Arg Arg Gly Lys Gly His Asp Gly Leu Tyr
                485                 490                 495

Gln Gly Leu Ser Thr Ala Thr Lys Asp Thr Tyr Asp Ala Leu His Met
            500                 505                 510

Gln Ala Leu Pro Pro Arg
            515

<210> SEQ ID NO 51
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 51

-continued

```
Pro Val Pro Pro Ser Thr Ala Leu Arg Glu Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
            85                  90                  95

Leu Leu Leu His Leu Lys Lys Leu Phe Lys Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
        130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
        210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
        290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Met Ala Leu Ile Val Leu Gly Gly Val Ala Gly Leu
            340                 345                 350

Leu Leu Phe Ile Gly Leu Gly Ile Phe Phe Arg Ser Lys Arg Ser Arg
        355                 360                 365

Leu Leu His Ser Asp Tyr Met Asn Met Thr Pro Arg Arg Pro Gly Pro
        370                 375                 380

Thr Arg Lys His Tyr Gln Pro Tyr Ala Pro Pro Arg Asp Phe Ala Ala
385                 390                 395                 400

Tyr Arg Ser Gly Gly Gly Arg Val Lys Phe Ser Arg Ser Ala Asp Ala
                405                 410                 415

Pro Ala Tyr Gln Gln Gly Gln Asn Gln Leu Tyr Asn Glu Leu Asn Leu
```

```
            420                 425                 430
Gly Arg Arg Glu Glu Tyr Asp Val Leu Asp Lys Arg Arg Gly Arg Asp
                435                 440                 445

Pro Glu Met Gly Gly Lys Pro Arg Arg Lys Asn Pro Gln Glu Gly Leu
    450                 455                 460

Tyr Asn Glu Leu Gln Lys Asp Lys Met Ala Glu Ala Tyr Ser Glu Ile
465                 470                 475                 480

Gly Met Lys Gly Glu Arg Arg Arg Gly Lys Gly His Asp Gly Leu Tyr
                485                 490                 495

Gln Gly Leu Ser Thr Ala Thr Lys Asp Thr Tyr Asp Ala Leu His Met
            500                 505                 510

Gln Ala Leu Pro Pro Arg
            515

<210> SEQ ID NO 52
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 52

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
                35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65              70                  75                  80

Leu His Val Arg Asp Thr Lys Ile Glu Val Ala Gln Phe Val Lys Asp
                85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
```

```
                260              265              270
Glu Trp Glu Ser Asn Gly Gln Pro Glu Asn Asn Tyr Lys Thr Thr Pro
            275              280              285

Pro Val Leu Asp Ser Asp Gly Ser Phe Phe Leu Tyr Ser Arg Leu Thr
        290              295              300

Val Asp Lys Ser Arg Trp Gln Glu Gly Asn Val Phe Ser Cys Ser Val
305              310              315              320

Met His Glu Ala Leu His Asn His Tyr Thr Gln Lys Ser Leu Ser Leu
                325              330              335

Ser Leu Gly Lys Met Ala Leu Ile Val Leu Gly Gly Val Ala Gly Leu
            340              345              350

Leu Leu Phe Ile Gly Leu Gly Ile Phe Phe Arg Ser Lys Arg Ser Arg
            355              360              365

Leu Leu His Ser Asp Tyr Met Asn Met Thr Pro Arg Arg Pro Gly Pro
            370              375              380

Thr Arg Lys His Tyr Gln Pro Tyr Ala Pro Pro Arg Asp Phe Ala Ala
385              390              395              400

Tyr Arg Ser Gly Gly Gly Arg Val Lys Phe Ser Arg Ser Ala Asp Ala
                405              410              415

Pro Ala Tyr Gln Gln Gly Gln Asn Gln Leu Tyr Asn Glu Leu Asn Leu
            420              425              430

Gly Arg Arg Glu Glu Tyr Asp Val Leu Asp Lys Arg Arg Gly Arg Asp
            435              440              445

Pro Glu Met Gly Gly Lys Pro Arg Arg Lys Asn Pro Gln Glu Gly Leu
        450              455              460

Tyr Asn Glu Leu Gln Lys Asp Lys Met Ala Glu Ala Tyr Ser Glu Ile
465              470              475              480

Gly Met Lys Gly Glu Arg Arg Arg Gly Lys Gly His Asp Gly Leu Tyr
                485              490              495

Gln Gly Leu Ser Thr Ala Thr Lys Asp Thr Tyr Asp Ala Leu His Met
            500              505              510

Gln Ala Leu Pro Pro Arg
        515

<210> SEQ ID NO 53
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 53

Pro Val Pro Pro Ser Thr Ala Leu Arg Glu Leu Ile Glu Glu Leu Val
1               5                10               15

Asn Ile Thr Gln Asn Gln Lys Ala Pro Leu Cys Asn Gly Ser Met Val
            20               25               30

Trp Ser Ile Asn Leu Thr Ala Gly Met Tyr Cys Ala Ala Leu Glu Ser
            35               40               45

Leu Ile Asn Val Ser Gly Cys Ser Ala Ile Glu Lys Thr Gln Arg Met
        50               55               60

Leu Ser Gly Phe Cys Pro His Lys Val Ser Ala Gly Gln Phe Ser Ser
65               70               75               80

Leu His Val Arg Asp Thr Lys Ile Leu Val Ala Gln Phe Val Lys Asp
                85               90               95

Leu Leu Leu His Leu Lys Lys Leu Phe Arg Glu Gly Arg Phe Asn Glu
```

```
                100                 105                 110
    Ser Lys Tyr Gly Pro Pro Cys Pro Ser Cys Pro Ala Pro Glu Phe Glu
            115                 120                 125
    Gly Gly Pro Ser Val Phe Leu Phe Pro Pro Lys Pro Lys Asp Thr Leu
            130                 135                 140
    Met Ile Ser Arg Thr Pro Glu Val Thr Cys Val Val Val Asp Val Ser
    145                 150                 155                 160
    Gln Glu Asp Pro Glu Val Gln Phe Asn Trp Tyr Val Asp Gly Val Glu
                    165                 170                 175
    Val His Gln Ala Lys Thr Lys Pro Arg Glu Glu Gln Phe Gln Ser Thr
            180                 185                 190
    Tyr Arg Val Val Ser Val Leu Thr Val Leu His Gln Asp Trp Leu Asn
            195                 200                 205
    Gly Lys Glu Tyr Lys Cys Lys Val Ser Asn Lys Gly Leu Pro Ser Ser
            210                 215                 220
    Ile Glu Lys Thr Ile Ser Lys Ala Lys Gly Gln Pro Arg Glu Pro Gln
    225                 230                 235                 240
    Val Tyr Thr Leu Pro Pro Ser Gln Glu Glu Met Thr Lys Asn Gln Val
                    245                 250                 255
    Ser Leu Thr Cys Leu Val Lys Gly Phe Tyr Pro Ser Asp Ile Ala Val
            260                 265                 270
    Glu Trp Glu Ser Asn Gly Gln Pro Glu Asn Asn Tyr Lys Thr Thr Pro
            275                 280                 285
    Pro Val Leu Asp Ser Asp Gly Ser Phe Phe Leu Tyr Ser Arg Leu Thr
            290                 295                 300
    Val Asp Lys Ser Arg Trp Gln Glu Gly Asn Val Phe Ser Cys Ser Val
    305                 310                 315                 320
    Met His Glu Ala Leu His Asn His Tyr Thr Gln Lys Ser Leu Ser Leu
                    325                 330                 335
    Ser Leu Gly Lys Met Ala Leu Ile Val Leu Gly Gly Val Ala Gly Leu
            340                 345                 350
    Leu Leu Phe Ile Gly Leu Gly Ile Phe Phe Arg Ser Lys Arg Ser Arg
            355                 360                 365
    Leu Leu His Ser Asp Tyr Met Asn Met Thr Pro Arg Arg Pro Gly Pro
            370                 375                 380
    Thr Arg Lys His Tyr Gln Pro Tyr Ala Pro Pro Arg Asp Phe Ala Ala
    385                 390                 395                 400
    Tyr Arg Ser Gly Gly Gly Arg Val Lys Phe Ser Arg Ser Ala Asp Ala
                    405                 410                 415
    Pro Ala Tyr Gln Gln Gly Gln Asn Gln Leu Tyr Asn Glu Leu Asn Leu
            420                 425                 430
    Gly Arg Arg Glu Glu Tyr Asp Val Leu Asp Lys Arg Arg Gly Arg Asp
            435                 440                 445
    Pro Glu Met Gly Gly Lys Pro Arg Arg Lys Asn Pro Gln Glu Gly Leu
            450                 455                 460
    Tyr Asn Glu Leu Gln Lys Asp Lys Met Ala Glu Ala Tyr Ser Glu Ile
    465                 470                 475                 480
    Gly Met Lys Gly Glu Arg Arg Arg Gly Lys Gly His Asp Gly Leu Tyr
                    485                 490                 495
    Gln Gly Leu Ser Thr Ala Thr Lys Asp Thr Tyr Asp Ala Leu His Met
            500                 505                 510
    Gln Ala Leu Pro Pro Arg
            515
```

<210> SEQ ID NO 54
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 54

```
Pro Val Pro Pro Ser Thr Ala Leu Arg Glu Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Glu Val Ala Gln Phe Val Lys Asp
                85                  90                  95

Leu Leu Leu His Leu Lys Lys Leu Phe Lys Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Met Ala Leu Ile Val Leu Gly Gly Val Ala Gly Leu
            340                 345                 350

Leu Leu Phe Ile Gly Leu Gly Ile Phe Phe Arg Ser Lys Arg Ser Arg
        355                 360                 365
```

-continued

```
Leu Leu His Ser Asp Tyr Met Asn Met Thr Pro Arg Arg Pro Gly Pro
    370                 375                 380

Thr Arg Lys His Tyr Gln Pro Tyr Ala Pro Pro Arg Asp Phe Ala Ala
385                 390                 395                 400

Tyr Arg Ser Gly Gly Gly Arg Val Lys Phe Ser Arg Ser Ala Asp Ala
                405                 410                 415

Pro Ala Tyr Gln Gln Gly Gln Asn Gln Leu Tyr Asn Glu Leu Asn Leu
                420                 425                 430

Gly Arg Arg Glu Glu Tyr Asp Val Leu Asp Lys Arg Gly Arg Asp
            435                 440                 445

Pro Glu Met Gly Gly Lys Pro Arg Arg Lys Asn Pro Gln Glu Gly Leu
            450                 455                 460

Tyr Asn Glu Leu Gln Lys Asp Lys Met Ala Glu Ala Tyr Ser Glu Ile
465                 470                 475                 480

Gly Met Lys Gly Glu Arg Arg Arg Gly Lys Gly His Asp Gly Leu Tyr
                485                 490                 495

Gln Gly Leu Ser Thr Ala Thr Lys Asp Thr Tyr Asp Ala Leu His Met
                500                 505                 510

Gln Ala Leu Pro Pro Arg
            515
```

<210> SEQ ID NO 55
<211> LENGTH: 519
<212> TYPE: PRT
<213> ORGANISM: Artificial Sequence
<220> FEATURE:
<223> OTHER INFORMATION: Chimeric antigen receptor

<400> SEQUENCE: 55

```
Pro Val Pro Pro Ser Thr Ala Leu Arg Tyr Leu Ile Glu Glu Leu Val
1               5                   10                  15

Asn Ile Thr Gln Asn Gln Lys Ala Pro Leu Cys Asn Gly Ser Met Val
                20                  25                  30

Trp Ser Ile Asn Leu Thr Ala Gly Met Tyr Cys Ala Ala Leu Glu Ser
            35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
                85                  90                  95

Leu Leu Leu His Leu Lys Lys Leu Phe Lys Glu Gly Arg Phe Asn Glu
                100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
        130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205
```

```
Gly Lys Glu Tyr Lys Cys Lys Val Ser Asn Lys Gly Leu Pro Ser Ser
        210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Met Ala Leu Ile Val Leu Gly Gly Val Ala Gly Leu
            340                 345                 350

Leu Leu Phe Ile Gly Leu Gly Ile Phe Phe Lys Arg Gly Arg Lys Lys
            355                 360                 365

Leu Leu Tyr Ile Phe Lys Gln Pro Phe Met Arg Pro Val Gln Thr Thr
    370                 375                 380

Gln Glu Glu Asp Gly Cys Ser Cys Arg Phe Pro Glu Glu Glu Glu Gly
385                 390                 395                 400

Gly Cys Glu Leu Gly Gly Arg Val Lys Phe Ser Arg Ser Ala Asp
                405                 410                 415

Ala Pro Ala Tyr Gln Gln Gly Gln Asn Gln Leu Tyr Asn Glu Leu Asn
                420                 425                 430

Leu Gly Arg Arg Glu Glu Tyr Asp Val Leu Asp Lys Arg Arg Gly Arg
    435                 440                 445

Asp Pro Glu Met Gly Gly Lys Pro Arg Arg Lys Asn Pro Gln Glu Gly
    450                 455                 460

Leu Tyr Asn Glu Leu Gln Lys Asp Lys Met Ala Glu Ala Tyr Ser Glu
465                 470                 475                 480

Ile Gly Met Lys Gly Glu Arg Arg Arg Gly Lys Gly His Asp Gly Leu
                485                 490                 495

Tyr Gln Gly Leu Ser Thr Ala Thr Lys Asp Thr Tyr Asp Ala Leu His
                500                 505                 510

Met Gln Ala Leu Pro Pro Arg
            515

<210> SEQ ID NO 56
<211> LENGTH: 519
<212> TYPE: PRT
<213> ORGANISM: Artificial Sequence
<220> FEATURE:
<223> OTHER INFORMATION: Chimeric antigen receptor

<400> SEQUENCE: 56

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
                20                  25                  30

Trp Ser Ile Asn Leu Thr Ala Gly Met Tyr Cys Ala Ala Leu Glu Ser
            35                  40                  45
```

```
Leu Ile Asn Val Ser Gly Cys Ser Ala Ile Glu Lys Thr Gln Arg Met
 50                  55                  60

Leu Ser Gly Phe Cys Pro His Lys Val Ser Ala Gly Gln Phe Ser Ser
 65                  70                  75                  80

Leu His Val Arg Asp Thr Lys Ile Leu Val Ala Gln Phe Val Lys Asp
                     85                  90                  95

Leu Leu Leu His Leu Lys Lys Leu Phe Lys Glu Gly Arg Phe Asn Glu
                    100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
        130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Met Ala Leu Ile Val Leu Gly Gly Val Ala Gly Leu
            340                 345                 350

Leu Leu Phe Ile Gly Leu Gly Ile Phe Phe Lys Arg Gly Arg Lys Lys
        355                 360                 365

Leu Leu Tyr Ile Phe Lys Gln Pro Phe Met Arg Pro Val Gln Thr Thr
    370                 375                 380

Gln Glu Glu Asp Gly Cys Ser Cys Arg Phe Pro Glu Glu Glu Glu Gly
385                 390                 395                 400

Gly Cys Glu Leu Gly Gly Gly Arg Val Lys Phe Ser Arg Ser Ala Asp
                405                 410                 415

Ala Pro Ala Tyr Gln Gln Gly Gln Asn Gln Leu Tyr Asn Glu Leu Asn
            420                 425                 430

Leu Gly Arg Arg Glu Glu Tyr Asp Val Leu Asp Lys Arg Arg Gly Arg
        435                 440                 445

Asp Pro Glu Met Gly Gly Lys Pro Arg Arg Lys Asn Pro Gln Glu Gly
    450                 455                 460
```

```
Leu Tyr Asn Glu Leu Gln Lys Asp Lys Met Ala Glu Ala Tyr Ser Glu
465                 470                 475                 480

Ile Gly Met Lys Gly Glu Arg Arg Gly Lys Gly His Asp Gly Leu
                485                 490                 495

Tyr Gln Gly Leu Ser Thr Ala Thr Lys Asp Thr Tyr Asp Ala Leu His
            500                 505                 510

Met Gln Ala Leu Pro Pro Arg
            515

<210> SEQ ID NO 57
<211> LENGTH: 519
<212> TYPE: PRT
<213> ORGANISM: Artificial Sequence
<220> FEATURE:
<223> OTHER INFORMATION: Chimeric antigen receptor

<400> SEQUENCE: 57

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
                85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
290                 295                 300
```

```
Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
            325                 330                 335

Ser Leu Gly Lys Met Ala Leu Ile Val Leu Gly Gly Val Ala Gly Leu
            340                 345                 350

Leu Leu Phe Ile Gly Leu Gly Ile Phe Phe Lys Arg Gly Arg Lys Lys
            355                 360                 365

Leu Leu Tyr Ile Phe Lys Gln Pro Phe Met Arg Pro Val Gln Thr Thr
            370                 375                 380

Gln Glu Glu Asp Gly Cys Ser Cys Arg Phe Pro Glu Glu Glu Glu Gly
385                 390                 395                 400

Gly Cys Glu Leu Gly Gly Gly Arg Val Lys Phe Ser Arg Ser Ala Asp
            405                 410                 415

Ala Pro Ala Tyr Gln Gln Gly Gln Asn Gln Leu Tyr Asn Glu Leu Asn
            420                 425                 430

Leu Gly Arg Arg Glu Glu Tyr Asp Val Leu Asp Lys Arg Arg Gly Arg
            435                 440                 445

Asp Pro Glu Met Gly Gly Lys Pro Arg Arg Lys Asn Pro Gln Glu Gly
            450                 455                 460

Leu Tyr Asn Glu Leu Gln Lys Asp Lys Met Ala Glu Ala Tyr Ser Glu
465                 470                 475                 480

Ile Gly Met Lys Gly Glu Arg Arg Arg Gly Lys Gly His Asp Gly Leu
            485                 490                 495

Tyr Gln Gly Leu Ser Thr Ala Thr Lys Asp Thr Tyr Asp Ala Leu His
            500                 505                 510

Met Gln Ala Leu Pro Pro Arg
            515

<210> SEQ ID NO 58
<211> LENGTH: 519
<212> TYPE: PRT
<213> ORGANISM: Artificial Sequence
<220> FEATURE:
<223> OTHER INFORMATION: Chimeric antigen receptor

<400> SEQUENCE: 58

Pro Val Pro Pro Ser Thr Ala Leu Arg Tyr Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
            35                  40                  45

Leu Ile Asn Val Ser Gly Cys Ser Ala Ile Glu Lys Thr Gln Arg Met
        50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
            85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
        130                 135                 140
```

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
                260                 265                 270

Glu Trp Glu Ser Asn Gly Gln Pro Glu Asn Asn Tyr Lys Thr Thr Pro
            275                 280                 285

Pro Val Leu Asp Ser Asp Gly Ser Phe Phe Leu Tyr Ser Arg Leu Thr
        290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Met Ala Leu Ile Val Leu Gly Gly Val Ala Gly Leu
                340                 345                 350

Leu Leu Phe Ile Gly Leu Gly Ile Phe Phe Lys Arg Gly Arg Lys Lys
            355                 360                 365

Leu Leu Tyr Ile Phe Lys Gln Pro Phe Met Arg Pro Val Gln Thr Thr
        370                 375                 380

Gln Glu Glu Asp Gly Cys Ser Cys Arg Phe Pro Glu Glu Glu Glu Gly
385                 390                 395                 400

Gly Cys Glu Leu Gly Gly Gly Arg Val Lys Phe Ser Arg Ser Ala Asp
                405                 410                 415

Ala Pro Ala Tyr Gln Gln Gly Gln Asn Gln Leu Tyr Asn Glu Leu Asn
            420                 425                 430

Leu Gly Arg Arg Glu Glu Tyr Asp Val Leu Asp Lys Arg Arg Gly Arg
        435                 440                 445

Asp Pro Glu Met Gly Gly Lys Pro Arg Arg Lys Asn Pro Gln Glu Gly
450                 455                 460

Leu Tyr Asn Glu Leu Gln Lys Asp Lys Met Ala Glu Ala Tyr Ser Glu
465                 470                 475                 480

Ile Gly Met Lys Gly Glu Arg Arg Arg Gly Lys Gly His Asp Gly Leu
                485                 490                 495

Tyr Gln Gly Leu Ser Thr Ala Thr Lys Asp Thr Tyr Asp Ala Leu His
            500                 505                 510

Met Gln Ala Leu Pro Pro Arg
        515

<210> SEQ ID NO 59
<211> LENGTH: 517
<212> TYPE: PRT
<213> ORGANISM: Artificial Sequence
<220> FEATURE:
<223> OTHER INFORMATION: Chimeric antigen receptor

<400> SEQUENCE: 59

```
Pro Val Pro Pro Ser Thr Ala Leu Arg Tyr Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65              70                  75                  80

Leu His Val Arg Asp Thr Lys Ile Leu Val Ala Gln Phe Val Lys Asp
                85                  90                  95

Leu Leu Leu His Leu Lys Lys Leu Phe Lys Glu Gly Arg Phe Asn Glu
                100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
        130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Ile Tyr Ile Trp Ala Pro Leu Ala Gly Thr Cys Gly
            340                 345                 350

Val Leu Leu Leu Ser Leu Val Ile Thr Lys Arg Gly Arg Lys Lys Leu
        355                 360                 365

Leu Tyr Ile Phe Lys Gln Pro Phe Met Arg Pro Val Gln Thr Thr Gln
    370                 375                 380

Glu Glu Asp Gly Cys Ser Cys Arg Phe Pro Glu Glu Glu Glu Gly Gly
385                 390                 395                 400

Cys Glu Leu Gly Gly Gly Arg Val Lys Phe Ser Arg Ser Ala Asp Ala
```

```
                        405                 410                 415
Pro Ala Tyr Gln Gln Gly Gln Asn Gln Leu Tyr Asn Glu Leu Asn Leu
            420                 425                 430

Gly Arg Arg Glu Tyr Asp Val Leu Asp Lys Arg Arg Gly Arg Asp Pro
            435                 440                 445

Glu Met Gly Gly Lys Pro Arg Arg Lys Asn Pro Gln Glu Gly Leu Tyr
    450                 455                 460

Asn Glu Leu Gln Lys Asp Lys Met Ala Glu Ala Tyr Ser Glu Ile Gly
465                 470                 475                 480

Met Lys Gly Glu Arg Arg Arg Gly Lys Gly His Asp Gly Leu Tyr Gln
            485                 490                 495

Gly Leu Ser Thr Ala Thr Lys Asp Thr Tyr Asp Ala Leu His Met Gln
            500                 505                 510

Ala Leu Pro Pro Arg
            515

<210> SEQ ID NO 60
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 60

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
            85                  90                  95

Leu Leu Leu His Leu Lys Lys Leu Phe Lys Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
            165                 170                 175

Val His Gln Ala Lys Thr Lys Pro Arg Glu Glu Gln Phe Gln Ser Thr
        180                 185                 190

Tyr Arg Val Val Ser Val Leu Thr Val Leu His Gln Asp Trp Leu Asn
    195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
```

```
                    245                 250                 255
Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
            275                 280                 285

Pro Val Leu Asp Ser Asp Gly Ser Phe Phe Leu Tyr Ser Arg Leu Thr
            290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Ile Tyr Ile Trp Ala Pro Leu Ala Gly Thr Cys Gly
                340                 345                 350

Val Leu Leu Leu Ser Leu Val Ile Thr Lys Arg Gly Arg Lys Lys Leu
                355                 360                 365

Leu Tyr Ile Phe Lys Gln Pro Phe Met Arg Pro Val Gln Thr Thr Gln
            370                 375                 380

Glu Glu Asp Gly Cys Ser Cys Arg Phe Pro Glu Glu Glu Glu Gly Gly
385                 390                 395                 400

Cys Glu Leu Gly Gly Arg Val Lys Phe Ser Arg Ser Ala Asp Ala
                405                 410                 415

Pro Ala Tyr Gln Gln Gly Gln Asn Gln Leu Tyr Asn Glu Leu Asn Leu
            420                 425                 430

Gly Arg Arg Glu Glu Tyr Asp Val Leu Asp Lys Arg Arg Gly Arg Asp
                435                 440                 445

Pro Glu Met Gly Gly Lys Pro Arg Arg Lys Asn Pro Gln Glu Gly Leu
            450                 455                 460

Tyr Asn Glu Leu Gln Lys Asp Lys Met Ala Glu Ala Tyr Ser Glu Ile
465                 470                 475                 480

Gly Met Lys Gly Glu Arg Arg Arg Gly Lys Gly His Asp Gly Leu Tyr
                485                 490                 495

Gln Gly Leu Ser Thr Ala Thr Lys Asp Thr Tyr Asp Ala Leu His Met
                500                 505                 510

Gln Ala Leu Pro Pro Arg
            515

<210> SEQ ID NO 61
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 61

Pro Val Pro Pro Ser Thr Ala Leu Arg Arg Leu Ile Glu Glu Leu Val
1               5                   10                  15

Asn Ile Thr Gln Asn Gln Lys Ala Pro Leu Cys Asn Gly Ser Met Val
                20                  25                  30

Trp Ser Ile Asn Leu Thr Ala Gly Met Tyr Cys Ala Ala Leu Glu Ser
            35                  40                  45

Leu Ile Asn Val Ser Gly Cys Ser Ala Ile Glu Lys Thr Gln Arg Met
            50                  55                  60

Leu Ser Gly Phe Cys Pro His Lys Val Ser Ala Gly Gln Phe Ser Ser
65              70                  75                  80

Leu His Val Arg Asp Thr Lys Ile Leu Val Ala Gln Phe Val Lys Asp
```

```
                    85                  90                  95
Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
            115                 120                 125

Gly Gly Pro Ser Val Phe Leu Phe Pro Pro Lys Pro Lys Asp Thr Leu
130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
            195                 200                 205

Gly Lys Glu Tyr Lys Cys Lys Val Ser Asn Lys Gly Leu Pro Ser Ser
            210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
            275                 280                 285

Pro Val Leu Asp Ser Asp Gly Ser Phe Phe Leu Tyr Ser Arg Leu Thr
290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Ile Tyr Ile Trp Ala Pro Leu Ala Gly Thr Cys Gly
            340                 345                 350

Val Leu Leu Leu Ser Leu Val Ile Thr Lys Arg Gly Arg Lys Lys Leu
            355                 360                 365

Leu Tyr Ile Phe Lys Gln Pro Phe Met Arg Pro Val Gln Thr Thr Gln
370                 375                 380

Glu Glu Asp Gly Cys Ser Cys Arg Phe Pro Glu Glu Glu Glu Gly Gly
385                 390                 395                 400

Cys Glu Leu Gly Gly Gly Arg Val Lys Phe Ser Arg Ser Ala Asp Ala
                405                 410                 415

Pro Ala Tyr Gln Gln Gly Gln Asn Gln Leu Tyr Asn Glu Leu Asn Leu
            420                 425                 430

Gly Arg Arg Glu Glu Tyr Asp Val Leu Asp Lys Arg Arg Gly Arg Asp
            435                 440                 445

Pro Glu Met Gly Gly Lys Pro Arg Arg Lys Asn Pro Gln Glu Gly Leu
450                 455                 460

Tyr Asn Glu Leu Gln Lys Asp Lys Met Ala Glu Ala Tyr Ser Glu Ile
465                 470                 475                 480

Gly Met Lys Gly Glu Arg Arg Arg Gly Lys Gly His Asp Gly Leu Tyr
                485                 490                 495

Gln Gly Leu Ser Thr Ala Thr Lys Asp Thr Tyr Asp Ala Leu His Met
            500                 505                 510
```

Gln Ala Leu Pro Pro Arg
        515

<210> SEQ ID NO 62
<211> LENGTH: 518
<212> TYPE: PRT
<213> ORGANISM: Artificial Sequence
<220> FEATURE:
<223> OTHER INFORMATION: Chimeric antigen receptor

<400> SEQUENCE: 62

Pro Val Pro Pro Ser Thr Ala Leu Arg Tyr Leu Ile Glu Glu Leu Val
1               5                   10                  15

Asn Ile Thr Gln Asn Gln Lys Ala Pro Leu Cys Asn Gly Ser Met Val
            20                  25                  30

Trp Ser Ile Asn Leu Thr Ala Gly Met Tyr Cys Ala Ala Leu Glu Ser
        35                  40                  45

Leu Ile Asn Val Ser Gly Cys Ser Ala Ile Glu Lys Thr Gln Arg Met
    50                  55                  60

Leu Ser Gly Phe Cys Pro His Lys Val Ser Ala Gly Gln Phe Ser Ser
65                  70                  75                  80

Leu His Val Arg Asp Thr Lys Ile Leu Val Ala Gln Phe Val Lys Asp
                85                  90                  95

Leu Leu Leu His Leu Lys Lys Leu Phe Arg Glu Gly Arg Phe Asn Glu
            100                 105                 110

Ser Lys Tyr Gly Pro Pro Cys Pro Ser Cys Pro Ala Pro Glu Phe Glu
        115                 120                 125

Gly Gly Pro Ser Val Phe Leu Phe Pro Pro Lys Pro Lys Asp Thr Leu
    130                 135                 140

Met Ile Ser Arg Thr Pro Glu Val Thr Cys Val Val Val Asp Val Ser
145                 150                 155                 160

Gln Glu Asp Pro Glu Val Gln Phe Asn Trp Tyr Val Asp Gly Val Glu
                165                 170                 175

Val His Gln Ala Lys Thr Lys Pro Arg Glu Glu Gln Phe Gln Ser Thr
            180                 185                 190

Tyr Arg Val Val Ser Val Leu Thr Val Leu His Gln Asp Trp Leu Asn
        195                 200                 205

Gly Lys Glu Tyr Lys Cys Lys Val Ser Asn Lys Gly Leu Pro Ser Ser
    210                 215                 220

Ile Glu Lys Thr Ile Ser Lys Ala Lys Gly Gln Pro Arg Glu Pro Gln
225                 230                 235                 240

Val Tyr Thr Leu Pro Pro Ser Gln Glu Glu Met Thr Lys Asn Gln Val
                245                 250                 255

Ser Leu Thr Cys Leu Val Lys Gly Phe Tyr Pro Ser Asp Ile Ala Val
            260                 265                 270

Glu Trp Glu Ser Asn Gly Gln Pro Glu Asn Asn Tyr Lys Thr Thr Pro
        275                 280                 285

Pro Val Leu Asp Ser Asp Gly Ser Phe Phe Leu Tyr Ser Arg Leu Thr
    290                 295                 300

Val Asp Lys Ser Arg Trp Gln Glu Gly Asn Val Phe Ser Cys Ser Val
305                 310                 315                 320

Met His Glu Ala Leu His Asn His Tyr Thr Gln Lys Ser Leu Ser Leu
                325                 330                 335

Ser Leu Gly Lys Ile Tyr Ile Trp Ala Pro Leu Ala Gly Thr Cys Gly
            340                 345                 350

Val Leu Leu Leu Ser Leu Val Ile Thr Lys Arg Gly Arg Lys Lys Leu
                355                 360                 365

Leu Tyr Ile Phe Lys Gln Pro Phe Met Arg Pro Val Gln Thr Thr Gln
    370                 375                 380

Glu Glu Asp Gly Cys Ser Cys Arg Phe Pro Glu Glu Glu Glu Gly Gly
385                 390                 395                 400

Cys Glu Leu Gly Gly Gly Arg Val Lys Phe Ser Arg Ser Ala Asp Ala
                405                 410                 415

Pro Ala Tyr Gln Gln Gly Gln Asn Gln Leu Tyr Asn Glu Leu Asn Leu
                420                 425                 430

Gly Arg Arg Glu Glu Tyr Asp Val Leu Asp Lys Arg Arg Gly Arg Asp
                435                 440                 445

Pro Glu Met Gly Gly Lys Pro Arg Arg Lys Asn Pro Gln Glu Gly Leu
                450                 455                 460

Tyr Asn Glu Leu Gln Lys Asp Lys Met Ala Glu Ala Tyr Ser Glu Ile
465                 470                 475                 480

Gly Met Lys Gly Glu Arg Arg Arg Gly Lys Gly His Asp Gly Leu Tyr
                485                 490                 495

Gln Gly Leu Ser Thr Ala Thr Lys Asp Thr Tyr Asp Ala Leu His Met
                500                 505                 510

Gln Ala Leu Pro Pro Arg
                515

<210> SEQ ID NO 63
<211> LENGTH: 424
<212> TYPE: PRT
<213> ORGANISM: Artificial
<220> FEATURE:
<223> OTHER INFORMATION: Chimeric antigen receptor

<400> SEQUENCE: 63

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
                20                  25                  30

Val Trp Ser Ile Asn Leu Thr Ala Gly Met Tyr Cys Ala Ala Leu Glu
            35                  40                  45

Ser Leu Ile Asn Val Ser Gly Cys Ser Ala Ile Glu Lys Thr Gln Arg
        50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu Leu His Leu Lys Lys Leu Phe Lys Glu Gly Arg Phe Asn
                100                 105                 110

Glu Ser Lys Tyr Gly Pro Pro Cys Pro Pro Cys Pro Gly Gly Gly Ser
            115                 120                 125

Ser Gly Gly Gly Ser Gly Gly Gln Pro Arg Glu Pro Gln Val Tyr Thr
        130                 135                 140

Leu Pro Pro Ser Gln Glu Glu Met Thr Lys Asn Gln Val Ser Leu Thr
145                 150                 155                 160

Cys Leu Val Lys Gly Phe Tyr Pro Ser Asp Ile Ala Val Glu Trp Glu
                165                 170                 175

Ser Asn Gly Gln Pro Glu Asn Asn Tyr Lys Thr Thr Pro Pro Val Leu
                180                 185                 190

```
Asp Ser Asp Gly Ser Phe Phe Leu Tyr Ser Arg Leu Thr Val Asp Lys
        195                 200                 205

Ser Arg Trp Gln Glu Gly Asn Val Phe Ser Cys Ser Val Met His Glu
210                 215                 220

Ala Leu His Asn His Tyr Thr Gln Lys Ser Leu Ser Leu Ser Leu Gly
225                 230                 235                 240

Lys Phe Trp Val Leu Val Val Gly Val Leu Ala Cys Tyr Ser
            245                 250                 255

Leu Leu Val Thr Val Phe Ile Ile Phe Trp Val Lys Arg Gly Arg Lys
        260                 265                 270

Lys Leu Leu Tyr Ile Phe Lys Gln Pro Phe Met Arg Pro Val Gln Thr
        275                 280                 285

Thr Gln Glu Glu Asp Gly Cys Ser Cys Arg Phe Pro Glu Glu Glu Glu
    290                 295                 300

Gly Gly Cys Glu Leu Gly Gly Arg Val Lys Phe Ser Arg Ser Ala
305                 310                 315                 320

Asp Ala Pro Ala Tyr Gln Gln Gly Gln Asn Gln Leu Tyr Asn Glu Leu
                325                 330                 335

Asn Leu Gly Arg Arg Glu Glu Tyr Asp Val Leu Asp Lys Arg Arg Gly
            340                 345                 350

Arg Asp Pro Glu Met Gly Gly Lys Pro Arg Arg Lys Asn Pro Gln Glu
        355                 360                 365

Gly Leu Tyr Asn Glu Leu Gln Lys Asp Lys Met Ala Glu Ala Tyr Ser
370                 375                 380

Glu Ile Gly Met Lys Gly Glu Arg Arg Arg Gly Lys Gly His Asp Gly
385                 390                 395                 400

Leu Tyr Gln Gly Leu Ser Thr Ala Thr Lys Asp Thr Tyr Asp Ala Leu
                405                 410                 415

His Met Gln Ala Leu Pro Pro Arg
            420

<210> SEQ ID NO 64
<211> LENGTH: 424
<212> TYPE: PRT
<213> ORGANISM: Artificial
<220> FEATURE:
<223> OTHER INFORMATION: Chimeric antigen receptor

<400> SEQUENCE: 64

Gly Pro Val Pro Pro Ser Thr Ala Leu Arg Arg Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu Leu His Leu Lys Lys Leu Phe Lys Glu Gly Arg Phe Asn
            100                 105                 110

Glu Ser Lys Tyr Gly Pro Pro Cys Pro Pro Cys Pro Gly Gly Gly Ser
        115                 120                 125
```

Ser Gly Gly Gly Ser Gly Gly Gln Pro Arg Glu Pro Gln Val Tyr Thr
            130                 135                 140

Leu Pro Pro Ser Gln Glu Met Thr Lys Asn Gln Val Ser Leu Thr
145                 150                 155                 160

Cys Leu Val Lys Gly Phe Tyr Pro Ser Asp Ile Ala Val Glu Trp Glu
                165                 170                 175

Ser Asn Gly Gln Pro Glu Asn Asn Tyr Lys Thr Thr Pro Pro Val Leu
            180                 185                 190

Asp Ser Asp Gly Ser Phe Phe Leu Tyr Ser Arg Leu Thr Val Asp Lys
            195                 200                 205

Ser Arg Trp Gln Glu Gly Asn Val Phe Ser Cys Ser Val Met His Glu
210                 215                 220

Ala Leu His Asn His Tyr Thr Gln Lys Ser Leu Ser Leu Ser Leu Gly
225                 230                 235                 240

Lys Phe Trp Val Leu Val Val Val Gly Gly Val Leu Ala Cys Tyr Ser
                245                 250                 255

Leu Leu Val Thr Val Phe Ile Ile Phe Trp Val Lys Arg Gly Arg Lys
                260                 265                 270

Lys Leu Leu Tyr Ile Phe Lys Gln Pro Phe Met Arg Pro Val Gln Thr
                275                 280                 285

Thr Gln Glu Glu Asp Gly Cys Ser Cys Arg Phe Pro Glu Glu Glu Glu
290                 295                 300

Gly Gly Cys Glu Leu Gly Gly Arg Val Lys Phe Ser Arg Ser Ala
305                 310                 315                 320

Asp Ala Pro Ala Tyr Gln Gln Gly Gln Asn Gln Leu Tyr Asn Glu Leu
                325                 330                 335

Asn Leu Gly Arg Arg Glu Glu Tyr Asp Val Leu Asp Lys Arg Arg Gly
            340                 345                 350

Arg Asp Pro Glu Met Gly Gly Lys Pro Arg Arg Lys Asn Pro Gln Glu
            355                 360                 365

Gly Leu Tyr Asn Glu Leu Gln Lys Asp Lys Met Ala Glu Ala Tyr Ser
370                 375                 380

Glu Ile Gly Met Lys Gly Glu Arg Arg Arg Gly Lys Gly His Asp Gly
385                 390                 395                 400

Leu Tyr Gln Gly Leu Ser Thr Ala Thr Lys Asp Thr Tyr Asp Ala Leu
                405                 410                 415

His Met Gln Ala Leu Pro Pro Arg
            420

<210> SEQ ID NO 65
<211> LENGTH: 425
<212> TYPE: PRT
<213> ORGANISM: Artificial
<220> FEATURE:
<223> OTHER INFORMATION: Chimeric antigen receptor

<400> SEQUENCE: 65

Gly Pro Val Pro Pro Ser Thr Ala Leu Arg Arg Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu Leu His Leu Lys Lys Leu Phe Arg Glu Gly Arg Phe Asn
            100                 105                 110

Glu Ser Lys Tyr Gly Pro Pro Cys Pro Pro Cys Pro Gly Gly Gly Ser
            115                 120                 125

Ser Gly Gly Gly Ser Gly Gln Pro Arg Glu Pro Gln Val Tyr Thr
130                 135                 140

Leu Pro Pro Ser Gln Glu Glu Met Thr Lys Asn Gln Val Ser Leu Thr
145                 150                 155                 160

Cys Leu Val Lys Gly Phe Tyr Pro Ser Asp Ile Ala Val Glu Trp Glu
                165                 170                 175

Ser Asn Gly Gln Pro Glu Asn Asn Tyr Lys Thr Thr Pro Pro Val Leu
            180                 185                 190

Asp Ser Asp Gly Ser Phe Phe Leu Tyr Ser Arg Leu Thr Val Asp Lys
            195                 200                 205

Ser Arg Trp Gln Glu Gly Asn Val Phe Ser Cys Ser Val Met His Glu
210                 215                 220

Ala Leu His Asn His Tyr Thr Gln Lys Ser Leu Ser Leu Ser Leu Gly
225                 230                 235                 240

Lys Phe Trp Val Leu Val Val Gly Gly Val Leu Ala Cys Tyr Ser
                245                 250                 255

Leu Leu Val Thr Val Ala Phe Ile Ile Phe Trp Val Lys Arg Gly Arg
                260                 265                 270

Lys Lys Leu Leu Tyr Ile Phe Lys Gln Pro Phe Met Arg Pro Val Gln
            275                 280                 285

Thr Thr Gln Glu Glu Asp Gly Cys Ser Cys Arg Phe Pro Glu Glu Glu
290                 295                 300

Glu Gly Gly Cys Glu Leu Gly Gly Gly Arg Val Lys Phe Ser Arg Ser
305                 310                 315                 320

Ala Asp Ala Pro Ala Tyr Gln Gln Gly Gln Asn Gln Leu Tyr Asn Glu
            325                 330                 335

Leu Asn Leu Gly Arg Arg Glu Glu Tyr Asp Val Leu Asp Lys Arg Arg
            340                 345                 350

Gly Arg Asp Pro Glu Met Gly Gly Lys Pro Arg Arg Lys Asn Pro Gln
            355                 360                 365

Glu Gly Leu Tyr Asn Glu Leu Gln Lys Asp Lys Met Ala Glu Ala Tyr
            370                 375                 380

Ser Glu Ile Gly Met Lys Gly Glu Arg Arg Arg Gly Lys Gly His Asp
385                 390                 395                 400

Gly Leu Tyr Gln Gly Leu Ser Thr Ala Thr Lys Asp Thr Tyr Asp Ala
                405                 410                 415

Leu His Met Gln Ala Leu Pro Pro Arg
            420                 425

<210> SEQ ID NO 66
<211> LENGTH: 425
<212> TYPE: PRT
<213> ORGANISM: Artificial
<220> FEATURE:
<223> OTHER INFORMATION: Chimeric antigen receptor

<400> SEQUENCE: 66

```
Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
            35                  40                  45

Ser Leu Ile Asn Val Ser Gly Cys Ser Ala Ile Glu Lys Thr Gln Arg
50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu His Leu Lys Lys Leu Phe Arg Glu Gly Arg Phe Asn
            100                 105                 110

Glu Ser Lys Tyr Gly Pro Pro Cys Pro Pro Cys Gly Gly Ser
            115                 120                 125

Ser Gly Gly Gly Ser Gly Gly Gln Pro Arg Glu Pro Gln Val Tyr Thr
    130                 135                 140

Leu Pro Pro Ser Gln Glu Glu Met Thr Lys Asn Gln Val Ser Leu Thr
145                 150                 155                 160

Cys Leu Val Lys Gly Phe Tyr Pro Ser Asp Ile Ala Val Glu Trp Glu
                165                 170                 175

Ser Asn Gly Gln Pro Glu Asn Asn Tyr Lys Thr Thr Pro Pro Val Leu
            180                 185                 190

Asp Ser Asp Gly Ser Phe Phe Leu Tyr Ser Arg Leu Thr Val Asp Lys
            195                 200                 205

Ser Arg Trp Gln Glu Gly Asn Val Phe Ser Cys Ser Val Met His Glu
    210                 215                 220

Ala Leu His Asn His Tyr Thr Gln Lys Ser Leu Ser Leu Ser Leu Gly
225                 230                 235                 240

Lys Phe Trp Val Leu Val Val Gly Gly Val Leu Ala Cys Tyr Ser
                245                 250                 255

Leu Leu Val Thr Val Ala Phe Ile Ile Phe Trp Val Lys Arg Gly Arg
                260                 265                 270

Lys Lys Leu Leu Tyr Ile Phe Lys Gln Pro Phe Met Arg Pro Val Gln
            275                 280                 285

Thr Thr Gln Glu Glu Asp Gly Cys Ser Cys Arg Phe Pro Glu Glu Glu
    290                 295                 300

Glu Gly Gly Cys Glu Leu Gly Gly Gly Arg Val Lys Phe Ser Arg Ser
305                 310                 315                 320

Ala Asp Ala Pro Ala Tyr Gln Gln Gly Gln Asn Gln Leu Tyr Asn Glu
                325                 330                 335

Leu Asn Leu Gly Arg Arg Glu Glu Tyr Asp Val Leu Asp Lys Arg Arg
            340                 345                 350

Gly Arg Asp Pro Glu Met Gly Gly Lys Pro Arg Arg Lys Asn Pro Gln
            355                 360                 365

Glu Gly Leu Tyr Asn Glu Leu Gln Lys Asp Lys Met Ala Glu Ala Tyr
    370                 375                 380

Ser Glu Ile Gly Met Lys Gly Glu Arg Arg Arg Gly Lys Gly His Asp
385                 390                 395                 400

Gly Leu Tyr Gln Gly Leu Ser Thr Ala Thr Lys Asp Thr Tyr Asp Ala
                405                 410                 415
```

Leu His Met Gln Ala Leu Pro Pro Arg
            420             425

<210> SEQ ID NO 67
<211> LENGTH: 425
<212> TYPE: PRT
<213> ORGANISM: Artificial
<220> FEATURE:
<223> OTHER INFORMATION: Chimeric antigen receptor

<400> SEQUENCE: 67

Gly Pro Val Pro Ser Thr Ala Leu Arg Glu Leu Ile Glu Glu Leu
1               5                   10                  15

Val Asn Ile Thr Gln Asn Gln Lys Ala Pro Leu Cys Asn Gly Ser Met
                20                  25                  30

Val Trp Ser Ile Asn Leu Thr Ala Gly Met Tyr Cys Ala Ala Leu Glu
            35                  40                  45

Ser Leu Ile Asn Val Ser Gly Cys Ser Ala Ile Glu Lys Thr Gln Arg
        50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu Leu His Leu Lys Lys Leu Phe Lys Glu Gly Arg Phe Asn
            100                 105                 110

Glu Ser Lys Tyr Gly Pro Pro Cys Pro Pro Cys Gly Gly Gly Ser
        115                 120                 125

Ser Gly Gly Gly Ser Gly Gly Gln Pro Arg Glu Pro Gln Val Tyr Thr
    130                 135                 140

Leu Pro Pro Ser Gln Glu Glu Met Thr Lys Asn Gln Val Ser Leu Thr
145                 150                 155                 160

Cys Leu Val Lys Gly Phe Tyr Pro Ser Asp Ile Ala Val Glu Trp Glu
                165                 170                 175

Ser Asn Gly Gln Pro Glu Asn Asn Tyr Lys Thr Thr Pro Pro Val Leu
            180                 185                 190

Asp Ser Asp Gly Ser Phe Phe Leu Tyr Ser Arg Leu Thr Val Asp Lys
        195                 200                 205

Ser Arg Trp Gln Glu Gly Asn Val Phe Ser Cys Ser Val Met His Glu
    210                 215                 220

Ala Leu His Asn His Tyr Thr Gln Lys Ser Leu Ser Leu Ser Leu Gly
225                 230                 235                 240

Lys Phe Trp Val Leu Val Val Val Gly Gly Val Leu Ala Cys Tyr Ser
                245                 250                 255

Leu Leu Val Thr Val Ala Phe Ile Ile Phe Trp Val Lys Arg Gly Arg
            260                 265                 270

Lys Lys Leu Leu Tyr Ile Phe Lys Gln Pro Phe Met Arg Pro Val Gln
        275                 280                 285

Thr Thr Gln Glu Glu Asp Gly Cys Ser Cys Arg Phe Pro Glu Glu Glu
    290                 295                 300

Glu Gly Gly Cys Glu Leu Gly Gly Gly Arg Val Lys Phe Ser Arg Ser
305                 310                 315                 320

Ala Asp Ala Pro Ala Tyr Gln Gln Gly Gln Asn Gln Leu Tyr Asn Glu
                325                 330                 335

Leu Asn Leu Gly Arg Arg Glu Glu Tyr Asp Val Leu Asp Lys Arg Arg
            340                 345                 350

-continued

Gly Arg Asp Pro Glu Met Gly Gly Lys Pro Arg Arg Lys Asn Pro Gln
            355                 360                 365

Glu Gly Leu Tyr Asn Glu Leu Gln Lys Asp Lys Met Ala Glu Ala Tyr
            370                 375                 380

Ser Glu Ile Gly Met Lys Gly Glu Arg Arg Arg Gly Lys Gly His Asp
385                 390                 395                 400

Gly Leu Tyr Gln Gly Leu Ser Thr Ala Thr Lys Asp Thr Tyr Asp Ala
            405                 410                 415

Leu His Met Gln Ala Leu Pro Pro Arg
            420                 425

<210> SEQ ID NO 68
<211> LENGTH: 425
<212> TYPE: PRT
<213> ORGANISM: Artificial
<220> FEATURE:
<223> OTHER INFORMATION: Chimeric antigen receptor

<400> SEQUENCE: 68

Gly Pro Val Pro Pro Ser Thr Ala Leu Arg Glu Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
            35                  40                  45

Ser Leu Ile Asn Val Ser Gly Cys Ser Ala Ile Glu Lys Thr Gln Arg
        50                  55                  60

Met Leu Ser Gly Phe Cys Pro His Lys Val Ser Ala Gly Gln Phe Ser
65                  70                  75                  80

Ser Leu His Val Arg Asp Thr Lys Ile Leu Val Ala Gln Phe Val Lys
                85                  90                  95

Asp Leu Leu His Leu Lys Lys Leu Phe Arg Glu Gly Arg Phe Asn
                100                 105                 110

Glu Ser Lys Tyr Gly Pro Pro Cys Pro Pro Cys Pro Gly Gly Gly Ser
            115                 120                 125

Ser Gly Gly Gly Ser Gly Gly Gln Pro Arg Glu Pro Gln Val Tyr Thr
    130                 135                 140

Leu Pro Pro Ser Gln Glu Glu Met Thr Lys Asn Gln Val Ser Leu Thr
145                 150                 155                 160

Cys Leu Val Lys Gly Phe Tyr Pro Ser Asp Ile Ala Val Glu Trp Glu
                165                 170                 175

Ser Asn Gly Gln Pro Glu Asn Asn Tyr Lys Thr Thr Pro Pro Val Leu
            180                 185                 190

Asp Ser Asp Gly Ser Phe Phe Leu Tyr Ser Arg Leu Thr Val Asp Lys
            195                 200                 205

Ser Arg Trp Gln Glu Gly Asn Val Phe Ser Cys Ser Val Met His Glu
    210                 215                 220

Ala Leu His Asn His Tyr Thr Gln Lys Ser Leu Ser Leu Ser Leu Gly
225                 230                 235                 240

Lys Phe Trp Val Leu Val Val Val Gly Gly Val Leu Ala Cys Tyr Ser
                245                 250                 255

Leu Leu Val Thr Val Ala Phe Ile Ile Phe Trp Val Lys Arg Gly Arg
            260                 265                 270

Lys Lys Leu Leu Tyr Ile Phe Lys Gln Pro Phe Met Arg Pro Val Gln
            275                 280                 285

```
Thr Thr Gln Glu Glu Asp Gly Cys Ser Cys Arg Phe Pro Glu Glu Glu
    290                 295                 300

Glu Gly Gly Cys Glu Leu Gly Gly Gly Arg Val Lys Phe Ser Arg Ser
305                 310                 315                 320

Ala Asp Ala Pro Ala Tyr Gln Gln Gly Gln Asn Gln Leu Tyr Asn Glu
                325                 330                 335

Leu Asn Leu Gly Arg Arg Glu Glu Tyr Asp Val Leu Asp Lys Arg Arg
            340                 345                 350

Gly Arg Asp Pro Glu Met Gly Gly Lys Pro Arg Arg Lys Asn Pro Gln
        355                 360                 365

Glu Gly Leu Tyr Asn Glu Leu Gln Lys Asp Lys Met Ala Glu Ala Tyr
    370                 375                 380

Ser Glu Ile Gly Met Lys Gly Glu Arg Arg Arg Gly Lys Gly His Asp
385                 390                 395                 400

Gly Leu Tyr Gln Gly Leu Ser Thr Ala Thr Lys Asp Thr Tyr Asp Ala
                405                 410                 415

Leu His Met Gln Ala Leu Pro Pro Arg
                420                 425

<210> SEQ ID NO 69
<211> LENGTH: 112
<212> TYPE: PRT
<213> ORGANISM: Artificial
<220> FEATURE:
<223> OTHER INFORMATION: IL3 E13Y variant

<400> SEQUENCE: 69

Gly Pro Val Pro Pro Ser Thr Ala Leu Arg Tyr Leu Ile Glu Glu Leu
1               5                   10                  15

Val Asn Ile Thr Gln Asn Gln Lys Ala Pro Leu Cys Asn Gly Ser Met
            20                  25                  30

Val Trp Ser Ile Asn Leu Thr Ala Gly Met Tyr Cys Ala Ala Leu Glu
        35                  40                  45

Ser Leu Ile Asn Val Ser Gly Cys Ser Ala Ile Glu Lys Thr Gln Arg
    50                  55                  60

Met Leu Ser Gly Phe Cys Pro His Lys Val Ser Ala Gly Gln Phe Ser
65                  70                  75                  80

Ser Leu His Val Arg Asp Thr Lys Ile Glu Val Ala Gln Phe Val Lys
                85                  90                  95

Asp Leu Leu Leu His Leu Lys Lys Leu Phe Arg Glu Gly Arg Phe Asn
            100                 105                 110
```

TARGETED CHIMERIC ANTIGEN RECEPTOR MODIFIED T CELLS FOR TREATMENT OF IL13RALPHA2 POSITIVE MALIGNANCIES

CLAIM OF PRIORITY

This application is a U.S. National Phase Application under 35 U.S.C. § 371 of International Application No. PCT/US2021/022221, filed on Mar. 12, 2021, which claims the benefit of U.S. Provisional Application Ser. No. 62/988,828, filed on Mar. 12, 2020. The entire contents of the foregoing are incorporated herein by reference.

SEQUENCE LISTING

This application contains a Sequence Listing that has been submitted electronically as an ASCII text file named "40056-0054US1_SL_ST25. txt." The ASCII text file, created on Sep. 12, 2022, is 162,601 bytes in size. The material in the ASCII text file is hereby incorporated by reference in its entirety.

TECHNICAL FIELD

This disclosure concerns chimeric antigen receptors (CAR) engineered that bind to IL13 receptor, T cells expressing such CAR, methods of formulating such CART cells and methods of use as anti-cancer agents.

BACKGROUND

IL13Rα2 (Lupardus, Birnbaum et al. 2010), which is a versatile therapeutic target due to its rare expression in normal tissue (Debinski and Gibo *Mol Med* 6:440-449, 2000) and overexpression in many human cancers, including glioblastoma multiforme (GBM) (Thaci, Brown et al. *Neuro Oncol* 16: 1304-1312, 2014), pancreatic ductal adenocarcinoma (Shimamura, Fujisawa et al. *Clin Cancer Res* 16: 577-586, 2010), melanoma (Beard, Abate-Daga et al. *Clin Cancer Res* 19: 4941-4950, 2013), ovarian carcinoma (Kioi, Kawakami et al. Cancer 107: 1407-1418, 2006), clear cell renal cell carcinoma (Shibasaki, Yamasaki et al. *PLoS One* 10: e0130980, 2015), breast cancer (Papageorgis, Ozturk et al. *Breast Cancer Res* 17: 98, 2015), and lung cancer (Xie, Wu et al. *Oncotarget* 6: 32902-32913, 2015). A second IL13 receptor family member, IL13Rα1, interacts with IL13 with lower affinity (Lupardus, Birnbaum et al. *Structure* 18: 332-342, 2010), and is ubiquitously expressed in healthy tissue (Debinski and Gibo Mol Med 6:440-449, 2000). Additionally, IL13Rα1 and IL4Rα, a receptor pair that binds IL13 with high affinity (Lupardus, Birnbaum et al. Structure 18: 332-342, 2010) to mediate signaling through the JAK/STAT6 pathway (Murata, Taguchi et al. *Blood* 91: 3884-3891, 1998), are co-expressed in pulmonary tissue (Hecker, Zaslona et al. 1i American Journal of Respiratory and Critical Care Medicine 182: 805-818, 2010). Despite this wide expression of IL13 binding partners in healthy tissue, an IL13-ligand based CAR has shown safety in humans during clinical trials with locoregional central nervous system (CNS) delivery in GBM (Brown, Badie et al. *Clin Cancer Res* 21: 4062-4072, 2015; Brown, Alizadeh et al. *N Engl J Med* 375: 2561-2569, 2016), suggesting that toxicity from on-target/off-disease binding is not problematic in this context. However, for the treatment of systemic disease, the wide expression of IL13 binding partners outside of the diseased tissue could act as a sink for IL13-based therapy, resulting in safety concerns and possibly impeding trafficking to the disease site. Previous work in the field has attempted to address this problem by generating CARs derived from IL13 mutants containing mutations to direct binding away from IL13Rα1/IL4Rα. Mutations at E13 have yielded improved selectivity for IL13Rα2 over IL13Rα1 (Kahlon, Brown et al. *Cancer Res* 64: 9160-9166, 2004, Krebs, Chow et al. *Cytotherapy* 16, 1121-1131, 2014), albeit with the E11Y mutation still allowing measurable recognition of IL13Rα1 in the context of both recombinant antigen and antigen-expressing cancer cells (Krebs, Chow et al. (Kahlon, Brown et al. *Cancer Res* 64: 9160-9166, 2004, Krebs, Chow et al. *Cytotherapy* 16: 1121-1131, 2014). The addition of both EK and R107K mutations into an IL13-based CAR also showed attenuated, but not abolished, recognition of IL13Rα1-expressing cancer cells relative to IL13Rα2-expressing cancer cells (Kong, Sengupta et al. *Clin Cancer Res* 18: 5949-5960, 2012). While these examples are encouraging, additional mutations will be required to develop an IL13Rα2-specific IL13 mutant. Among the challenges in developing such molecules is that the impact of IL13 mutations on the function of an IL13 containing CAR cannot be predicted.

SUMMARY

Described herein are IL13Rα2 targeted CAR that include a variant IL13 ("variant IL13 CAR") to treat a variety of cancers. The amino acid position of the various mutations described (E11Y, E11R, E90L, and R107K) is relative to the sequence:

```
                                        (SEQ ID NO: 1)
GPVPPSTALR ELIEELVNIT QNQKAPLCNG SMVWSINLTA

GMYCAALESL INVSGCSAIE KTQRMLSGFC PHKVSAGQFS

SLHVRDTKIE VAQFVKDLLL HLKKLFREGR FN
```

Sequence of wild-type human IL13 (signal sequence underlined)

```
                                        (SEQ ID NO: 29)
        10         20         30         40
MHPLLNPLLL ALGLMALLLT TVIALTCLGG FASPGPVPPS 50         60         70         80
TALRELIEEL VNITQNQKAP LCNGSMVWSI NLTAGMYCAA 90        100        110        120
LESLINVSGC SAIEKTQRML SGFCPHKVSA GQFSSLHVRD 130        140
TKIEVAQFVK DLLLHLKKLF REGRFN
```

As shown herein, the E90L mutation increases specificity for IL13Ra2 relative to IL13Ra1. Thus, this mutation can be combined with additional mutations, for example one or more of E11Y, E11R, and R107K. A useful IL-13 variant for inclusion in a CAR can comprise 109, 110, 111, 112, 113 contiguous amino acids of SEQ ID NO: 1 or the entirety of SEQ ID NO: 1 with 1, 2, 3, 4 or 5 single amino acid changes, provided that there is not an E at position 90 of SEQ ID NO:1. Thus, position 90 can be selected from: G, A, L, P, V, I, M, F, Y, W, S, T, C, N, Q, K, R, and H; or can be selected from: G, A, L, P, V, I, M, F, Y, W, S, T, C, N, and Q; or can be selected from: G, A, L, P, V, I, M, F, Y and W; or can be selected from: G, A, L, P, V, I and M; or can be selected from: G, A, L, V, I and M. A useful IL-13 variant for inclusion in a CAR can comprise 109, 110, 111, 112, 113 contiguous amino acids of SEQ ID NO: 1 or the entirety of SEQ ID NO: 1 with 1, 2, 3, 4 or 5 single amino acid changes, provided that there is an L at position 90 of SEQ ID NO:1. Thus, position 90 can be selected from: G, A, L, P, V, I, M, F, Y, W, S, T, C, N, Q, K, R, and H; or can be selected from: G, A, L, P, V, I, M, F, Y, W, S, T, C, N, and Q; or can be selected from: G, A, L, P, V, I, M, F, Y and W; or can be selected from: G, A, L, P, V, I and M; or can be selected from: G, A, L, V, I and M.

The variant IL13 CAR described herein include a variant IL-13 comprising or consisting of the amino acid sequence (mutations compared to wt IL13 are bold and double underline):

```
                                      ("YLK"; SEQ ID NO: 30)
GPVPPSTALRYLIEELVNITQNQKAPLCNGSMVWSINLTAGMY

CAALESLINVSGCSAIEKTQRMLSGFCPHKVSAGQFSSLHVRD

TKILVAQFVKDLLLHLKKLFKEGRFN;
``` or comprising or consisting of the amino acid sequence (mutations compared to wt IL13 are bold and double underline):

```
                                      ("RLK"; SEQ ID NO: 31)
GPVPPSTALRRLIEELVNITQNQKAPLCNGSMVWSINLTAGMY

CAALESLINVSGCSAIEKTQRMLSGFCPHKVSAGQFSSLHVRD

TKILVAQFVKDLLLHLKKLFKEGRFN;
``` or comprising or consisting of the amino acid sequence (mutations compared to wt IL13 are bold and double underline):

```
                                       ("RL"; SEQ ID NO: 32)
GPVPPSTALRRLIEELVNITQNQKAPLCNGSMVWSINLTAGMY

CAALESLINVSGCSAIEKTQRMLSGFCPHKVSAGQFSSLHVRD

TKILVAQFVKDLLLHLKKLFREGRFN;
``` or comprising or consisting of the amino acid sequence (mutations compared to wt IL13 are bold and double underline):

```
                                       ("YL"; SEQ ID NO: 33)
GPVPPSTALRYLIEELVNITQNQKAPLCNGSMVWSINLTAGMY

CAALESLINVSGCSAIEKTQRMLSGFCPHKVSAGQFSSLHVRD

TKILVAQFVKDLLLHLKKLFREGRFN;
``` or comprising or consisting of the amino acid sequence (mutations compared to wt IL13 are bold and double underline):

```
                                       ("LK"; SEQ ID NO: 34)
GPVPPSTALRELIEELVNITQNQKAPLCNGSMVWSINLTAGMY

CAALESLINVSGCSAIEKTQRMLSGFCPHKVSAGQFSSLHVRD

TKILVAQFVKDLLLHLKKLFKEGRFN;
``` or comprising or consisting of the amino acid sequence (mutation compared to wt IL13 is bold and double underline):

```
                                       ("R'"; SEQ ID NO: 35)
GPVPPSTALRRLIEELVNITQNQKAPLCNGSMVWSINLTAGMY

CAALESLINVSGCSAIEKTQRMLSGFCPHKVSAGQFSSLHVRD

TKIEVAQFVKDLLLHLKKLFREGRFN;
``` or comprising or consisting of the amino acid sequence (mutation compared to wt IL13 is bold and double underline):

```
                                        ("L"; SEQ ID NO: 36)
GPVPPSTALRELIEELVNITQNQKAPLCNGSMVWSINLTAGMY

CAALESLINVSGCSAIEKTQRMLSGFCPHKVSAGQFSSLHVRD

TKILVAQFVKDLLLHLKKLFREGRFN;
``` or comprising or consisting of the amino acid sequence (mutations compared to wt IL13 are bold and double underline):

```
                                        ("K"; SEQ ID NO: 37)
GPVPPSTALRELIEELVNITQNQKAPLCNGSMVWSINLTAGMY

CAALESLINVSGCSAIEKTQRMLSGFCPHKVSAGQFSSLHVRD

TKIEVAQFVKDLLLHLKKLFKEGRFN.
```

Described herein is an IL13 CAR comprising a variant IL13 comprising an amino acid sequence selected from selected from SEQ ID NOs: 30-37 (e.g., SEQ ID NOs: 30-34 and 36); a spacer (e.g., comprising any of SEQ ID NOs: 2-12); a transmembrane domain (e.g., comprising any of SEQ ID NOs: 13-20); a co-stimulatory domain (comprising any of SEQ ID NOs: 22-25); optionally a linker of 3-15 amino acids (e.g., GGG); and a CD3 zeta cytoplasmic domain (SEQ ID NO: 21).

Described herein is an IL13 CAR comprising a variant IL13 comprising 113, 112, 111, 110 or 109 contiguous amino acids of an amino acid sequence selected from SEQ ID NOs: 30-37 (e.g., SEQ ID NOs: 30-34 and 36); a spacer (e.g., comprising any of SEQ ID NOs: 2-12); a transmembrane domain (e.g., comprising any of SEQ ID NOs: 13-20); a co-stimulatory domain (comprising any of SEQ ID NOs: 22-25); optionally a linker of 3-15 amino acids (e.g., GGG); and a CD3 zeta cytoplasmic domain (SEQ ID NO: 21).

Described herein is a nucleic acid molecule comprising a nucleotide sequence encoding a chimeric antigen receptor (CAR), wherein the chimeric antigen receptor comprises: a targeting domain comprising an amino acid sequence selected from SEQ ID NOs: 30-37 (e.g., SEQ ID NOs: 30-34 and 36); a spacer, a transmembrane domain; a co-stimulatory domain; and a CD3ζ signaling domain. In various embodiments: the transmembrane domain is selected from: a CD4 transmembrane domain or variant thereof having 1-5 amino acid modifications, a CD8 transmembrane domain or variant thereof having 1-5 amino acid modifications, a CD28 transmembrane domain or a variant thereof having 1-5 amino acid modifications; the wherein the IL13 receptor targeting domain consists of an amino acid sequence selected from SEQ ID NOs: 36-37 (e.g., SEQ ID NOs: 30-34 and 36); the costimulatory domain is selected from: a 41BB costimulatory domain or variant thereof having 1-5 amino acid modifications, a CD28 costimulatory domain or variant thereof having 1-5 amino acid modifications; a CD28gg costimulatory domain or variant thereof having 1-5 amino acid modifications wherein the costimulatory domain is a 41BB costimulatory domain; the 41BB costimulatory domain comprises the amino acid sequence of SEQ ID NO: 24 or a variant thereof having 1-5 amino acid modifications; the CD3ζ signaling domain comprises the amino acid sequence of SEQ ID NO:21; a linker of 3 to 15 amino acids is located between the 4-1BB costimulatory domain and the CD3 signaling domain or variant thereof; the CAR comprises the amino acid sequence of SEQ ID NOs: 30-37 (e.g., SEQ ID NOs: 30-34 and 36) or a variant thereof having 1-5 amino acid modifications; the CAR comprises or consists of an amino acid sequence that is least about 80%, 85%, 90%, 95%, 96%, 97%, 98%, 99%, or 100% identical to any of SEQ ID NO:40-68; the CAR comprises an amino acid sequence that has no more than 5, 4, 3, 2, or 1 single amino acid substitutions and or deletions compared to any of SEQ ID NO: 4-68. Also described is an expression vector comprising any of the forgoing nucleic acid molecules. Also described is a viral vector comprising any of the forgoing nucleic acid molecules.

Also described is a population of human T cells or NK cells containing any of the forgoing nucleic acid molecules. Also described is a population of human T cells containing any of the forgoing expression vectors or viral vectors. In various embodiments, the population of human T cells comprise central memory T cells, naive memory T cells, pan T cells, or PBMC substantially depleted for CD25+ cells and CD14+ cells.

Also described is a method of treating a patient suffering from glioblastoma, pancreatic ductal adenocarcinoma, melanoma, ovarian carcinoma, renal cell carcinoma, breast cancer or lung cancer, comprising administering a population of autologous or allogeneic human T cells harboring a nucleic acid described herein. In various embodiments, the chimeric antigen receptor is administered locally or systemically; and the chimeric antigen receptor is administered by single or repeat dosing.

Also described herein is a method of preparing CART cells comprising: providing a population of autologous or allogeneic human T cells and transducing the T cells by a vector comprising the nucleic acid molecule described herein.

Also described are T cells harboring a vector expressing the variant IL13 CAR. In various embodiments: at least 20%, 30%, or 40% of the transduced human T cells are central memory T cells; at least 30% of the transduced human T cells are CD4+ and CD62L+ or CD8+ and CD62L+. In various embodiments: the population of human T cells comprise a vector expressing a chimeric antigen receptor comprising an amino acid sequence selected from SEQ ID NO: 40-68 or a variant thereof having 1-5 amino acid modifications (e.g., 1 or 2) amino acid modifications (e.g., substitutions); the population of human T cells comprises central memory T cells ($T_{CM}$ cells) e.g., at least 20%, 30%, 40%, 50% 60%, 70%, 80% of the cells are $T_{CM}$ cells, or the population of T cells comprises a combination of central memory T cells, naïve T cells and stem central memory cells ($T_{CM/SCM/N}$ cells) e.g., at least 20%, 30%, 40%, 50% 60%, 70%, 80% of the cells are $T_{CM/SCM/N}$ cells. In some embodiments, the population of T cells includes both CD4+ cells and CD8+ cells (e.g., at least 20% of the CD3+ T cells are CD4+ and at least 3% of the CD3+ T cells are CD8+ and at least 70, 80 or 90% are either CD4+ or CD8+; at least 15%, 20%, 25%, 30%, 35%, 40%, 50%, 60% of the cells CD3+ cells are CD4+ and at least 4%, 5%, 8%, 10%, 20 of the CD3+ cells are CD8+ cells). In some embodiments, the population of human T cells are autologous to the patient. In some embodiments, the population of human T cells are allogenic to the patient.

Described herein is nucleic molecule (e.g., DNA or RNA) comprising a nucleotide sequence encoding a chimeric antigen receptor (CAR), wherein the chimeric antigen receptor comprises: targeting domain comprising an amino acid sequence selected from: SEQ ID NO: 30-37; a spacer domain; a transmembrane domain; a costimulatory domain and a CD3zeta domain.

In various embodiments: the spacer domain is selected from the group consisting of: and IgG4(EQ) spacer domain, a IgG4(HL-CH3) spacer domain and an IgG4(CH3) spacer domain; the spacer domain comprises SEQ ID NO: 10; the spacer domain comprises SEQ ID NO: 9; the spacer domain comprises SEQ ID NO: 12; the transmembrane domain is selected from the group consisting of: a CD4 transmembrane domain, a CD8 transmembrane domain, and a CD28 transmembrane domain; the co-stimulatory domain is selected from a CD28 costimulatory domain, and CD28gg costimulatory domain, and a 41-BB co-stimulatory domain; nucleic acid molecule comprises or consists of an amino acid sequence selected from the group consisting of: SEQ ID NO: 40-68; the CAR comprises or consists of an amino acid sequence selected from the group consisting of: SEQ ID NO: 40-58 wherein the amino acid sequence of SEQ ID NO:10 is replaced by the amino acid sequence of any of SEQ ID NOs:2-9 and 11.

Also disclosed is a nucleic molecule comprising a nucleotide sequence encoding a chimeric antigen receptor (CAR), wherein the chimeric antigen receptor comprises: targeting domain comprising an amino acid sequence comprising a variant IL13 domain comprising 109, 110, 111, 112, 113 contiguous amino acids of SEQ ID NO: 1 or the entirety of SEQ ID NO: 1 with 1, 2, 3, 4 or 5 single amino acid changes, provided that there is an amino acid other than E at position 90 of SEQ ID NO:1; a spacer domain; a transmembrane domain; a costimulatory domain and a CD3zeta domain (e.g., there is an L at position 91 of SEQ ID NO: 1).

In various embodiments: T the spacer domain comprises the amino acid sequence of any of SEQ ID NOs: 2-12; the costimulatory domain comprises the amino acid sequence of any of SEQ ID NOs: 22-25; the CAR comprises the amino acid sequence of any of SEQ ID NOs: 40-68 with 1, 2, 3, 4 or 5 contiguous amino acids deleted; the CAR comprises the amino acid sequence of any of SEQ ID NOs: 40-68 with up to 5 single amino acid substitutions.

Also disclosed is: a vector or an expression vector comprising a nucleic acid molecule described herein; a population of human T cells or NK harboring a nucleic acid molecule described herein. In various embodiments: the population of human T cells comprise central memory T cells, naive memory T cells, pan T cells, or PBMC substantially depleted for CD25+ cells and CD14+ cells.

Also described is a method of treating a patient suffering from glioblastoma, pancreatic ductal adenocarcinoma, melanoma, ovarian carcinoma, renal cell carcinoma, breast cancer or lung cancer, comprising administering a population of autologous or allogeneic cells harboring a nucleic acid molecule described herein. In various embodiments: the cells are administered locally or systemically or intraventricularly; by single or repeat dosing.

Also described is a method of preparing CAR T cells comprising: providing a population of autologous or allogeneic human T cells or NK and transducing the cells with a vector comprising a nucleic acid molecule described herein.

Also described is a polypeptide encoded by a nucleic acid described herein.

IL13Rα2 Targeted CAR

The CAR described herein include a variant IL-13 comprising or consisting of the amino acid sequence: The variant IL13 CAR described herein include a variant IL-13 comprising or consisting of an amino acid sequence selected from:

(E11Y: E90L: R107K; SEQ ID NO: 30)
GPVPPSTALRYLIEELVNITQNQKAPLCNGSMVWSINLTAGMY

CAALESLINVSGCSAIEKTQRMLSGFCPHKVSAGQFSSLHVRD

TKILVAQFVKDLLLHLKKLFKEGRFN;

(E11R: E90L: R107K; SEQ ID NO: 31)
GPVPPSTALRRLIEELVNITQNQKAPLCNGSMVWSINLTAGMY

CAALESLINVSGCSAIEKTQRMLSGFCPHKVSAGQFSSLHVRD

TKILVAQFVKDLLLHLKKLFKEGRFN;

(E11R: E90L; SEQ ID NO: 32)
GPVPPSTALRRLIEELVNITQNQKAPLCNGSMVWSINLTAGMY

CAALESLINVSGCSAIEKTQRMLSGFCPHKVSAGQFSSLHVRD

TKILVAQFVKDLLLHLKKLFREGRFN;

(E11Y: E90L; SEQ ID NO: 33)
GPVPPSTALRYLIEELVNITQNQKAPLCNGSMVWSINLTAGMY

CAALESLINVSGCSAIEKTQRMLSGFCPHKVSAGQFSSLHVRD

TKILVAQFVKDLLLHLKKLFREGRFN;

(E90L: R107K; SEQ ID NO: 34)
GPVPPSTALRELIEELVNITQNQKAPLCNGSMVWSINLTAGMY

CAALESLINVSGCSAIEKTQRMLSGFCPHKVSAGQFSSLHVRD

TKILVAQFVKDLLLHLKKLFKEGRFN;

(E11R; SEQ ID NO: 35)
GPVPPSTALRRLIEELVNITQNQKAPLCNGSMVWSINLTAGMY

CAALESLINVSGCSAIEKTQRMLSGFCPHKVSAGQFSSLHVRD

TKIEVAQFVKDLLLHLKKLFREGRFN;

(E90L; SEQ ID NO: 36)
GPVPPSTALRELIEELVNITQNQKAPLCNGSMVWSINLTAGMY

CAALESLINVSGCSAIEKTQRMLSGFCPHKVSAGQFSSLHVRD

TKILVAQFVKDLLLHLKKLFREGRFN;

(R107K; SEQ ID NO: 37)
GPVPPSTALRELIEELVNITQNQKAPLCNGSMVWSINLTAGMY

CAALESLINVSGCSAIEKTQRMLSGFCPHKVSAGQFSSLHVRD

TKIEVAQFVKDLLLHLKKLFKEGRFN.

A useful IL13 variant CAR can consist of or comprises the amino acid sequence of SEQ ID NO: 40-68 (mature CAR lacking a signal sequence) or the IL13 variant CAR can consist of or comprise the amino acid sequence of SEQ ID NO: 40-68 with the addition of a signal sequence, e.g., human GM-CSF receptor alpha signal sequence (GMCSFRa signal sequence) at the amino terminus (immature CAR). Thus, the CAR and can be expressed in a form that includes a signal sequence, e.g., a GMCSFRa signal sequence (MLLLVTSLLLCELPHPAFLLIP; SEQ ID NO:38). The CAR can be expressed with additional sequences that are useful for monitoring expression, for example, a T2A skip sequence (SEQ ID NO: 26) and a truncated EGFRt (SEQ ID NO: 27). The CAR can be expressed with additional sequences that are useful for monitoring expression, for example, a T2A skip sequence and a truncated CD19t (SEQ ID NO:28). The variant IL13 CAR can comprise or consist of the amino acid sequence of any of SEQ ID NO: 40-68 with up to 1, 2, 3, 4 or 5 amino acid changes (preferably conservative amino acid changes). In some cases, the CAR lacks 1, 2, 3, 4, or 5 of the amino terminal amino acids of any of SEQ ID NOs: 40-68.

In some embodiments, a nucleic acid molecule encoding and of amino acid sequences SEQ ID NO: 40-68 are codon optimized for expression in human cells.

Spacer Region

The CAR described herein can include a spacer located between the variant IL13 domain and the transmembrane domain. A variety of different spacers can be used. Some of them include at least portion of a human Fc region, for example a hinge portion of a human Fc region or a CH3 domain or variants thereof. Table 1 below provides various spacers that can be used in the CARs described herein.

TABLE 1

Examples of Spacers

| Name | Length | Sequence |
|---|---|---|
| a3 | 3 aa | AAA |
| linker | 10 aa | GGGSSGGGSG (SEQ ID NO: 2) |
| IgG4 hinge (S→P) (S228P) | 12 aa | ESKYGPPCPPCP (SEQ ID NO: 3) |
| IgG4 hinge | 12 aa | ESKYGPPCPSCP (SEQ ID NO: 4) |
| IgG4 hinge (S228P) + linker | 22 aa | ESKYGPPCPPCPGGGSSGGGSG (SEQ ID NO: 5) |
| CD28 hinge | 39 aa | IEVMYPPPYLDNEKSNGTIIHVKGK HLCPSPLFPGPSKP (SEQ ID NO: 6) |
| CD8 hinge-48 aa | 48 aa | AKPTTTPAPRPPTPAPTIASQPLSL RPEACRPAAGGAVHTRGLDFACD (SEQ ID NO: 7) |
| CD8 hinge-45 aa | 45 aa | TTTPAPRPPTPAPTIASQPLSLRPE ACRPAAGGAVHTRGLDFACD (SEQ ID NO: 8) |
| IgG4 (HL-CH3) (includes S228P in hinge) | 129 aa | ESKYGPPCPPCPGGGSSGGGSGGQP REPQVYTLPPSQEEMTKNQVSLTCL VKGFYPSDIAVEWESNGQPENNYKT TPPVLDSDGSFFLYSRLTVDKSRWQ EGNVFSCSVMHEALHNHYTQKSLSL SLGK (SEQ ID NO: 9) |
| IgG4 (L235E, N297Q) IgG4(EQ) | 229 aa | ESKYGPPCPSCPAPEFEGGPSVFLF PPKPKDTLMISRTPEVTCVVVDVSQ EDPEVQFNWYVDGVEVHNAKTKPRE EQQSTYRVVSVLTVLHQDWLNGKE YKCKVSNKGLPSSIEKTISKAKGQP REPQVYTLPPSQEEMTKNQVSLTCL VKGFYPSDIAVEWESNGQPENNYKT TPPVLDSDGSFFLYSRLTVDKSRWQ EGNVFSCSV MHEALHNHYTQKSLS LSLGK (SEQ ID NO: 10) |

TABLE 1-continued

Examples of Spacers

| Name | Length | Sequence |
|---|---|---|
| IgG4 (S228P, L235E, N297Q) IgG4 (PEQ) | 229 aa | ESKYGPPCPPCPAPEFEGGPSVFL FPPKPKDTLMISRTPEVTCVVVDVS QEDPEVQFNWYVDGVEVHNAKTKPR EEQFQSTYRVVSVLTVLHQDWLNGK EYKCKVSNKGLPSSIEKTISKAKGQ PREPQVYTLPPSQEEMTKNQVSLTC LVKGFYPSDIAVEWESNGQPENNYK TTPPVLDSDGSFFLYSRLTVDKSRW QEGNVFSCSV MHEALHNHYTQKSL SLSLGK (SEQ ID NO: 11) |
| IgG4 (CH3) | 107 aa | GQPREPQVYTLPPSQEEMTKNQVSL TCLVKGFYPSDIAVEWESNGQPENN YKTTPPVLDSDGSFFLYSRLTVDKS RWQEGNVFSCSVMHEALHNHYTQKS LSLSLGK (SEQ ID NO: 12) |

Some spacer regions include all or part of an immunoglobulin (e.g., IgG1, IgG2, IgG3, IgG4) hinge region, i.e., the sequence that falls between the CH1 and CH2 domains of an immunoglobulin, e.g., an IgG4 Fc hinge or a CD8 hinge. Some spacer regions include an immunoglobulin CH3 domain or both a CH3 domain and a CH2 domain. The immunoglobulin derived sequences can include one or more amino acid modifications, for example, 1, 2, 3, 4 or 5 substitutions, e.g., substitutions that reduce off-target binding.

The hinge/linker region can also comprise a IgG4 hinge region having the sequence ESKYGPPCPSCP (SEQ ID NO:4) or ESKYGPPCPPCP (SEQ ID NO:3). The hinge/linger region can also comprise the sequence ESKY-GPPCPPCP (SEQ ID NO:3) followed by the linker sequence GGGSSGGGSG (SEQ ID NO:2) followed by IgG4 CH3 sequence GQPREPQVYTLPPSQEEMTKNQVSLT-CLVKGFYPSDIAVEWESNGQPENNYKTTPPVLDS-DGSFFLYSRL TVDKSRWQEGNVFSCSVMHEALHN-HYTQKSLSLSLGK (SEQ ID NO:12). Thus, the entire linker/spacer region can comprise the sequence: ESKY-GPPCPPCPGGGSSGGGSGGQPREPQVYTLPPSQEE-MTKNQVSLTCLVKGFYPSDIAVEWESNGQ PENNYK-TTPPVLDSDGSFFLYSRLTVDKSRWQEGNVFSC-SVMHEALHNHYTQKSLSLSLGK (SEQ ID NO:11). In some cases, the spacer has 1, 2, 3, 4, or 5 single amino acid changes (e.g., conservative changes) compared to SEQ ID NO: 10 or 11. In some cases, the IgG4 Fc hinge/linker region is mutated at two positions (L235E; N297Q) in a manner that reduces binding by Fc receptors (FcRs) (e.g., comprises or consists of SEQ ID NO: 10 or 11).

Transmembrane Domain

A variety of transmembrane domains can be used in the. Table 2 includes examples of suitable transmembrane domains. Where a spacer region is present, the transmembrane domain (TM) is located carboxy terminal to the spacer region.

TABLE 2

Examples of Transmembrane Domains

| Name | Accession | Length | Sequence |
|---|---|---|---|
| CD3z | J04132.1 | 21 aa | LCYLLDGILFIYGVILTALFL (SEQ ID NO: 13) |
| CD28 | NM_006139 | 27 aa | FWVLVVVGGVLACYSLLVTVAFIIFWV (SEQ ID NO: 14) |
| CD28 (M) | NM_006139 | 28 aa | MFWVLVVVGGVLACYSLLVTVAFIIFWV (SEQ ID NO: 15) |
| CD4 | M35160 | 22 aa | MALIVLGGVAGLLLFIGLGIFF (SEQ ID NO: 16) |
| CD8tm | NM_001768 | 21 aa | IYIWAPLAGTCGVLLLSLVIT (SEQ ID NO: 17) |
| CD8tm2 | NM_001768 | 23 aa | IYIWAPLAGTCGVLLLSLVITLY (SEQ ID NO: 18) |
| CD8tm3 | NM_001768 | 24 aa | IYIWAPLAGTCGVLLLSLVITLYC (SEQ ID NO: 19) |
| 41BB | NM_001561 | 27 aa | IISFFLALTSTALLFLLFFLTLRFSVV (SEQ ID NO: 20) |

Costimulatory Domain

The costimulatory domain can be any domain that is suitable for use with a CD3ζ signaling domain. In some cases the co-signaling domain is a 4-1BB co-signaling domain that includes a sequence that is at least 90%, at least 95%, at least 98% identical to or identical to: KRGRKKL-LYIFKQPFMRPVQTTQEEDGCSCRFPEEEEGGCEL (SEQ ID NO:24). In some cases, the 4-1BB co-signaling domain has 1, 2, 3, 4 of 5 amino acid changes (preferably conservative) compared to SEQ ID NO:24.

The costimulatory domain(s) are located between the transmembrane domain and the CD3ζ signaling domain. Table 3 includes examples of suitable costimulatory domains together with the sequence of the CD3ζ signaling domain.

TABLE 3

CD3ζ Domain and Examples of Costimulatory Domains

| Name | Accession | Length | Sequence |
|---|---|---|---|
| CD3ζ | J04132.1 | 113 aa | RVKFSRSADAPAYQQGQNQLYNELN LGRREEYDVLDKRRGRDPEMGGKPR RKNPQEGLYNELQKDKMAEAYSEIG MKGERRRGKGHDGLYQGLSTATKDT YDALHMQALPPR (SEQ ID NO: 21) |
| CD28 | NM_006139 | 42 aa | RSKRSRLLHSDYMNMTPRRPGPTRK HYQPYAPPRDFAAYRS (SEQ ID NO: 22) |
| CD28gg | NM_006139 | 42 aa | RSKRSRGGHSDYMNMTPRRPGPTRK HYQPYAPPRDFAAYRS (SEQ ID NO: 23) |
| 41BB | NM_001561 | 42 aa | KRGRKKLLYIFKQPFMRPVQTTQEE DGCSCRFPEEEEGGCEL (SEQ ID NO: 24) |

TABLE 3-continued

CD3ζ Domain and Examples of Costimulatory Domains

| Name | Accession | Length | Sequence |
|---|---|---|---|
| OX40 | | 42 aa | ALYLLRRDQRLPPDAHKPPGGGSFR TPIQEEQADAHSTLAKI (SEQ ID NO: 25) |

In various embodiments: the costimulatory domain is selected from the group consisting of: a costimulatory domain depicted in Table 3 or a variant thereof having 1-5 (e.g., 1 or 2) amino acid modifications, a CD28 costimulatory domain or a variant thereof having 1-5 (e.g., 1 or 2) amino acid modifications, CD28gg costimulatory domain or a variant thereof having 1-5 (e.g., 1 or 2) amino acid modifications, a 4-1BB costimulatory domain or a variant thereof having 1-5 (e.g., 1 or 2) amino acid modifications and an OX40 costimulatory domain or a variant thereof having 1-5 (e.g., 1 or 2) amino acid modifications. In certain embodiments, a 4-1BB costimulatory domain or a variant thereof having 1-5 (e.g., 1 or 2) amino acid modifications in present. In some embodiments there are two costimulatory domains, for example a CD28 co-stimulatory domain or a variant thereof having 1-5 (e.g., 1 or 2) amino acid modifications (e.g., substitutions) and a 4-1BB co-stimulatory domain or a variant thereof having 1-5 (e.g., 1 or 2) amino acid modifications (e.g., substitutions). In various embodiments the 1-5 (e.g., 1 or 2) amino acid modification are substitutions. The costimulatory domain is amino terminal to the CD3 signaling domain and a short linker consisting of 2-10, e.g., 3 amino acids (e.g., GGG) is can be positioned between the costimulatory domain and the CD3ζ signaling domain.

CD3ζ Signaling Domain

The CD3ζ Signaling domain can be any domain that is suitable for use with a CD3ζ signaling domain. In some cases, the CD3ζ signaling domain includes a sequence that is at least 90%, at least 95%, at least 98% identical to or identical to: RVKFSRSADAPAYQQGQNQLYNELNLGR-REEYDVLDKRRGRDPEMGGKPRRKNPQEGLY-NELQKDKM AEAYSEIGMKGERRRGKGHDGLYQGL-STATKDTYDALHMQALPPR (SEQ ID NO:21). In some cases, the CD3ζ signaling has 1, 2, 3, 4 of 5 amino acid changes (preferably conservative) compared to SEQ ID NO:21.

Truncated EGFR and Truncated CD19

The CD3ζ signaling domain can be followed by a ribosomal skip sequence (e.g., LEGGGEGRGSLLTCGD-VEENPGPR; SEQ ID NO: 26) and a truncated EGFR having a sequence that is at least 90%, at least 95%, at least 98% identical to or identical to: LVTSLLLCELPHPAFL-LIPRKVCNGIGIGEFKDSLSINATNIKHFKNCTSIS-GDLHILPVAFRGDSFTHTPPLDP QELDILKTVKEIT-GFLLIQAWPENRTDLHAFENLEIIRGRTKQHGQFS-LAVVSLNITSLGLRSLKEISDGDVIIS GNKNLCYA-NTINWKKLFGTSGQKTKIISNRGENSCKATGQVCH-ALCSPEGCWGPEPRDCVSCRNVSRG RECVDKCNL-LEGEPREFVENSECIQCHPECLPQAMNITCTGRGPDN-CIQCAHYIDGPHCVKTCPAGVMG ENNTLVWKY-ADAGHVCHLCHPNCTYGCTGPGLEGCPTNGPKIPS-IATGMVGALLLLLVVALGIGLFM (SEQ ID NO: 27). In some cases, the truncated EGFR has 1, 2, 3, 4 of 5 amino acid changes (preferably conservative) compared to SEQ ID NO: 27.

Alternatively the CD3 signaling domain can be followed by a ribosomal skip sequence (e.g., LEGGGEGRGSLLTCGDVEENPGPR; SEQ ID NO: 26) and a truncated CD19R having a sequence that is at least 90%, at least 95%, at least 98% identical to or identical to:

(SEQ ID NO: 28)
MPPPRLLFFLLFLTPMEVRPEEPLVVKVEEGDNAVLQCLKGTSDGPTQQL

TWSRESPLKPFLKLSLGLPGLGIHMRPLAIWLFIFNVSQQMGGFYLCQPG

PPSEKAWQPGWTVNVEGSGELFRWNVSDLGGLGCGLKNRSSEGPSSPSGK

LMSPKLYVWAKDRPEIWEGEPPCVPPRDSLNQSLSQDLTMAPGSTLWLSC

GVPPDSVSRGPLSWTHVHPKGPKSLLSLELKDDRPARDMWVMETGLLLPR

ATAQDAGKYYCHRGNLTMSFHLEITARPVLWHWLLRTGGWKVSAVTLAYL

IFCLCSLVGILHLQRALVLRRKR

An amino acid modification refers to an amino acid substitution, insertion, and/or deletion in a protein or peptide sequence. An "amino acid substitution" or "substitution" refers to replacement of an amino acid at a particular position in a parent peptide or protein sequence with another amino acid. A substitution can be made to change an amino acid in the resulting protein in a non-conservative manner (i.e., by changing the codon from an amino acid belonging to a grouping of amino acids having a particular size or characteristic to an amino acid belonging to another grouping) or in a conservative manner (i.e., by changing the codon from an amino acid belonging to a grouping of amino acids having a particular size or characteristic to an amino acid belonging to the same grouping). Such a conservative change generally leads to less change in the structure and function of the resulting protein. The following are examples of various groupings of amino acids: 1) Amino acids with nonpolar R groups: Alanine, Valine, Leucine, Isoleucine, Proline, Phenylalanine, Tryptophan, Methionine; 2) Amino acids with uncharged polar R groups: Glycine, Serine, Threonine, Cysteine, Tyrosine, Asparagine, Glutamine; 3) Amino acids with charged polar R groups (negatively charged at pH 6.0): Aspartic acid, Glutamic acid; 4) Basic amino acids (positively charged at pH 6.0): Lysine, Arginine, Histidine (at pH 6.0). Another grouping may be those amino acids with phenyl groups: Phenylalanine, Tryptophan, and Tyrosine.

In some cases, the CAR can be produced using a vector in which the CAR open reading frame is followed by a T2A ribosome skip sequence and a truncated EGFR (EGFRt) or truncated CD19. (CD19t) In this arrangement, co-expression of EGFRt or CD19t provides an inert, non-immunogenic surface marker that allows for accurate measurement of gene modified cells, and enables positive selection of gene-modified cells, as well as efficient cell tracking of the therapeutic T cells in vivo following adoptive transfer. Efficiently controlling proliferation to avoid cytokine storm and off-target toxicity is an important hurdle for the success of T cell immunotherapy. The EGFRt or CD19t incorporated in the lentiviral vector can act as suicide gene to ablate the CAR+ T cells in cases of treatment-related toxicity.

The CAR described herein can be produced by any means known in the art, though preferably it is produced using recombinant DNA techniques. Nucleic acids encoding the several regions of the chimeric receptor can be prepared and assembled into a complete coding sequence by standard techniques of molecular cloning known in the art (genomic library screening, overlapping PCR, primer-assisted ligation, site-directed mutagenesis, etc.) as is convenient. The resulting coding region is preferably inserted into an expression vector and used to transform a suitable expression host cell line, preferably a T lymphocyte, and most preferably an autologous T lymphocyte.

Various T cell subsets isolated from the patient can be transduced with a vector for CAR expression. Central memory T cells are one useful T cell subset. Central memory T cell can be isolated from peripheral blood mononuclear cells (PBMC) by selecting for CD45RO+/CD62L+ cells, using, for example, the CliniMACS® device to immunomagnetically select cells expressing the desired receptors. The cells enriched for central memory T cells can be activated with anti-CD3/CD28, transduced with, for example, a lentiviral vector that directs the expression of the CAR as well as a non-immunogenic surface marker for in vivo detection, ablation, and potential ex vivo selection. The activated/genetically modified CAR T cells can be expanded in vitro with IL-2/IL-15 and then cryopreserved. Additional methods of preparing CAR T cells can be found in PCT/US2016/043392.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety for any and all purposes. In case of conflict, the present specification, including definitions, will control.

Other features and advantages of the invention will be apparent from the following detailed description and figures, and from the claims.

DESCRIPTION OF DRAWINGS

FIG. 1: Schematic diagram of WT IL13 CAR certain variant IL13 CAR. IL-13 variant sequences are indicated. Variations in the hinge/linker (spacer) domains, transmembrane domains, and costimulatory domains are indicated. A linker (e.g., GGG) is generally present between the costimulatory domain and CD3zeta. The inclusion of a T2A ribosomal skip sequence and a truncated CD19 (CD19t) marker is optional.

FIG. 3: Depicts the amino acid sequence of CAR having: a variant IL13 targeting domain, an IgG4 (EQ) spacer, CD28 TM domain, 41-BB co-stimulatory domain and a CD3zeta domain (SEQ ID NOs: 39-40).

FIG. 4: Depicts the amino acid sequence of CAR having: a variant IL13 targeting domain, an IgG4 (EQ) spacer, CD28 TM domain, 41-BB co-stimulatory domain and a CD3zeta domain (SEQ ID NOs: 41-42).

FIG. 5: Depicts the amino acid sequence of CAR having: a variant IL13 targeting domain, an IgG4 (EQ) spacer, CD28 TM domain, 41-BB co-stimulatory domain and a CD3zeta domain (SEQ ID NOs: 43-44).

FIG. 6: Depicts the amino acid sequence of CAR having: a variant IL13 targeting domain, an IgG4 (EQ) spacer, CD28 TM domain, 41-BB co-stimulatory domain and a CD3zeta domain (SEQ ID NOs: 45-46).

FIG. 7: Depicts the amino acid sequence of CAR having: a variant IL13 targeting domain, an IgG4 (EQ) spacer, CD4 TM domain, CD28 co-stimulatory domain and a CD3zeta domain (SEQ ID NOs: 47-48).

FIG. 8: Depicts the amino acid sequence of CAR having: a variant IL13 targeting domain, an IgG4 (EQ) spacer, CD4 TM domain, CD28 co-stimulatory domain and a CD3zeta domain (SEQ ID NOs: 49-50).

FIG. 9: Depicts the amino acid sequence of CAR having: a variant IL13 targeting domain, an IgG4 (EQ) spacer, CD4 TM domain, CD28 co-stimulatory domain and a CD3zeta domain (SEQ ID NOs: 51-52).

FIG. 10: Depicts the amino acid sequence of CAR having: a variant IL13 targeting domain, an IgG4 (EQ) spacer, CD4 TM domain, CD28 co-stimulatory domain and a CD3zeta domain (SEQ ID NOs: 53-54).

FIG. 11: Depicts the amino acid sequence of CAR having: a variant IL13 targeting domain, an IgG4 (EQ) spacer, CD4 TM domain, 4-1BB co-stimulatory domain and a CD3zeta domain (SEQ ID NOs: 55-58).

FIG. 12: Depicts the amino acid sequence of CAR having: a variant IL13 targeting domain, an IgG4 (EQ) spacer, CD8 TM domain, 41-BB co-stimulatory domain and a CD3zeta domain (SEQ ID NOs: 59-62).

FIG. 15: IL13 variant CART cells exhibit differential targeting of tumors expressing IL13Ra2, IL13Ra1, or IL13Ra1/IL4R. Parental HT1080 tumor cells, HT1080 tumor cells genetically modified to overexpress IL13Ra1, IL13Ra1 and IL4, or IL13Ra2, were incubated alone (white bars) or co-incubated with either mock-transduced T cells (Mock), or T cells transduced to express the indicated IL-13 variant-containing CAR. After 2-3 days in culture, numbers of viable tumor cells were evaluated.

FIG. 17: YLK and YL IL13-28tm-41BB variant CART cells exhibit superior efficacy against IL13Ra2 expressing patient derived brain tumor (PBT) in a 6 day re-challenge assay where 1000 seeded T cells were challenged with tumors repeatedly (total 20000).

FIG. 20: Depicts the amino acid sequence of CAR having: a variant IL13 targeting domain, an IgG4(HL-CH3)(S228P) spacer, CD28 TM domain, 41-BB co-stimulatory domain and a CD3zeta domain (SEQ ID NOs: 63-68).

DETAILED DESCRIPTION

Figure 2:
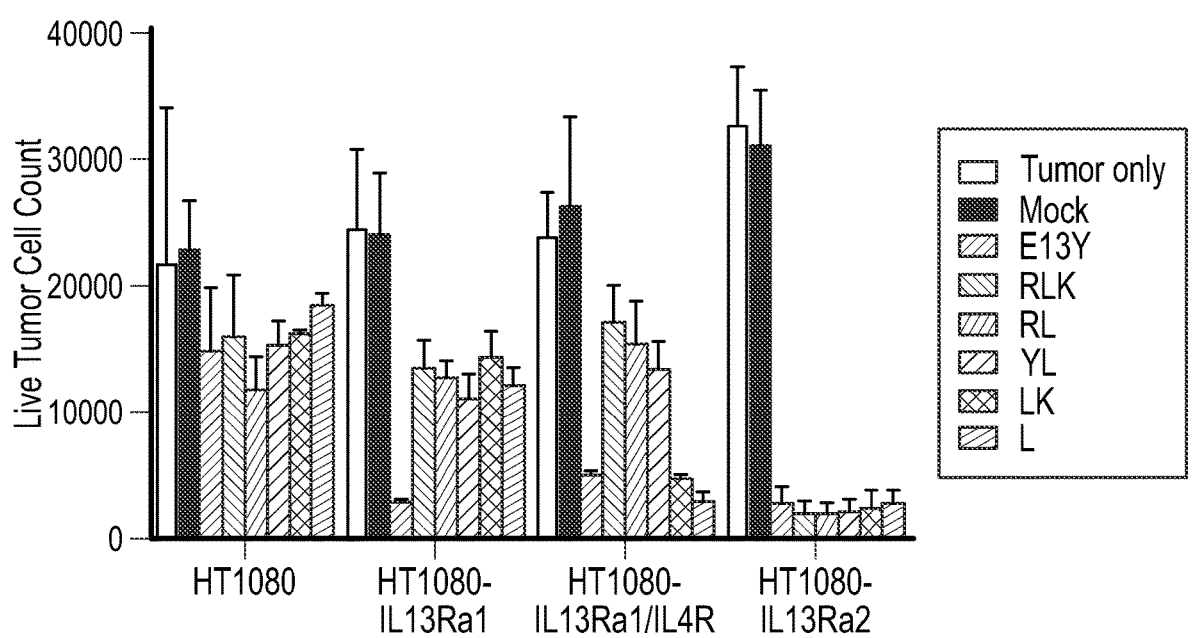
FIG. 2: IL13 variant CAR T cells exhibit differential targeting of tumors expressing IL13Ra2, IL13Ra1, or IL13Ra1/IL4R. Parental HT1080 tumor cells, HT1080 tumor cells genetically modified to overexpress IL13Ra1, IL13Ra1 and IL4, or IL13Ra2, were incubated alone (white bars) or co-incubated 1:1 with either mock-transduced T cells (Mock), or T cells transduced to express the indicated IL-13 variant-containing CAR. After 3 days in culture, numbers of viable tumor cells were evaluated. While all CART cells targeted the IL13Ra2-expressing tumor cells, only the previously described E11Y variant also directed killing of the IL13Ra1- and IL13Ra1/IL4R-expressing tumors, while the LK and L variant directed killing of IL13Ra1/IL4R-expressing tumors.

In this disclosure the generation and anti-tumor efficacy of CAR with a variant IL13 domain targeting IL13Rα2 are described. The CART cells exhibited potent antigen-dependent cytotoxicity against L13Rα2-expressing human cancer lines.

IL13Rα2 Targeted CAR

The CAR described herein include a variant IL-13 comprising or consisting of the amino acid sequence of SEQ ID NO: SEQ ID NOs: 30-37 (e.g., SEQ ID NOs: 30-34 and 36). In preferred embodiments, the sequence comprises no more than 126 amino acids.

A useful IL13 variant CAR can consist of or comprises the amino acid sequence of SEQ ID NO: SEQ ID NO: 40-68. The CAR can be expressed in a form that includes a signal sequence, e.g., a human GM-CSF receptor alpha signal sequence (MLLLVTSLLLCELPHPAFLLIP; SEQ ID NO: 29). The CAR can be expressed with additional sequences that are useful for monitoring expression, for example, a T2A skip sequence and a truncated EGFRt. The CAR can be expressed with additional sequences that are useful for monitoring expression, for example, a T2A skip sequence and a truncated CD19t. The variant IL13 CAR can comprise or consist of the amino acid sequence of any SEQ ID NO: SEQ ID NO: 40-68 with up to 1, 2, 3, 4 or 5 amino acid changes (preferably conservative amino acid changes) or with up to 1, 2, 3, 4 or 5 amino acid changes in the IL13 domain.

In some embodiments, the nucleic acid encoding amino acid sequences SEQ ID NOs: 30-37 (e.g., SEQ ID NOs: 30-34 and 36) are codon optimized for expression in human cells.

In some cases, the CAR can be produced using a vector in which the CAR open reading frame is followed by a T2A ribosome skip sequence and a truncated EGFR (EGFRt) or truncated CD19. (CD19t) In this arrangement, co-expression of EGFRt or CD19t provides an inert, non-immunogenic surface marker that allows for accurate measurement of gene modified cells, and enables positive selection of gene-modified cells, as well as efficient cell tracking of the therapeutic T cells in vivo following adoptive transfer. Efficiently controlling proliferation to avoid cytokine storm and off-target toxicity is an important hurdle for the success of T cell immunotherapy. The EGFRt or CD19t incorporated in the lentiviral vector can act as suicide gene to ablate the CAR+ T cells in cases of treatment-related toxicity.

The CAR described herein can be produced by any means known in the art, though preferably it is produced using recombinant DNA techniques. Nucleic acids encoding the several regions of the chimeric receptor can be prepared and assembled into a complete coding sequence by standard techniques of molecular cloning known in the art (genomic library screening, overlapping PCR, primer-assisted ligation, site-directed mutagenesis, etc.) as is convenient. The resulting coding region is preferably inserted into an expression vector and used to transform a suitable expression host cell line, preferably a T lymphocyte, and most preferably an autologous T lymphocyte.

Various T cell subsets isolated from the patient can be transduced with a vector for CAR expression. Central memory T cells are one useful T cell subset. Central memory T cell can be isolated from peripheral blood mononuclear cells (PBMC) by selecting for CD45RO+/CD62L+ cells, using, for example, the CliniMACS® device to immuno-magnetically select cells expressing the desired receptors. The cells enriched for central memory T cells can be activated with anti-CD3/CD28, transduced with, for example, a lentiviral vector that directs the expression of the CAR as well as a non-immunogenic surface marker for in vivo detection, ablation, and potential ex vivo selection. The activated/genetically modified CAR T cells can be expanded in vitro with IL-2/IL-15 and then cryopreserved. Additional methods of preparing CART cells can be found in PCT/US2016/043392.

EXAMPLES

The invention is further described in the following examples, which do not limit the scope of the invention described in the claims.

Example 1: IL13 Variants Exhibit Selective Binding to IL13Rα2

In an effort to identify IL13 variants with increased selectivity for binding IL13Rα2 relative to IL13Rα1. To assess receptor binding various mutants were compared to wild-type IL13 (GPVPPSTALRELIEELVNITQNQ-KAPLCNGSMVWSINLTAGMYCAALESLINVSGC-SAIEKTQRMLSGFC PHKVSAGQFSSLHVRDTKI-EVAQFVKDLLLHLKKLFREGRFN; SEQ ID NO: 1) and the previously known IL3 E11Y mutant (GPVPPSTAL-RYLIEELVNITQNQKAPLCNGSMVWSINLTAGMY-CAALESLINVSGCSAIEKTQRMLSGFC PHKVSAG-QFSSLHVRDTKIEVAQFVKDLLLHLKKLFREGRFN; SEQ ID NO: 69). Wild-type IL13 (WT) and the various variants were each displayed on the surface of yeast. Surface plasmon resonance with immobilized recombinant IL13Rα1 and immobilized IL13Rα2 was used to assess binding affinity. The results of this analysis are presented in Table 4. As expected, WT bound strongly to both IL13Rα1 and IL13Rα2. E11Y and E11R were somewhat more selective. E90L and R107K were more selective. YLK and RLK were the most selective, with no measurable binding to IL13Rα1 under the conditions used.

TABLE 4

| Binding Affinity of WT IL13 and Variants (nM) | | | | | | |
|---|---|---|---|---|---|---|
| WT SEQ ID NO: 1 | E11Y SEQ ID NO: 69 | E11R SEQ ID NO: 35 | E90L SEQ ID NO: 36 | R107K SEQ ID NO: 37 | YLK SEQ ID NO: 30 | RLK SEQ ID NO: 31 |
| IL13Rα1 | 69 ± 20 | 96 ± 50 | 98 ± 50 | 1300 ± 2000 | 240 ± 300 | — | — |
| IL13Rα2 | 18 ± 5 | 19 ± 5 | 15 ± 5 | 27 ± 9 | 27 ± 7 | 26 ± 5 | 28 ± 20 |

Example 2: Certain IL13 Variant CAR have Increased Selectivity for Killing IL13Rα2 Cells IL13 variants (E11Y (SEQ ID NO: 69), RLK (SEQ ID NO: 31), RL (SEQ ID NO: 32), YL (SEQ ID NO: 33), LK (SEQ ID NO: 34) and L (SEQ ID NO: 35) were used to create CAR constructs. In each case the construct included an IgG4(EQ) spacer, a CD28 transmembrane domain, a 4-1BB co-stimulatory domain, a GGG linker and CD3zeta.

Briefly, parental HT1080 tumor cells, HT1080 tumor cells genetically modified to overexpress IL13Ra1, IL13Ra1 and IL4R, and HT1080 tumor cells genetically modified to overexpress IL13Ra2, were incubated alone or co-incubated 1:1 with either mock-transduced T cells or T cells transduced to express an IL13 variant CAR. After 3 days in culture, numbers of viable tumor cells were evaluated. As can be seen in FIG. 2, while all CAR T cells targeted the IL13Ra2-expressing tumor cells, only the previously described E11Y variant also directed significant killing of both the IL13Ra1 and IL13Ra1/IL4R-expressing tumors, while the LK and L variants directed killing of IL13Ra1/IL4R-expressing tumors.

Example 3: Binding of IL13 Variants to Recombinant IL13Ra2

Figure 13:
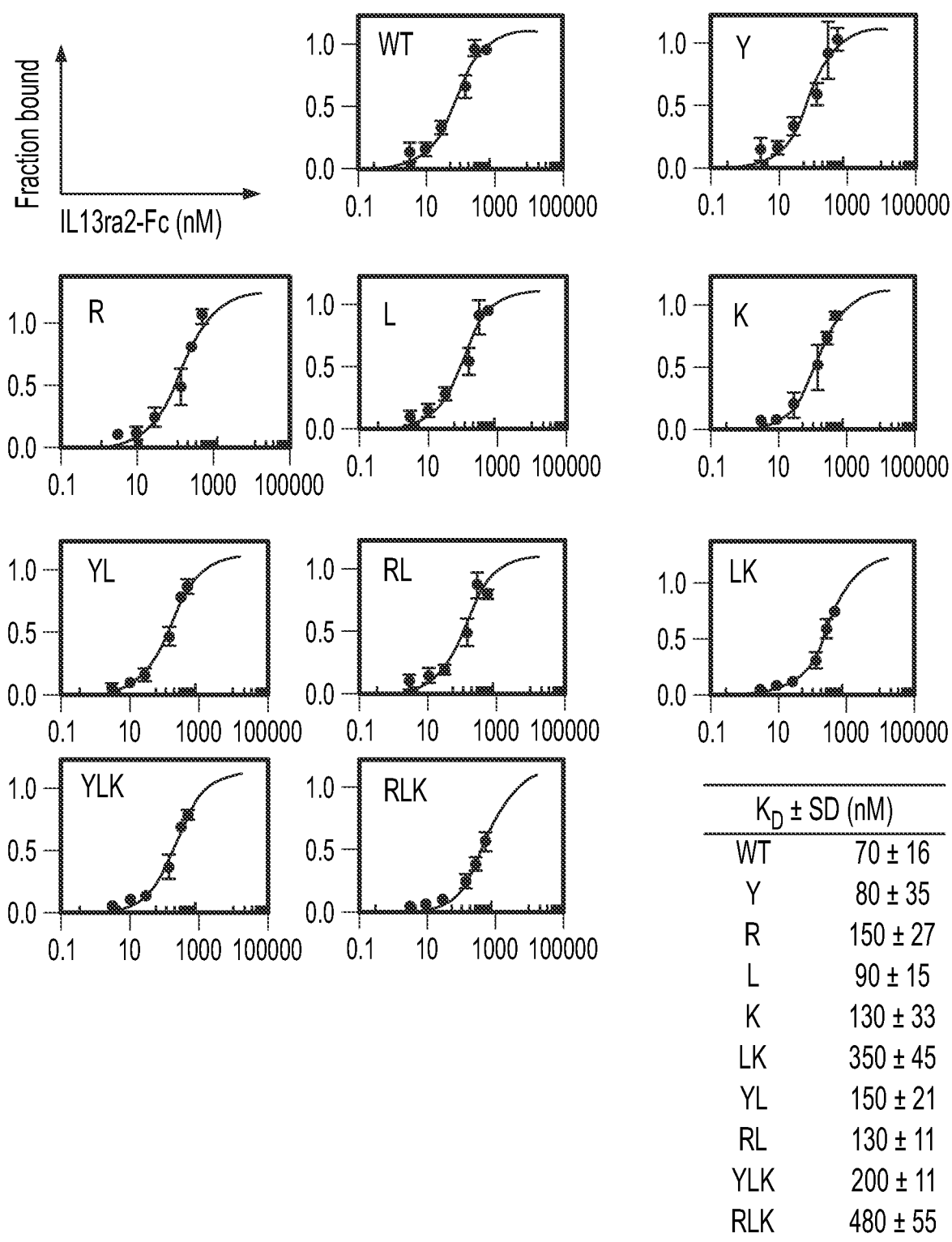
FIG. 13: Binding of yeast displayed IL13 variants to recombinant human IL13Ra2 protein. Human IL13 cDNA containing identified mutations was cloned into a yeast display vector and transformed into *Saccharomyces cerevisiae* strain EBY100. Single clones were induced at 20° C. in media containing galactose, followed by incubation with recombinant human biotinylated IL13Ra2-Fc and streptavidin coupled to Alexa-647 with binding was assessed by flow cytometry. The calculated KD based on the titration curve is reported.

Human IL13 cDNA IL13 variants were cloned into a yeast display vector and transformed into *Saccharomyces cerevisiae* strain EBY100. Single clones were induced at 20° C. in media containing galactose, followed by incubation with recombinant human biotinylated IL13Ra2-Fc and streptavidin coupled to Alexa-647 with binding was assessed by flow cytometry. The calculated KD based on the titration curve is reported (FIG. 13).

Example 4: Binding of IL13 Variants to Recombinant IL13Ra2

Figure 14:
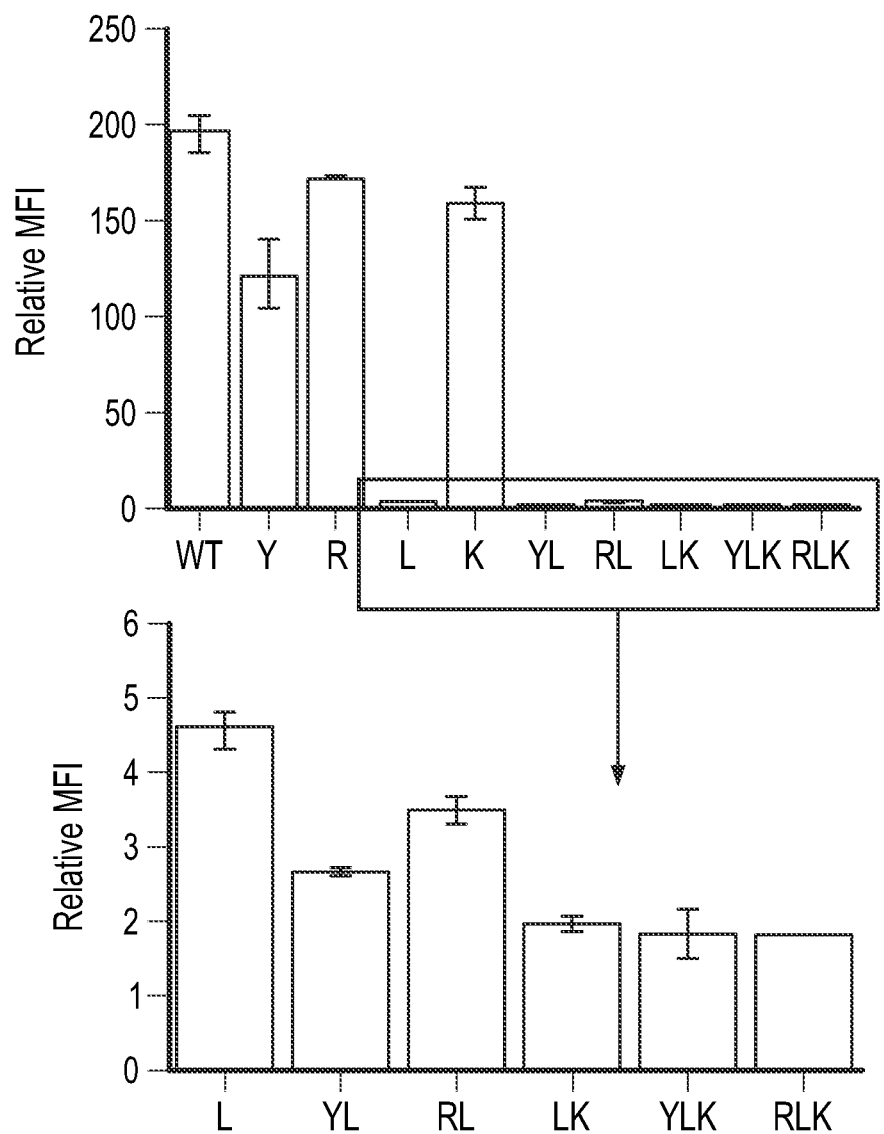
FIG. 14: Binding of yeast displayed IL13 variants to recombinant IL13Ra1 protein. Human IL13 cDNA containing identified mutations was cloned into a yeast display vector and transformed into *Saccharomyces cerevisiae* strain EBY100. Single clones were induced at 20° in media containing galactose, followed by incubation with recombinant human biotinylated IL13Ra1-Fc and streptavidin coupled to Alexa-647 with binding was assessed by flow cytometry. The calculated KD based on the titration curve is reported. All mutations containing L variant showed diminished binding to IL13Ra1.

Human IL13 cDNA containing identified mutations was cloned into a yeast display vector and transformed into *Saccharomyces cerevisiae* strain EBY100. Single clones were induced at 20° C. in media containing galactose, followed by incubation with recombinant human biotinylated IL13Ra1-Fc and streptavidin coupled to Alexa-647 with binding was assessed by flow cytometry. Relative binding is shown is shown in FIG. 14, upper panel, with a different scale shown in the lower panel.

Example 5: Differential Targeting by IL13 Variant CAR

As shown in FIG. 15, IL13 variant CAR T cells exhibit differential targeting of tumors expressing IL13Ra2, IL13Ra1, or IL13Ra1/IL4R. Parental HT1080 tumor cells, HT1080 tumor cells genetically modified to overexpress IL13Ra1, IL13Ra1 and IL4, or IL13Ra2, were incubated alone (white bars) or co-incubated with either mock-transduced T cells (Mock), or T cells transduced to express the indicated IL-13 variant-containing CAR. The CAR included an IgG4 (EQ) Spacer, a CD4 TM domain and a CD28 co-stimulatory domain in addition to CD3zeta or an IgG4 (EQ) Spacer, a CD28 TM domain and a 4-1BB co-stimulatory domain in addition to CD3zeta. After 2-3 days in culture, numbers of viable tumor cells were evaluated. RLK-CD28 is SEQ ID NO: 48; R-CD28 is SEQ ID NO:52; L-CD28 is SEQ ID NO: 53; K-CD28 is SEQ ID NO: 54. RLK-41BB is SEQ ID NO: 40; RL-41BB is SEQ ID NO:41; YL-41BB is SEQ ID NO: 42; L-41BB is SEQ ID NO: 54; and LK-41BB is SEQ ID NO: 43.

Example 6: YLK and RLK IL13 Variant CAR T Cells have Increased Specificity

Figure 16:
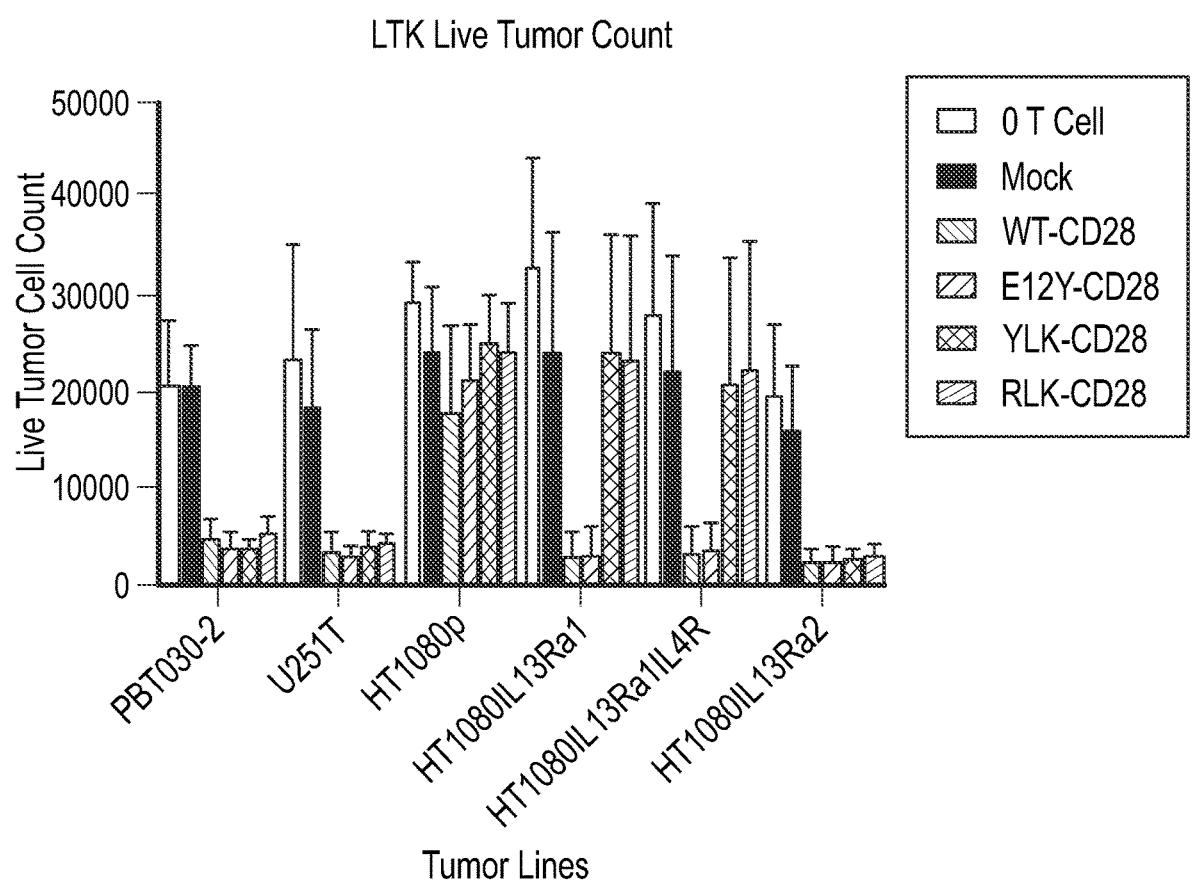
FIG. 16: YLK and RLK IL13-CD28 variant CAR T cells exhibit comparable efficacy against IL13Ra2 expression tumor lines and enhanced specificity relative to IL13Ra1 or IL13Ra1/IL4R expressing lines.

As shown in FIG. 16, YLK and RLK IL13 Variant CAR T cells exhibit comparable efficacy against IL13Ra2 expression tumor lines and enhanced specificity relative to IL13Ra1 or IL13Ra1/IL4R expressing lines. The CAR included an IgG4 (EQ) Spacer, a CD4 TM domain and a CD28 co-stimulatory domain in addition to CD3zeta, RLK-CD28 is SEQ ID NO: 48; YLK-CD28 is SEQ ID NO:52; L-CD28 is SEQ ID NO: 53; K-CD28 is SEQ ID NO: 54. RLK-41BB is SEQ ID NO: 40; RL-41BB is SEQ ID NO:47.

Example 7: YLK and YL IL13 Variant CAR T Cells Exhibit Superior Efficacy Against IL13Ra2 Expressing Patient Derived Brain Tumor As shown in FIG. 17, YLK and YL IL13-28tm-41BB variant CAR T cells exhibit superior efficacy against IL13Ra2 expressing patient derived brain tumor (PBT) in a 6 day re-challenge assay where 1000 seeded T cells were challenged with tumors repeatedly (total 20000). The CAR included an IgG4 (EQ) Spacer, a CD28 TM domain and a 4-1BB co-stimulatory domain in addition to CD3zeta. RLK-41BB is SEQ ID NO: 40; RL-41BB is SEQ ID NO:41; YL-41BB is SEQ ID NO: 42; and RL-41BB is SEQ ID NO: 41.

Example 8: In Vivo Efficacy of IL13Variant CAR T Cells

Figure 18:
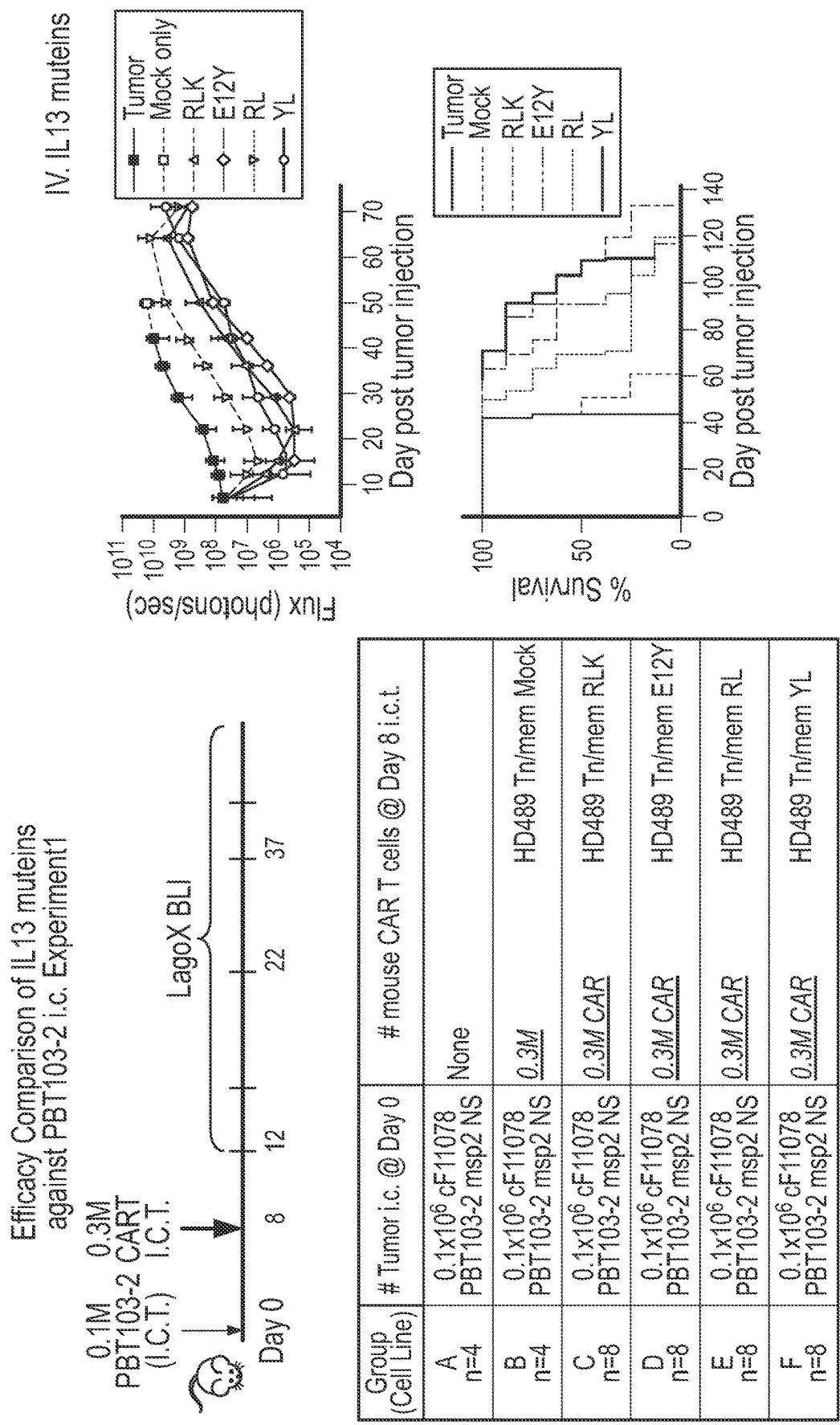
FIG. 18: In vivo efficacy of IL13-28t-41BB variant CART cells against PBT103 engineered to over express IL13Ra2. Seven days after engraftment, $0.3 \times 10^6$ CART cells per mouse were intracranially delivered, followed by monitoring of tumor bioluminescence and survival. RLK and YL variants showed superior efficacy.

FIG. 18, depicts an assessment of the in vivo efficacy of IL13-28t-41BB variant CAR T cells against PBT103 engineered to over express IL13Ra2. Seven days after engraftment, $0.3 \times 10^6$ CAR T cells per mouse were intracranially delivered, followed by monitoring of tumor bioluminescence and survival. The CAR included an IgG4 (EQ) Spacer, a CD28 TM domain and a 4-1BB co-stimulatory domain in addition to CD3zeta. RLK-41BB is SEQ ID NO: 40; RL-41BB is SEQ ID NO:41; YLK-41BB is SEQ ID NO: 42; and RL-41BB is SEQ ID NO: 41. RLK and YL variants showed superior efficacy.

Figure 19:
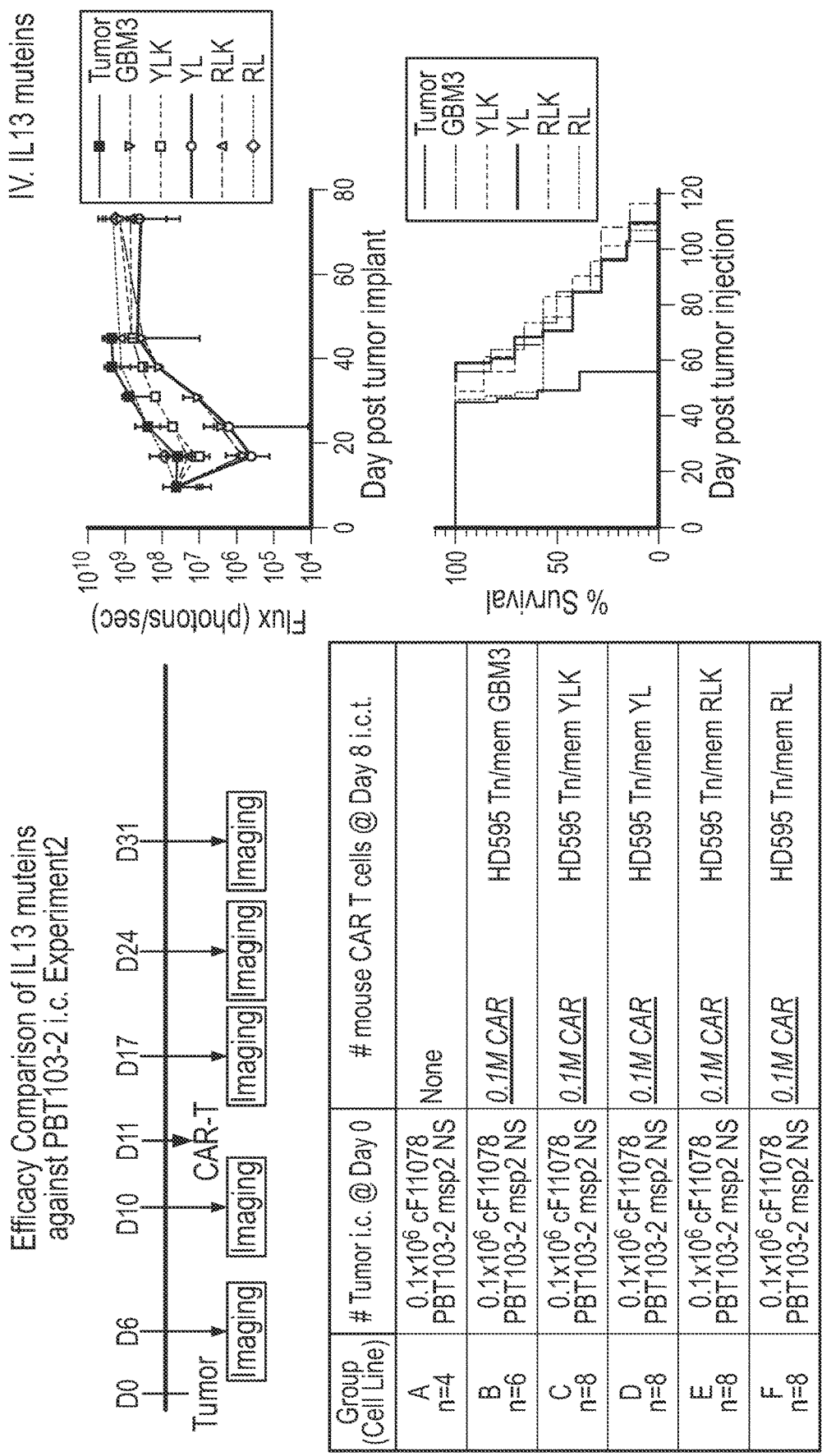
FIG. 19: In vivo efficacy of IL13-28t-41BB variant CART cells including YLK variant against PBT103 engineered with over expression of IL13Ra2. Eleven days after engraftment, $0.1 \times 10^6$ CAR per mouse were intracranially delivered, followed by monitoring of tumor bioluminescence and survival. YLK, RLK and YL showed superior efficacy.

FIG. 19, depicts an assessment of the in vivo efficacy of IL13-28t-41BB variant CAR T cells including YLK variant against PBT103 engineered with over expression of IL13Ra2. Eleven days after engraftment, $0.1 \times 10^6$ CAR per mouse were intracranially delivered, followed by monitoring of tumor bioluminescence and survival. The CAR included an IgG4 (EQ) Spacer, a CD28 TM domain and a 4-1BB co-stimulatory domain in addition to CD3zeta. YLK-41BB is SEQ ID NO: 39; RLK-41BB is SEQ ID NO: 40; RL-41BB is SEQ ID NO:41; YL-41BB is SEQ ID NO: 42; and RL-41BB is SEQ ID NO: 41. YLK, RLK and YL showed superior efficacy.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. All references are herein incorporated in their entirety for any and all purposes.

What is claimed is:

1. A nucleic acid molecule comprising a nucleotide sequence encoding a chimeric antigen receptor (CAR), wherein the chimeric antigen receptor comprises: targeting domain comprising an amino acid sequence selected from: SEQ ID NO: 30-37; a spacer domain; a transmembrane domain; a costimulatory domain and a CD3zeta domain.

2. The nucleic acid molecule of claim 1, wherein the spacer domain is selected from the group consisting of: and IgG4(EQ) spacer domain, a IgG4(HL-CH3) spacer domain and an IgG4(CH3) spacer domain.

3. The nucleic acid molecule of claim 1, wherein the spacer domain comprises any one of SEQ ID NO: 10, 9, and 12.

4. The nucleic acid molecule of claim 1, wherein the transmembrane domain is selected from the group consisting of: a CD4 transmembrane domain, a CD8 transmembrane domain, and a CD28 transmembrane domain, and wherein the co-stimulatory domain is selected from a CD28 costimulatory domain, and CD28gg costimulatory domain, and a 41-BB co-stimulatory domain.

5. The nucleic acid molecule of claim 1, wherein the CAR comprises or consists of an amino acid sequence selected from the group consisting of: SEQ ID NO: 39-68.

6. The nucleic acid molecule of claim 1, wherein the CAR comprises or consists of an amino acid sequence selected from the group consisting of: SEQ ID NO: 39-68 wherein the spacer having the amino acid sequence of SEQ ID NO: 10 is replaced by the amino acid sequence of any of SEQ ID NOs: 2-9 and 11.

7. A nucleic acid molecule comprising a nucleotide sequence encoding a chimeric antigen receptor (CAR), wherein the chimeric antigen receptor comprises: a targeting domain comprising an amino acid sequence comprising a variant IL13 domain comprising 109, 110, 111, contiguous amino acids of SEQ ID NO: 1 or the entirety of SEQ ID NO: 1 with 1, 2, 3, 4 or 5 single amino acid changes, provided that there is an amino acid other than E at position 90 of SEQ ID NO:1; a spacer domain; a transmembrane domain; a costimulatory domain; and a CD3zeta domain.

8. The nucleic acid molecule of claim 7, wherein there is an L at position 90 of SEQ ID NO: 1.

9. The nucleic acid molecule of claim 1, wherein the spacer domain comprises the amino acid sequence of any of SEQ ID NOs: 2-12, and wherein the costimulatory domain comprises the amino acid sequence of any of SEQ ID NOs: 22-25.

10. The nucleic molecule of claim 1, wherein the CAR comprises the amino acid sequence of any of SEQ ID NOs: 39-68 with up to 5 single amino acid substitutions.

11. A vector or an expression vector comprising the nucleic acid molecule of claim 1.

12. A population of human T cells or NK cells harboring the nucleic acid molecule of claim 1.

13. The population of human T cells of claim 12, wherein the population of human T cells comprise central memory T cells, naive memory T cells, pan T cells, or PBMC substantially depleted for CD25+ cells and CD14+ cells.

14. A method of treating a patient suffering from glioblastoma, pancreatic ductal adenocarcinoma, melanoma, ovarian carcinoma, renal cell carcinoma, breast cancer or lung cancer, comprising administering to the patient a population of autologous or allogeneic human T cells or NK cells harboring the nucleic acid molecule of claim 1.

15. The method of claim 14, wherein the cells are administered locally or systemically.

16. The method of claim 14, wherein the cells are administered intraventricularly.

17. The method of claim 14, wherein the human T cells or NK cells administered by single or repeat dosing.

18. A method of preparing CAR T cells or CAR NK cells comprising: providing a population of autologous or allogeneic human T cells or NK cells and transducing the cells with a vector comprising the nucleic acid molecule of claim 1.

19. A polypeptide encoded by the nucleic acid molecule of claim 1.

20. The nucleic acid molecule of claim 1, wherein the nucleic acid molecule is RNA or DNA.

21. The nucleic acid molecule of claim 1, wherein the targeting domain comprises or consists of the amino acid of SEQ ID NO: 30.

22. The nucleic acid molecule of claim 1, wherein the targeting domain comprises or consists of the amino acid of SEQ ID NO: 31.

23. The nucleic acid molecule of claim 1, wherein the targeting domain comprises or consists of the amino acid of SEQ ID NO: 32.

24. The nucleic acid molecule of claim 1, wherein the targeting domain comprises or consists of the amino acid of SEQ ID NO: 33.

25. The nucleic acid molecule of claim 1, wherein the targeting domain comprises or consists of the amino acid of SEQ ID NO: 34.

26. The nucleic acid molecule of claim 1, wherein the targeting domain comprises or consists of the amino acid of SEQ ID NO: 35.

27. The nucleic acid molecule of claim 1, wherein the targeting domain comprises or consists of the amino acid of SEQ ID NO: 36.

28. The nucleic acid molecule of claim 1, wherein the targeting domain comprises or consists of the amino acid of SEQ ID NO: 37.

29. The method of claim 14, wherein the CAR comprises or consists of an amino acid sequence selected from the group consisting of: SEQ ID NO: 39-68.

* * * * *